United States Patent
Ding et al.

(10) Patent No.: US 11,818,077 B2
(45) Date of Patent: Nov. 14, 2023

(54) REFERENCE SIGNAL SENDING AND RECEIVING METHOD, NETWORK DEVICE, TERMINAL DEVICE, AND SYSTEM

(71) Applicant: Huawei Technologies Co., Ltd., Shenzhen (CN)

(72) Inventors: Mengying Ding, Shanghai (CN); Yuanzhou Hu, Shanghai (CN); Yi Qin, Kista (SE); Zhongfeng Li, Shanghai (CN); Min Zhang, Shanghai (CN); Weimin Xiao, Rolling Meadows, IL (US); Shengyue Dou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/788,031

(22) Filed: Feb. 11, 2020

(65) Prior Publication Data

US 2020/0177353 A1 Jun. 4, 2020

Related U.S. Application Data

(63) Continuation of application No. PCT/CN2018/099207, filed on Aug. 7, 2018.

(30) Foreign Application Priority Data

Aug. 11, 2017 (CN) .......................... 201710687878.0
Nov. 2, 2017 (CN) .......................... 201711066801.8

(51) Int. Cl.
*H04L 5/00* (2006.01)
*H04B 7/06* (2006.01)
*H04W 72/0453* (2023.01)

(52) U.S. Cl.
CPC ......... *H04L 5/0058* (2013.01); *H04B 7/0626* (2013.01); *H04W 72/0453* (2013.01)

(58) Field of Classification Search
CPC ..... H04L 5/0058; H04L 5/001; H04L 5/0094; H04L 5/005; H04L 5/0048; H04B 7/0626; H04W 72/0453
See application file for complete search history.

(56) References Cited

U.S. PATENT DOCUMENTS

2014/0335858 A1 11/2014 Lee et al.
2015/0117338 A1* 4/2015 Janis .................... H04W 24/02
                                                       370/329

(Continued)

FOREIGN PATENT DOCUMENTS

CN      101335969 A     12/2008
CN      101394263 A      3/2009

(Continued)

OTHER PUBLICATIONS

"Wider Bandwidth Operations," 3GPP TSG RAN WG1 NR Ad-Hoc#2, Qingdao, P.R. China, R1-1710761, XP051299966, Total 8 pages, 3rd Generation Partnership Project, Valbonne, France (Jun. 27-30, 2017).

(Continued)

*Primary Examiner* — Yu-Wen Chang
(74) *Attorney, Agent, or Firm* — Leydig, Voit & Mayer, Ltd.

(57) ABSTRACT

This application provides a reference signal sending and receiving method, a network device, a terminal device, and a system, to be applicable to resource configuration for an SRS in NR. The method includes: sending, by a terminal device, a sounding reference signal SRS based on a location of a starting subcarrier for transmitting the SRS, where the location of the starting subcarrier for transmitting the SRS is determined by an offset of a sounding region, the offset of the sounding region indicates a resource offset between a starting subcarrier of the sounding region and a starting (Continued)

subcarrier of a bandwidth part BWP of the terminal device, and the sounding region is a resource that can be used to transmit the SRS.

16 Claims, 17 Drawing Sheets

(56) References Cited

U.S. PATENT DOCUMENTS

| | | | |
|---|---|---|---|
| 2016/0050050 A1* | 2/2016 | Kang | H04B 7/0617 370/329 |
| 2016/0127936 A1* | 5/2016 | Chatterjee | H04W 4/70 370/252 |
| 2017/0111812 A1 | 4/2017 | Lee et al. | |
| 2017/0214442 A1 | 7/2017 | Chae et al. | |
| 2017/0222768 A1* | 8/2017 | Lee | H04L 25/0204 |
| 2018/0343089 A1* | 11/2018 | Park | H04L 5/005 |
| 2019/0165894 A1* | 5/2019 | Choi | H04B 17/24 |
| 2019/0191444 A1* | 6/2019 | Park | H04B 7/0626 |
| 2019/0223187 A1* | 7/2019 | Davydov | H04B 7/0626 |
| 2019/0372641 A1* | 12/2019 | Muruganathan | H04L 5/0091 |
| 2020/0028640 A1* | 1/2020 | Yeo | H04L 5/005 |
| 2020/0052868 A1* | 2/2020 | Zhang | H04L 5/0057 |
| 2020/0127786 A1* | 4/2020 | Kwak | H04L 5/0026 |
| 2021/0127367 A1* | 4/2021 | Yi | H04W 72/042 |
| 2021/0167930 A1* | 6/2021 | Jeon | H04L 5/0098 |

FOREIGN PATENT DOCUMENTS

| | | |
|---|---|---|
| CN | 101404817 A | 4/2009 |
| CN | 104144504 A | 11/2014 |
| CN | 104767592 A | 7/2015 |
| CN | 104798321 A | 7/2015 |
| CN | 106100713 A | 11/2016 |
| CN | 106211312 A | 12/2016 |
| CN | 106233794 A | 12/2016 |
| CN | 107911203 A | 4/2018 |
| EP | 3432505 A1 | 1/2019 |
| WO | 2010012178 A1 | 2/2010 |
| WO | 2015093910 A1 | 6/2015 |

OTHER PUBLICATIONS

"3rd Generation Partnership Project; Technical Specification Group Radio Access Network; NR; Physical layer procedures for data (Release 15)," 3GPP TS 38.214 V0.0.1, pp. 1-30, 3rd Generation Partnership Project, Valbonne, France (Jul. 2017).

Huawei et al., "Overview of wider bandwidth operations," 3GPP TSG RAN WG1 NR Ad Hoc Meeting, Qingdao, China, R1-1709972, Total 9 pages, 3rd Generation Partnership Project, Valbonne, France (Jun. 27-30, 2017).

Nokia, "UL SRS design considerations in NR," 3GPP TSG-RAN WG1 NR AH#2, Qingdao, P.R. China, R1-1711310, Total 7 pages, 3rd Generation Partnership Project, Valbonne, France (Jun. 27-30, 2017).

MediaTek Inc., "SRS design in NR," 3GPP TSG RAN WG1 NR Ad-Hoc#2, Qingdao, P.R. China, R1-1710817, Total 6 pages, 3rd Generation Partnership Project, Valbonne, France (Jun. 27-30, 2017).

CN/201711066801.8, Notice of Allowance and Search Report, dated Aug. 22, 2023.

InterDigital Inc., "Coreset Monitoring Under Dynamic Change of BWP," 3GPP TSG RAN WG1 NR Ad-Hoc #2, Qingdao, China, R1-1710872, Total 5 pages, 3rd Generation Partnership Project, Valbonne, France (Jun. 27-30, 2017).

* cited by examiner

REFERENCE SIGNAL SENDING AND RECEIVING METHOD, NETWORK DEVICE, TERMINAL DEVICE, AND SYSTEM

CROSS-REFERENCE TO RELATED APPLICATIONS

This application is a continuation of International Application No. PCT/CN2018/099207, filed on Aug. 7, 2018, which claims priority to Chinese Patent Application No. 201711066801.8, filed on Nov. 2, 2017 and Chinese Patent Application No. 201710687878.0, filed on Aug. 11, 2017, all of which are hereby incorporated by reference in their entireties.

TECHNICAL FIELD

Embodiments of this application relate to the communications field, and more specifically, to a reference signal sending and receiving method, a network device, a terminal device, and a system.

BACKGROUND

A sounding reference signal (SRS) is a reference signal for measuring an uplink channel. A network device measures an uplink channel based on an SRS sent by a terminal device, to obtain channel state information (CSI) of the uplink channel, thereby facilitating uplink resource scheduling.

In a long term evolution (LTE) system, uplink system bandwidth may be divided into two parts, where regions on two sides of the uplink system bandwidth are used to send a physical uplink control channel (PUCCH), and a region in the middle of the uplink system bandwidth is used to send a physical uplink shared channel (PUSCH). Because transmit capabilities of terminal devices in LTE are the same, a size of a resource (or a sounding region (sounding region)) for transmitting an SRS is cell-specific, and sounding regions of any two terminal devices in a same cell are the same. The terminal device sends an SRS in bandwidth in the uplink system bandwidth except the region used for sending the PUCCH, so that the network device measures an uplink channel and schedules a resource.

However, in some communications systems, for example, in a new radio access technology (NR) of a fifth generation (5G) communications system, because transmit capabilities of terminal devices are different, sounding regions corresponding to different terminal devices in a same cell may be different. Therefore, the sounding regions are not cell-specific, but are user equipment (UE)-specific.

SUMMARY

This application provides a reference signal sending and receiving method, a network device, a terminal device, and a system, to be applicable to resource configuration for an SRS in NR.

According to a first aspect, a reference signal sending method is provided, and includes:

determining, by a terminal device based on an offset, a location of a starting subcarrier for transmitting an SRS, where the offset is a resource offset between a starting subcarrier of a sounding region and a starting subcarrier of transmission bandwidth of a bandwidth part (BWP) of the terminal device, and the offset is determined based on a predefined resource configuration mode; and sending, by the terminal device, the SRS based on the location of the starting subcarrier for transmitting the SRS.

The sounding region may be a resource that is configured for the terminal device to transmit the SRS, or may be a region that is in uplink system bandwidth (more specifically, in the BWP) and in which the terminal device can perform channel sounding by using the SRS. The sounding region may be understood as a resource region of channel state information (CSI) that needs to be obtained by a network device, or a resource region that can be used by the terminal device to send the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is user equipment (UE)-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

With reference to the first aspect, in some implementations of the first aspect, the predefined resource configuration mode is determined from a plurality of predefined resource configuration modes, and the plurality of predefined resource configuration modes correspond to a plurality of offsets.

Therefore, a plurality of terminal devices in a same cell may configure a transmission resource of an SRS based on different offsets, so that the network device can perform channel measurement on full-bandwidth resources of the BWP, to perform resource scheduling.

In addition, in a system with "channel reciprocity", the network device can implement full-bandwidth measurement on the BWP. This is more conducive to CSI estimation of a downlink channel, thereby facilitating resource scheduling.

Based on the foregoing two features, compared with an SRS resource configuration mode in LTE, the method provided in this application helps the network device schedule more resources, thereby improving resource utilization.

With reference to the first aspect, in some implementations of the first aspect, the method further includes:

obtaining, by the terminal device, an index value of the predefined resource configuration mode, where the index value is used to determine the resource configuration mode, and the plurality of predefined resource configuration modes are in a one-to-one correspondence with a plurality of index values.

The terminal device may obtain the index value of the predefined resource configuration mode in either of the following manners:

Method 1: The terminal device receives first information, where the first information includes the index value of the predefined resource configuration mode.

Method 2: The terminal device determines the index value of the predefined resource configuration mode based on any one of a system frame number, a slot number, or a comb mapping location.

According to a second aspect, a reference signal receiving method is provided, and includes:

determining, by a network device based on an offset, a location of a starting subcarrier for transmitting an SRS, where the offset is a resource offset between a starting subcarrier of a sounding region and a starting subcarrier of transmission bandwidth of a BWP of a terminal device, and the offset is determined based on a predefined resource configuration mode; and receiving, by the network device, the SRS from the terminal device based on the location of the starting subcarrier for transmitting the SRS.

The sounding region is a region in which the terminal device performs channel sounding by using the SRS. The sounding region may be understood as a resource region of channel state information (CSI) that needs to be obtained by the network device, or a resource region that can be used by the terminal device to send the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is UE-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

With reference to the second aspect, in some implementations of the second aspect, the predefined resource configuration mode is determined from a plurality of predefined resource configuration modes, and the plurality of predefined resource configuration modes correspond to a plurality of offsets.

Therefore, a plurality of terminal devices in a same cell may configure a transmission resource of an SRS based on different offsets, so that the network device can perform channel measurement on full-bandwidth resources of the BWP, to perform resource scheduling.

In addition, in a system with "channel reciprocity", the network device can implement full-bandwidth measurement on the BWP. This is more conducive to CSI estimation of a downlink channel, thereby facilitating resource scheduling.

Based on the foregoing two features, compared with an SRS resource configuration mode in LTE, the method provided in this application helps the network device schedule more resources, thereby improving resource utilization.

With reference to the second aspect, in some implementations of the second aspect, the method further includes:

determining, by the terminal device, an index value of the predefined resource configuration mode based on any one of a system frame number, a slot number, or a comb mapping location, where the index value is used to determine the resource configuration mode, and the plurality of predefined resource configuration modes are in a one-to-one correspondence with a plurality of index values.

With reference to the second aspect, in some implementations of the second aspect, the method further includes:

sending, by the network device, first information, where the first information includes an index value of the predefined resource configuration mode.

According to a third aspect, a terminal device is provided, and includes a determining module and a transceiver module, so as to perform the method in the first aspect or any possible implementation of the first aspect. The determining module is configured to execute a function related to determining, and the transceiver module is configured to execute a function related to receiving and sending.

According to a fourth aspect, a network device is provided, and includes a determining module and a transceiver module, so as to perform the method in the second aspect or any possible implementation of the second aspect. The determining module is configured to execute a function related to determining, and the transceiver module is configured to execute a function related to receiving and sending.

According to a fifth aspect, a terminal device is provided, and includes a processor, a memory, and a transceiver. The memory is configured to store a computer program, and the processor is configured to invoke the computer program from the memory and run the computer program, to control the transceiver to receive and send a signal, so that the terminal device performs the method in the first aspect or any possible implementation of the first aspect.

According to a sixth aspect, a network device is provided, and includes a processor, a memory, and a transceiver. The memory is configured to store a computer program, and the processor is configured to invoke the computer program from the memory and run the computer program, to control the transceiver to receive and send a signal, so that the network device performs the method in the second aspect or any possible implementation of the second aspect.

Optionally, there are one or more processors, and there are one or more memories.

Optionally, the memory may be integrated with the processor, or the memory and the processor are separately disposed.

According to a seventh aspect, a system is provided, and the system includes the foregoing terminal device and the foregoing network device.

In any one of the foregoing aspects, optionally, the plurality of resource configuration modes are in a one-to-one correspondence with a plurality of formulas, each formula is used to determine an offset, and the plurality of formulas include:

$$\bar{k}_0^{(p)} = (N_{RB}^{UL} - m_{SRS,b} \Pi_{b'=0}^{b} N_{b'}) N_{SC}^{RB} + k_{TC}^{(p)}; \text{ and} \quad \text{Formula 1:}$$

$$\bar{k}_0^{(p)} = k_{TC}^{(p)}. \quad \text{Formula 2:}$$

$\bar{k}_0^{(p)}$ indicates the offset, $N_{RN}^{UL}$ indicates a quantity of resource blocks RBs included in the transmission bandwidth of the BWP of the terminal device, $m_{SRS,b}$ indicates a quantity of RBs used by the terminal device to transmit an SRS once, $B_{SRS}$ is auser equpment UE-specific SRS bandwidth configuration parameter, each $B_{SRS}$ indicates a set of parameters $m_{SRS,b}$ and $N_b$, $b=B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location. For brevity, descriptions of same parameters are omitted below.

In this design, different offsets are configured for different terminal devices, so that full-bandwidth transmission of an SRS can be implemented in the BWP, to perform uplink channel measurement and resource scheduling on full-bandwidth resources of the BWP. In addition, the network device may estimate CSI of a downlink channel by using channel reciprocity, to perform resource scheduling. Therefore, this design helps the network device schedule more resources, thereby improving resource utilization.

In any one of the foregoing aspects, optionally, the offset is determined according to the following formula:

$$\bar{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}. \quad \text{Formula 3:}$$

In this design, considering a possibility that a PUCCH may be configured on two sides of the BWP in NR, the sounding region is configured in the middle of the BWP. In the BWP, if the sounding region is shifted towards either of the two sides of the BWP, no SRS is transmitted on a part of bandwidth resources, and channel measurement or resource scheduling cannot be performed. Consequently, this part of resources are idle and wasted. Configuration is performed by using the foregoing formula, so that idle resources can be reduced, thereby improving resource utilization. In addition, unnecessary SRS sending can be reduced, thereby reducing power consumption.

In any one of the foregoing aspects, optionally, the plurality of resource configuration modes are in a one-to-one correspondence with a plurality of formulas, each formula is used to determine an offset, and the plurality of formulas include:

$$\bar{k}_0^{(p)} = (N_{RB}^{UL} - m_{SRS,b} \Pi_{b'=0}^{b} N_{b'}) N_{SC}^{RB} + k_{TC}^{(p)}; \quad \text{Formula 1:}$$

$$\bar{k}_0^{(p)} = k_{TC}^{(p)}; \text{ and} \quad \text{Formula 2:}$$

$$\bar{k}_0^{(p)} = (\lfloor N_{RB}^{UL}/2 \rfloor - m_{SRS,b} \Pi_{b'=0}^{b} N_{b'}/2) N_{SC}^{RB} + k_{TC}^{(p)}. \quad \text{Formula 3:}$$

In this design, full-bandwidth transmission of an SRS can be implemented in the BWP, to perform channel measurement and scheduling on full-bandwidth resources of the BWP. In addition, a possibility that a PUCCH may be configured on two sides of the BWP in NR is considered, thereby reducing idle resources and improving resource utilization.

In any one of the foregoing aspects, optionally, the plurality of resource configuration modes are in a one-to-one correspondence with a plurality of formulas, each formula is used to determine an offset, and the plurality of formulas include:

$$\bar{k}_0^{(p)} = k_{TC}^{(p)}; \text{ and} \quad \text{Formula 2:}$$

$$\bar{k}_0^{(p)} = (N_{RB}^{UL} - m_{SRS,0}^{max}) N_{SC}^{RB} + k_{TC}^{(p)}. \quad \text{Formula 4:}$$

$\bar{k}_0^{(p)}$ indicates the offset, $N_{RB}^{UL}$ indicates a quantity of resource blocks RB included in the transmission bandwidth of the BWP of the terminal device, $\lfloor \cdot \rfloor$ indicates rounding down, $m_{SRS,0}^{max}$ indicates a maximum value of $m_{SRS,0}$, $m_{SRS,0}$ indicates a quantity of RBs included in the sounding region, $N_{SC}^{RB}$ indicates a quantity of subcarriers included in each RB, and $k_{TC}^{(p)}$ is used to determine a comb mapping location. For brevity, descriptions of same parameters are omitted below.

In this design, a bandwidth size of a sounding region in LTE is still used. That is, for a bandwidth size of the sounding region configured for the terminal device, refer to the bandwidth size of the sounding region in LTE, for example, 96 RBs or 80 RBs. Therefore, an LTE protocol is modified relatively slightly. Meanwhile, different offsets may be configured for different terminal devices by using the foregoing formulas, so that full-bandwidth transmission of an SRS can be implemented in the BWP, to perform uplink channel measurement and resource scheduling on full-bandwidth resources of the BWP. In addition, the network device may estimate CSI of a downlink channel by using channel reciprocity, to perform resource scheduling. Therefore, this design helps the network device schedule more resources, thereby improving resource utilization.

In any one of the foregoing aspects, optionally, the offset is determined according to the following formula:

$$\bar{k}_0^{(p)} = (\lfloor N_{RB}^{UL}/2 \rfloor - m_{SRS,0}/2) N_{SC}^{RB} + k_{TC}^{(p)}. \quad \text{Formula 5:}$$

$\bar{k}_0^{(p)}$ indicates the offset, $N_{RB}^{UL}$ indicates a quantity of resource blocks RB included in the transmission bandwidth of the BWP of the terminal device, $\lfloor \cdot \rfloor$ indicates rounding down, $m_{SRS,0}$ indicates a quantity of RBs included in the sounding region, $N_{SC}^{RB}$ indicates a quantity of subcarriers included in each RB, and $k_{TC}^{(p)}$ is used to determine a comb mapping location.

In this design, a bandwidth size of a sounding region in LTE is still used. In addition, considering a possibility that a PUCCH may be configured on two sides of the BWP in NR, the sounding region is configured in the middle of the BWP. In the BWP, if the sounding region is shifted towards either of the two sides of the BWP, no SRS is transmitted on a part of bandwidth resources, and channel measurement or resource scheduling cannot be performed. Consequently, this part of resources are idle and wasted. Configuration is performed by using the foregoing formula, so that idle resources can be reduced, thereby improving resource utilization. In addition, unnecessary SRS sending can be reduced, thereby reducing power consumption.

In any one of the foregoing aspects, optionally, the plurality of resource configuration modes are in a one-to-one correspondence with a plurality of formulas, each formula is used to determine an offset, and the plurality of formulas include:

$$\bar{k}_0^{(p)} = k_{TC}^{(p)}; \quad \text{Formula 2:}$$

$$\bar{k}_0^{(p)} = (N_{RB}^{UL} - m_{SRS,0}^{max}) N_{SC}^{RB} + k_{TC}^{(p)}; \text{ and} \quad \text{Formula 4:}$$

$$\bar{k}_0^{(p)} = (\lfloor N_{RB}^{UL}/2 \rfloor - m_{SRS,0}/2) N_{SC}^{RB} + k_{TC}^{(p)}. \quad \text{Formula 5:}$$

In this design, a bandwidth size of a sounding region in LTE is still used, and full-bandwidth transmission of an SRS can be implemented in the BWP, to perform channel measurement and scheduling on full-bandwidth resources of the BWP. In addition, a possibility that a PUCCH may be configured on two sides of the BWP in NR is considered, thereby reducing idle resources and improving resource utilization.

Based on the foregoing technical solutions, in the embodiments of this application, the location of the starting subcarrier for transmitting the SRS by the terminal device is determined based on the BWP of the terminal device in NR. In this way, this application is more suitable for an NR scenario. In addition, different offsets can be configured for different terminal devices, so that a plurality of terminal devices in a same cell can transmit an SRS based on different offsets, to implement full-bandwidth transmission of an SRS in the BWP, so that the network device can perform channel measurement on full-bandwidth resources of the BWP. In addition, full-bandwidth CSI of a downlink channel can be estimated by using channel reciprocity. In comparison with an SRS resource configuration mode in LTE, more channels can be measured, thereby facilitating scheduling of more resources and improving resource utilization.

According to an eighth aspect, a reference signal sending method is provided, and includes:

sending, by a terminal device, a sounding reference signal SRS based on a location of a starting subcarrier for transmitting the SRS, where the location of the starting subcarrier for transmitting the SRS is determined by an offset of a sounding region, the offset of the sounding region is a resource offset between a starting subcarrier of the sounding region and a starting subcarrier of transmission bandwidth of a bandwidth part BWP of the terminal device, and the sounding region is a resource that is configured for the terminal device to transmit the SRS.

The sounding region may be a region that is in uplink system bandwidth (more specifically, in the BWP) and in which the terminal device may perform channel sounding by using the SRS. The sounding region may be understood as a resource region of channel state information (CSI) that needs to be obtained by a network device, or a resource region that can be used by the terminal device to send the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is UE-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

With reference to the eighth aspect, in some implementations of the eighth aspect, the offset of the sounding region meets Formula 6: $\overline{k}_0^{(p)} = k_s^{(p)} N_{SC}^{RB} + k_{TC}^{(p)}$, where $\overline{k}_0^{(p)}$ indicates the offset of the sounding region, $N_{SC}^{RB}$ indicates a quantity of subcarriers included in each resource block RB, $k_{TC}^{(p)}$ is used to determine a comb mapping location, and $k_s^{(p)}$ indicates a quantity of RBs between an RB on which the starting subcarrier of the sounding region is located and a starting RB of the transmission bandwidth of the BWP, where $k_s^{(p)}$ belongs to $[0, N_{RB}^{UL} - N_{RB}^{SR}]$, $k_s^{(p)}$ is an integer, $N_{RB}^{UL}$ indicates a quantity of RBs included in the transmission bandwidth of the BWP of the terminal device, $N_{RB}^{SR}$ indicates a quantity of RBs included in the sounding region, and $k_s^{(p)}$ meets $\mod[(k_s^{(p)} + N_{BWP}^i), n] = \Delta$, where mod indicates a modulo operation, $N_{BWP}^i$ indicates a quantity of RBs between the starting RB of the transmission bandwidth of the BWP and a starting RB of system bandwidth, $\Delta$ belongs to $[0, n-1]$, and $\Delta$ is an integer. Optionally, the method further includes: receiving, by the terminal device, indication information of a value of $k_s^{(p)}$, where the indication information of a value of $k_s^{(p)}$ indicates a value of $k_s^{(p)}$.

Optionally, the indication information of $k_s^{(p)}$ is carried in higher layer signaling. The higher layer signaling may include, for example, a radio resource control (RRC) message or a media access control (MAC)-control element (CE).

With reference to the eighth aspect, in some implementations of the eighth aspect, the offset of the sounding region meets Formula 7: $\overline{k}_0^{(p)} = (nk_r^{(p)} + K_A) N_{SC}^{RB} + k_{TC}^{(p)}$, where $\overline{k}_0^{(p)}$ indicates the offset of the sounding region, $N_{SC}^{RB}$ indicates a quantity of subcarriers included in each RB, $k_{TC}^{(p)}$ is used to determine a comb mapping location, and $nk_r^{(p)} + K_A$ indicates a quantity of RBs between an RB on which the starting subcarrier of the sounding region is located and a starting RB of the bandwidth of the BWP, where $K_A$ is any value in $[0, n-1]$, $k_r^{(p)}$ is any value in $[0, \lfloor(N_{RB}^{UL} - N_{RB}^{SR} - K_A)/n\rfloor]$, and both $K_A$ and $k_r^{(p)}$ are integers.

Optionally, the method further includes:

receiving, by the terminal device, indication information of a value of $k_r^{(p)}$, where the indication information of a value of $k_r^{(p)}$ indicates a value of $k_r^{(p)}$; and receiving, by the terminal device, indication information of a value of $K_A$, where the indication information of a value of $K_A$ indicates a value of $K_A$.

Optionally, the indication information of $k_r^{(p)}$ is carried in higher layer signaling. The higher layer signaling may include, for example, an RRC message or a MAC-CE.

Optionally, the indication information of $K_A$ is carried in higher layer signaling. The higher layer signaling may include, for example, an RRC message or a MAC-CE.

It should be understood that, the indication information of $k_r^{(p)}$ and the indication information of $K_A$ may be carried in a same piece of higher layer signaling or different higher layer signaling. This is not limited in this application.

Based on the foregoing design, the resource for transmitting the SRS can be controlled within a range of the BWP, to avoid a problem that channel measurement accuracy is reduced because the SRS cannot be totally mapped to the BWP, thereby improving demodulation performance. In addition, different $\Delta$ is configured for terminal devices or antenna ports that are configured with different comb parameters, so that the terminal devices or antenna ports that are configured with the different comb parameters can send an SRS on different frequency bands of the system bandwidth, and it is possible for the network device to implement full-bandwidth measurement, thereby improving data transmission performance of the entire bandwidth, and improving resource utilization and resource scheduling flexibility.

With reference to the foregoing possible implementations, in some possible implementations, optionally, the method further includes: receiving, by the terminal device, indication information of a value of $N_{BWP}^i$, where the indication information of a value of $N_{BWP}^i$ indicates a value of $N_{BWP}^i$.

Optionally, the indication information of a value of $N_{BWP}^i$ is carried in higher layer signaling. The higher layer signaling may include, for example, an RRC message or a MAC-CE.

It should be understood that the foregoing higher layer signaling for carrying various types of indication information is merely an example for description, but shall not constitute any limitation on this application.

With reference to the eighth aspect, in some implementations of the eighth aspect, a value of n is 4.

It may be learned from a simulation experiment that, when an overlapping part of frequency domain resources used by different terminal devices to transmit an SRS is greater than or equal to an integer multiple of n RBs, or when an overlapping part of frequency domain resources of an SRS that are corresponding to different ports is greater than or equal to 4 RBs, channel measurement accuracy is greatly improved, and better demodulation performance can be achieved. Therefore, it is expected that the resource overlapping part can be controlled greater than 4 RBs.

With reference to the eighth aspect, in some implementations of the eighth aspect, the method further includes:

determining, by the terminal device based on the offset of the sounding region, the location of the starting subcarrier for transmitting the SRS.

According to a ninth aspect, a reference signal receiving method is provided, and includes:

receiving, by a network device, a sounding reference signal SRS from a terminal device based on a location of a starting subcarrier for transmitting the SRS, where the location of the starting subcarrier for transmitting the SRS is determined by an offset of a sounding region, the offset of the sounding region is a resource offset between a starting subcarrier of the sounding region and a starting subcarrier of transmission bandwidth of a bandwidth part BWP of the terminal device, and the sounding region is a resource that can be used to transmit the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is UE-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

With reference to the ninth aspect, in some implementations of the ninth aspect, the offset of the sounding region meets Formula 6: $\overline{k}_0^{(p)} = k_s^{(p)} N_{SC}^{RB} + k_{TC}^{(p)}$, where $\overline{k}_0^{(p)}$ indicates the offset of the sounding region, $N_{SC}^{RB}$ indicates a quantity of subcarriers included in each resource block RB, $k_{TC}^{(p)}$ is used to determine a comb mapping location, and $k_s^{(p)}$ indicates a quantity of RBs between an RB on which the starting subcarrier of the sounding region is located and a starting RB of the transmission bandwidth of the BWP, where $k_s^{(p)}$ belongs to $[0, N_{RB}^{UL} - N_{RB}^{SR}]$, $k_s^{(p)}$ is an integer, $N_{RB}^{UL}$ indicates a quantity of RBs included in the transmission bandwidth of the BWP of the terminal device, $N_{RB}^{SR}$ indicates a quantity of RBs included in the sounding region, and $k_s^{(p)}$ meets $\mathrm{mod}[(k_s^{(p)} + N_{BWP}^i), n] = \Delta$, where mod indicates a modulo operation, $N_{BWP}^i$ Indicates a Quantity of RBs Between the starting RB of the transmission bandwidth of the BWP and a starting RB of system bandwidth, $\Delta$ belongs to $[0, n-1]$, and $\Delta$ is an integer.

Optionally, the method further includes: sending, by the network device, indication information of a value of $k_s^{(p)}$, where the indication information of a value of $k_s^{(p)}$ indicates a value of $k_s^{(p)}$.

Optionally, the indication information of $k_s^{(p)}$ is carried in higher layer signaling. The higher layer signaling may include, for example, an RRC message or a MAC-CE.

With reference to the ninth aspect, in some implementations of the ninth aspect, the offset meets Formula 7: $\overline{k}_0^{(p)} = (nk_r^{(p)} + K_A) N_{SC}^{RB} + k_{TC}^{(p)}$, where $\overline{k}_0^{(p)}$ indicates the offset of the sounding region, $N_{SC}^{RB}$ indicates a quantity of subcarriers included in each RB, $k_{TC}^{(p)}$ is used to determine a comb mapping location, $nk_r^{(p)} + K_A$ indicates a quantity of RBs between an RB on which the starting subcarrier of the sounding region is located and a starting RB of the bandwidth of the BWP, where $K_A$ is any value in $[0, n-1]$, $k_r^{(p)}$ is any value in $[0, \lfloor (N_{RB}^{UL} - N_{RB}^{SR} - K_A)/n \rfloor]$, and both $K_A$ and $k_r^{(p)}$ are integers.

Optionally, the method further includes: sending, by the network device, indication information of a value of $k_r^{(p)}$, where the indication information of a value of $k_r^{(p)}$ indicates a value of $k_r^{(p)}$; and sending, by the network device, indication information of a value of $K_A$, where the indication information of a value of $K_A$ indicates a value of $K_A$.

Optionally, the indication information of a value of $k_r^{(P)}$ is carried in higher layer signaling. The higher layer signaling may include, for example, an RRC message or a MAC-CE.

Optionally, the indication information of a value of $K_A$ is carried in higher layer signaling. The higher layer signaling may include, for example, an RRC message or a MAC-CE.

Optionally, the indication information of a value of $k_r^{(p)}$ and the indication information of a value of $K_A$ may be carried in a same RRC message or different RRC messages. This is not limited in this application. Based on the foregoing design, the resource for transmitting the SRS can be controlled within a range of the BWP, to avoid a problem that channel measurement accuracy is reduced because the SRS cannot be totally mapped to the BWP, thereby improving demodulation performance. In addition, different $\Delta$ is configured for terminal devices or antenna ports that are configured with different comb parameters, so that the terminal devices or antenna ports that are configured with the different comb parameters can send an SRS on different frequency bands of the system bandwidth, and it is possible for the network device to implement full-bandwidth measurement, thereby improving data transmission performance of the entire bandwidth, and improving resource utilization and resource scheduling flexibility.

With reference to the foregoing possible implementations, in some possible implementations, optionally, the method further includes: receiving, by the terminal device, indication information of a value of $N_{BWP}^i$, where the indication information of a value of $N_{BWP}^i$ indicates a value of $N_{BWP}^i$.

Optionally, the indication information of $N_{BWP}^i$ is carried in higher layer signaling. The higher layer signaling may include, for example, an RRC message or a MAC-CE.

It should be understood that the foregoing signaling for carrying various types of indication information is merely an example for description, but shall not constitute any limitation on this application.

With reference to the ninth aspect, in some implementations of the ninth aspect, a value of n is 4.

It may be learned from a simulation experiment that, when an overlapping part of frequency domain resources used by different terminal devices to transmit an SRS is greater than or equal to an integer multiple of n RBs, or when an overlapping part of frequency domain resources of an SRS that are corresponding to different ports is greater than or equal to 4 RBs, channel measurement accuracy is greatly improved, and better demodulation performance can be achieved. Therefore, it is expected that the resource overlapping part can be controlled greater than 4 RBs.

With reference to the ninth aspect, in some implementations of the ninth aspect, the method further includes:

determining, by the network device based on the offset of the sounding region, the location of the starting subcarrier for transmitting the SRS.

According to a tenth aspect, a reference signal sending method is provided, and includes:

sending, by a network device, a channel state information-reference signal CSI-RS based on a frequency-domain starting location of a resource for transmitting the CSI-RS, where the frequency-domain starting location of the resource for transmitting the CSI-RS is determined by an offset of a pilot region, the offset of the pilot region indicates a resource offset between a starting resource block RB of the pilot region and a starting RB of a bandwidth part BWP of a terminal device, or the offset of the pilot region indicates a resource offset between a starting RB of the pilot region and a starting RB of system bandwidth, and the pilot region is a resource that can be used to transmit the CSI-RS.

Based on the foregoing technical solution, in this embodiment of this application, a starting RB for receiving the CSI-RS by the terminal device is determined based on the BWP of the terminal device in NR, and the CSI-RS is transmitted based on the starting RB, so that the terminal device can receive the CSI-RS from the network device based on a location and a size of the BWP of the terminal device. In this way, this application is more suitable for an NR scenario.

With reference to the tenth aspect, in some implementations of the tenth aspect, the method further includes:

sending, by the network device, indication information of a first offset $k_c$, where the indication information of the first offset $k_c$ indicates a value of $k_c$, and the first offset $k_c$ indicates a quantity of RBs between the starting RB of the pilot region and the starting RB of the BWP.

Optionally, the indication information of the first offset $k_c$ is carried in higher layer signaling. The higher layer signaling may include, for example, an RRC message or a MAC-CE.

With reference to the tenth aspect, in some implementations of the tenth aspect, the method further includes:

sending, by the network device, indication information of a second offset $T_A$, where the indication information of the second offset $T_A$ indicates a value of $T_A$; and sending, by the network device, indication information of a third offset $k_i$, where the indication information of the third offset $k_i$ indicates a value of $k_i$, where the second offset $T_A$ indicates a quantity of RBs between a starting RB of a mappable location in the pilot region and the starting RB of the BWP, and the third offset $k_i$ is used to indicate a quantity of RBs between a starting RB of a mapping location in the pilot region and the starting RB of the mappable location in the pilot region.

Optionally, the indication information of the second offset $T_A$ and the indication information of the third offset $k_i$ are carried in higher layer signaling. The higher layer signaling may include, for example, an RRC message or a MAC-CE.

It should be understood that the higher layer signaling for carrying the indication information of the second offset $T_A$ and the higher layer signaling for carrying the indication information of the third offset $k_i$ may be a same piece of higher layer signaling, or may be different higher layer signaling. This is not limited in this application.

In the foregoing two implementations of indicating the offset of the pilot region, the offset of the pilot region may be represented by an offset relative to the starting RB of the BWP.

With reference to the tenth aspect, in some implementations of the tenth aspect, the method further includes:

sending, by the network device, indication information of a starting location of the pilot region, where the indication information of the starting location indicates an RB number corresponding to a starting RB for transmitting the reference signal in the system bandwidth.

Optionally, the indication information of the starting location of the pilot region is carried in higher layer signaling. The higher layer signaling may include, for example, an RRC message or a MAC-CE.

In this implementation of indicating the offset of the pilot region, the offset of the pilot region may be represented by an offset relative to the starting RB of the system bandwidth.

With reference to the tenth aspect, in some implementations of the tenth aspect, the method further includes:

sending, by the network device, indication information of a reference signal location, where the indication information of the reference signal location indicates an RB for transmitting the CSI-RS in the pilot region.

Optionally, the indication information of the reference signal location is carried in higher layer signaling. The higher layer signaling may include, for example, an RRC message or a MAC-CE.

With reference to the tenth aspect, in some implementations of the tenth aspect, the method further includes:

sending, by the network device, indication information of a pilot region size, where the indication information indicates transmission bandwidth occupied by the pilot region.

Optionally, the indication information of the pilot region size is carried in higher layer signaling. The higher layer signaling may include, for example, an RRC message or a MAC-CE.

It should be understood that the foregoing higher layer signaling for carrying various types of indication information is merely an example for description, but shall not constitute any limitation on this application.

With reference to the tenth aspect, in some implementations of the tenth aspect, the indication information of the reference signal location is a bitmap, the bitmap includes at least one indication bit, each indication bit is used to indicate whether an RB group is used to transmit the CSI-RS, and the RB group includes at least one RB.

With reference to the tenth aspect, in some implementations of the tenth aspect, the method further includes:

determining, by the network device based on the offset of the pilot region, the starting RB for transmitting the CSI-RS.

According to an eleventh aspect, a reference signal receiving method is provided, and includes:

sending, by a terminal device, a channel state information-reference signal CSI-RS based on a frequency-domain starting location of a resource for transmitting the CSI-RS, where the frequency-domain starting location of the resource for transmitting the CSI-RS is determined by an offset of a pilot region, the offset of the pilot region indicates a resource offset between a starting resource block RB of the pilot region and a starting RB of a bandwidth part BWP of the terminal device, or the offset of the pilot region indicates a resource offset between a starting RB of the pilot region and a starting RB of system bandwidth, and the pilot region is a resource that is configured for the terminal device to transmit the CSI-RS.

Based on the foregoing technical solution, in this embodiment of this application, a starting RB for receiving the CSI-RS by the terminal device is determined based on the BWP of the terminal device in NR, and the CSI-RS is transmitted based on the starting RB, so that the terminal device can receive the CSI-RS from a network device based on a location and a size of the BWP of the terminal device. In this way, this application is more suitable for an NR scenario.

With reference to the eleventh aspect, in some implementations of the eleventh aspect, the method further includes:

receiving, by the terminal device, indication information of a first offset $k_c$, where the indication information of the first offset $k_c$ indicates a value of $k_c$, and the first offset $k_c$ indicates a quantity of RBs between the starting RB of the pilot region and the starting RB of the BWP.

Optionally, the indication information of the first offset $k_c$ is carried in higher layer signaling. The higher layer signaling includes, for example, an RRC message or a MAC-CE.

With reference to the eleventh aspect, in some implementations of the eleventh aspect, the method further includes:

receiving, by the terminal device, indication information of a second offset $T_A$, where the indication information of the second offset $T_A$ indicates a value of $T_A$; and receiving, by the terminal device, indication information of a third offset $k_i$, where the indication information of the third offset $k_i$ indicates a value of $k_i$, where the second offset $T_A$ indicates a quantity of RBs between a starting RB of a mappable location in the pilot region and the starting RB of the BWP, and the third offset $k_i$ is used to indicate a quantity of RBs between a starting RB of a mapping location in the pilot region and the starting RB of the mappable location in the pilot region.

Optionally, the indication information of the second offset $T_A$ and the indication information of the third offset $k_t$ are carried in higher layer signaling. The higher layer signaling may include, for example, an RRC message or a MAC-CE.

It should be understood that the higher layer signaling for carrying the indication information of the second offset $T_A$ and the higher layer signaling for carrying the indication information of the third offset $k_t$ may be a same piece of higher layer signaling, or may be different higher layer signaling. This is not limited in this application.

In the foregoing two implementations of indicating the offset of the pilot region, the offset of the pilot region may be represented by an offset relative to the starting RB of the BWP.

With reference to the eleventh aspect, in some implementations of the eleventh aspect, the method further includes:

receiving, by the terminal device, indication information of a starting location of the pilot region, where the indication information of the starting location indicates an RB number corresponding to a starting RB for transmitting the reference signal in the system bandwidth.

Optionally, the indication information of the starting location of the pilot region is carried in higher layer signaling. The higher layer signaling includes, for example, an RRC message or a MAC-CE.

With reference to the eleventh aspect, in some implementations of the eleventh aspect, the method further includes:

receiving, by the terminal device, indication information of a reference signal location, where the indication information of the reference signal location indicates an RB for transmitting the CSI-RS in the pilot region.

Optionally, the indication information of the reference signal location is carried in higher layer signaling. The higher layer signaling may include, for example, an RRC message or a MAC-CE.

With reference to the eleventh aspect, in some implementations of the eleventh aspect, the indication information of the reference signal location is a bitmap, the bitmap includes at least one indication bit, each indication bit is used to indicate whether an RB group is used to transmit the CSI-RS, and each RB group includes at least one RB.

Optionally, the indication information of the pilot region size is carried in higher layer signaling. The higher layer signaling may include, for example, an RRC message or a MAC-CE.

It should be understood that the foregoing higher layer signaling for carrying various types of indication information is merely an example for description, but shall not constitute any limitation on this application.

According to a twelfth aspect, a terminal device is provided, and includes a determining module and a transceiver module, so as to perform the method in the eighth aspect or any possible implementation of the eighth aspect or in the eleventh aspect or any possible implementation of the eleventh aspect. The determining module is configured to execute a function related to determining, and the transceiver module is configured to execute a function related to receiving and sending.

According to a thirteenth aspect, a network device is provided, and includes a determining module and a transceiver module, so as to perform the method in the ninth aspect or any possible implementation of the ninth aspect or in the tenth aspect or any possible implementation of the tenth aspect. The determining module is configured to execute a function related to determining, and the transceiver module is configured to execute a function related to receiving and sending.

According to a fourteenth aspect, a terminal device is provided, and includes a processor, a memory, and a transceiver. The memory is configured to store a computer program, and the processor is configured to invoke the computer program from the memory and run the computer program, to control the transceiver to receive and send a signal, so that the terminal device performs the method in the eighth aspect or any possible implementation of the eighth aspect or in the eleventh aspect or any possible implementation of the eleventh aspect.

According to a fifteenth aspect, a network device is provided, and includes a processor, a memory, and a transceiver. The memory is configured to store a computer program, and the processor is configured to invoke the computer program from the memory and run the computer program, to control the transceiver to receive and send a signal, so that the network device performs the method in the ninth aspect or any possible implementation of the ninth aspect or in the tenth aspect or any possible implementation of the tenth aspect.

Optionally, there are one or more processors, and there are one or more memories.

Optionally, the memory may be integrated with the processor, or the memory and the processor are separately disposed.

According to a sixteenth aspect, a system is provided, and the system includes the foregoing terminal device and the foregoing network device. According to a fifteenth aspect, a computer program product is provided. The computer program product includes a computer program (also referred to as code or an instruction). When the computer program is run, a computer performs the methods in the foregoing aspects.

According to a seventeenth aspect, a computer readable medium is provided. The computer readable medium stores a computer program (also referred to as code or an instruction). When the computer program is run on a computer, the computer performs the methods in the foregoing aspects.

According to an eighteenth aspect, a computer program product is provided. The computer program product includes computer program code. When the computer program code is run on a computer, the computer performs the methods in the foregoing aspects.

According to a nineteenth aspect, a chip system is provided, and the chip system includes a processor, configured to support a terminal device in implementing a function in the foregoing aspects, for example, generating, receiving, sending, or processing data and/or information in the foregoing methods. In a possible design, the chip system further includes a memory, and the memory is configured to store a program instruction and data that are necessary for the terminal device. The chip system may include a chip, or may include a chip and another discrete device.

According to a twentieth aspect, a chip system is provided, and the chip system includes a processor, configured to support a network device in implementing a function in the foregoing aspects, for example, generating, receiving, sending, or processing data and/or information in the foregoing methods. In a possible design, the chip system further includes a memory, and the memory is configured to store a program instruction and data that are necessary for the network device. The chip system may include a chip, or may include a chip and another discrete device.

DESCRIPTION OF EMBODIMENTS

The following describes technical solutions in this application with reference to accompanying drawings.

It should be understood that the technical solutions in this application can be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, an LTE frequency division duplex (FDD) system, LTE time division duplex (TDD) system, a universal mobile telecommunications system (UMTS), a worldwide interoperability for microwave access (WiMAX) communications system, a next-generation communications system (for example, a fifth generation (fifth-generation, 5G) communications system), a converged system of a plurality of access systems, or an evolved system. The 5G system may also be referred to as a new radio access technology (NR) system.

Figure 1:
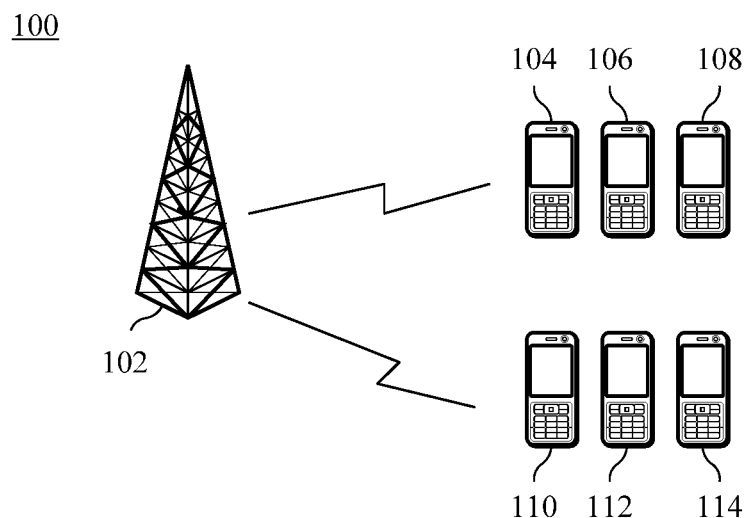
FIG. 1 is a schematic diagram of a communications system to which a reference signal sending and receiving method in an embodiment of this application is applicable.

For ease of understanding of embodiments of this application, a communications system to which the embodiments of this application are applicable is first described in detail with reference to FIG. 1. FIG. 1 is a schematic diagram of a communications system 100 to which a reference signal sending and receiving method in an embodiment of this application is applicable. As shown in FIG. 1, the communications system 100 may include a network device 102 and terminal devices 104 to 114.

It should be understood that the network device 102 may be any device with a wireless receiving/sending function or a chip that may be disposed in the device. The device includes but is not limited to a base station (for example, a NodeB NodeB, an evolved NodeB eNodeB, a network device in the fifth generation (5G) communications system (such as a transmission point (TP), a transmission reception point (TRP), a base station, or a small cell device), a network device in a future communications system, an access node in a wireless fidelity (Wi-Fi) system, a wireless relay node, a wireless backhaul node, or the like.

The network device 102 may communicate with a plurality of terminal devices (for example, the terminal devices 104 to 114 shown in the figure).

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone, a tablet computer, a computer with a wireless receiving/sending function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the foregoing terminal device and a chip that may be disposed in the foregoing terminal device are collectively referred to as a terminal device.

In addition, the communications system 100 may alternatively be a public land mobile network (PLMN) network, a device-to-device (D2D) network, a machine-to-machine (M2M) network, or another network. FIG. 1 is merely a simplified schematic diagram of an example for ease of understanding. The communications system 100 may further include another network device and another terminal device that are not shown in FIG. 1.

For ease of understanding of the embodiments of this application, the following briefly describes an SRS with reference to the communications system shown in FIG. 1.

The SRS is used to perform quality sounding on an uplink channel. The terminal device sends the SRS on the uplink channel, and the network device measures the uplink channel based on the received SRS, to determine a frequency location of a resource block allocated by the terminal device for uplink scheduling.

In LTE, uplink system bandwidth may be divided into two parts, where regions on two sides of the uplink system bandwidth are used to send a PUCCH, where uplink channel measurement does not need to be performed by sending the SRS, and a region in the middle of the uplink system bandwidth, that is, a region other than a resource for sending the PUCCH, is used to send a PUSCH, where the SRS needs to be sent to perform uplink channel measurement, so that the network device performs resource scheduling. For ease of description, bandwidth for transmitting the SRS to perform uplink channel measurement may be referred to as a sounding region. In LTE, the sounding region is cell-specific, and may be determined based on a cell-specific SRS bandwidth configuration parameter $C_{SRS}$. For a cell, a size of a resource region (a sounding region) in which channel measurement needs to be performed may be definite. Sounding regions of any two terminal devices in a same cell may be the same. If a sounding region of an SRS is definite, a specific SRS bandwidth configuration may be further indicated by a UE-specific SRS bandwidth configuration parameter $B_{SRS}$, and each $B_{SRS}$ indicates a set of parameters $m_{SRS,b}$ and $N_b$. $m_{SRS,b}$ indicates a quantity of RBs used by the terminal device to transmit an SRS once, to be specific, bandwidth used by the terminal device to transmit an SRS once, namely, measured bandwidth, $N_b$ indicates a quantity of times required for sending an SRS by the terminal device to measure previous-level measured bandwidth (bandwidth of $m_{SRS,b-1}$), and $b=B_{SRS}$.

Table 1 shows SRS bandwidth configuration parameters in LTE.

TABLE 1

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

It may be learned from Table 1 that, in a configuration of same $C_{SRS}$, sounding regions corresponding to different $B_{SRS}$ are the same. For example, when $C_{SRS}$ is 0 or 1, a corresponding sounding region is 96 RBs; when $C_{SRS}$ is 2, a corresponding sounding region is 80 RBs. For brevity, examples are not further enumerated herein.

Regardless of a bandwidth configuration, a location of a starting subcarrier for transmitting an SRS on the $n_b^{th}$ sub-band may be determined according to the following formula:

$$k_0^{(p)} = \bar{k}_0^{(p)} + \sum_{b=0}^{B_{SRS}} K_{TC} M_{SC,b}^{RS} n_b.$$

$k_0^{(p)}$ indicates the starting subcarrier for transmitting the SRS on the $n_b^{th}$ sub-band (an initial subcarrier or the first subcarrier for transmitting the SRS in a direction from low frequency to high frequency). Herein, the sub-band may be understood as a frequency domain resource for transmitting the SRS by using a transmission opportunity of one slot in a sounding region. $n_b$ may be understood as an index of the sub-band for transmitting the SRS, and a value of $n_b$ may be determined based on a higher layer parameter $n_{RRC}'$. A method for calculating $n_b$ may be the same as that in the prior art. For brevity, details are not described herein. In LTE, $\bar{k}_0^{(p)}$ indicates a quantity of RBs between a starting location of the sounding region (for example, a starting subcarrier of the sounding region) and a low frequency location of the uplink system bandwidth (for example, a starting subcarrier of the uplink system bandwidth), namely, a quantity of RBs between a starting subcarrier that can be used for transmitting the SRS in the uplink system bandwidth and the starting subcarrier of the uplink system bandwidth, $B_{SRS}$ is a UE-specific SRS bandwidth configuration parameter, $n_b$ is an index of the SRS in a frequency domain location, $M_{SC,b}^{RS}$ is a sequence length of the SRS, that is, a quantity of resource elements (RE) occupied by one SRS, $M_{SC,b}^{RS}=m_{SRS,b}N_{SC}^{RB}/K_{TC}$, $N_{SC}^{RB}$ indicates a quantity of subcarriers included in each RB, $b=B_{SRS}$, and a value of b is an integer.

For a common uplink subframe, $\bar{k}_0^{(p)}=(\lfloor N_{RB}^{UL}/2\rfloor-m_{SRS,0}/2)N_{SC}^{RB}+k_{TC}^{(p)}$.

For an uplink pilot slot (uplink pilot slot, UpPTS), $\bar{k}_0^{(p)}=(N_{RB}^{UL}-m_{SRS,0}^{max})N_{SC}^{RB}+k_{TC}^{(p)}$ or $\bar{k}_0^{(p)}=k_{TC}^{(p)}$.

$N_{RB}^{UL}$ indicates a quantity of resource blocks RBs included in the uplink system bandwidth, $\lfloor \cdot \rfloor$ indicates rounding down, $m_{SRS,0}$ indicates a quantity of RBs included in the sounding region and may be obtained by looking up Table 1, $m_{SRS,0}$ is a maximum value of $m_{SRS,0}$ corresponding to different $C_{SRS}$, $k_{TC}^{(p)}$ is used to determine a comb mapping location, $k_{TC}^{(p)} \in \{0, 1, K, K_{TC}-1\}$, and $K_{TC}$ indicates a quantity of combs.

It should be understood that for a specific process of determining, according to the foregoing formula, the location of the starting subcarrier for transmitting the SRS, refer to the prior art. To avoid repetition, detailed descriptions of the specific process are omitted herein.

It may be learned from the foregoing description that in LTE, a location of a resource for transmitting the SRS is related to the uplink system bandwidth. In addition, for different types of subframes, a location of a resource configured to transmit the SRS varies, or an offset between the starting subcarrier for transmitting the SRS and the starting subcarrier of the uplink system bandwidth varies. However, resources configured to transmit an SRS are the same in subframes of a same type. The UpPTS usually appears in a special subframe used for uplink and downlink switching in a TDD system, and this is a relatively special case. If an SRS resource configuration mode in a normal uplink subframe in an FDD system and the TDD system is considered, it may be learned from the foregoing formula that the location of the starting subcarrier for transmitting the SRS is related to the sounding region configured for the SRS. In LTE, sounding regions of terminal devices in a same cell are the same. Therefore, resources for transmitting the SRS are also in a same location, and the sounding region is always in the middle of the uplink system bandwidth.

In this SRS resource configuration mode, the resource for transmitting the SRS is only configured in the middle of the uplink system bandwidth, and this mode is not flexible enough. For example, if a location of a PUCCH changes, channel measurement cannot be performed on resources on two sides of the uplink system bandwidth.

In view of this, this application provides a reference signal sending and receiving method, to be more applicable to resource configuration for an SRS in NR.

Before the embodiments of this application are described, several related concepts in NR are first briefly described.

Bandwidth part (BWP): In NR, transmit or receive capabilities of different terminal devices in a same cell may be different. A system may configure corresponding bandwidth for each terminal device. This part of bandwidth configured for the terminal device is referred to as a BWP, and the terminal device performs transmission on the BWP of the terminal device. For example, the terminal device transmits an SRS on the BWP of the terminal device, so that a network device performs channel measurement and resource scheduling, and the terminal device transmits data on the BWP of the terminal device based on scheduling by the network device. The system may configure different BWPs for different terminal devices. To support different services, different BWPs may support different transmission bandwidth (that is, the BWPs include different quantities of RBs), different subcarrier spacings, different cyclic prefixes (CP), and the like, and a scheduling unit may be a slot, a mini-slot, or the like.

Slot: Because frame structures in different BWPs may be different, slots are also defined differently. In NR, a slot is a minimum scheduling unit. A slot format includes 14 orthogonal frequency division multiplexing (OFDM) symbols, and a CP of each OFDM symbol is a normal CP; a slot format includes 12 OFDM symbols, and a CP of each OFDM symbol is an extended CP; a slot format includes seven OFDM symbols, and a CP of each OFDM symbol is a normal CP. All OFDM symbols in one slot may be used for uplink transmission, or may be used for downlink transmission. Alternatively, some OFDM symbols in one slot may be used for downlink transmission, some OFDM symbols are used for uplink transmission, and some OFDM symbols are reserved for no transmission. It should be understood that the foregoing illustration is merely an example for description, but shall not constitute any limitation on this application. In consideration of system forward compatibility, a slot format is not limited to the foregoing examples.

The following describes in detail the embodiments of this application with reference to the accompanying drawings.

It should be understood that the technical solutions in this application may be applied to a wireless communications system, for example, the communications system 100 shown in FIG. 1. The communications system may include at least one network device and at least one terminal device, and the network device and the terminal device may communicate with each other through a wireless air interface. For example, the network device in the communications system may correspond to the network device 102 shown in FIG. 1, and the terminal device may correspond to the terminal devices 104 to 114 shown in FIG. 1.

Generally, the following uses a process of interaction between a terminal device and a network device as an example to describe the embodiments of this application in detail. The terminal device may be any terminal device that is in the wireless communications system and that has a wireless connection relationship with the network device. It may be understood that the network device and a plurality of terminal devices that are in the wireless communications system and that have a wireless connection relationship may transmit a reference signal based on a same technical solution. This is not limited in this application.

Figure 2:
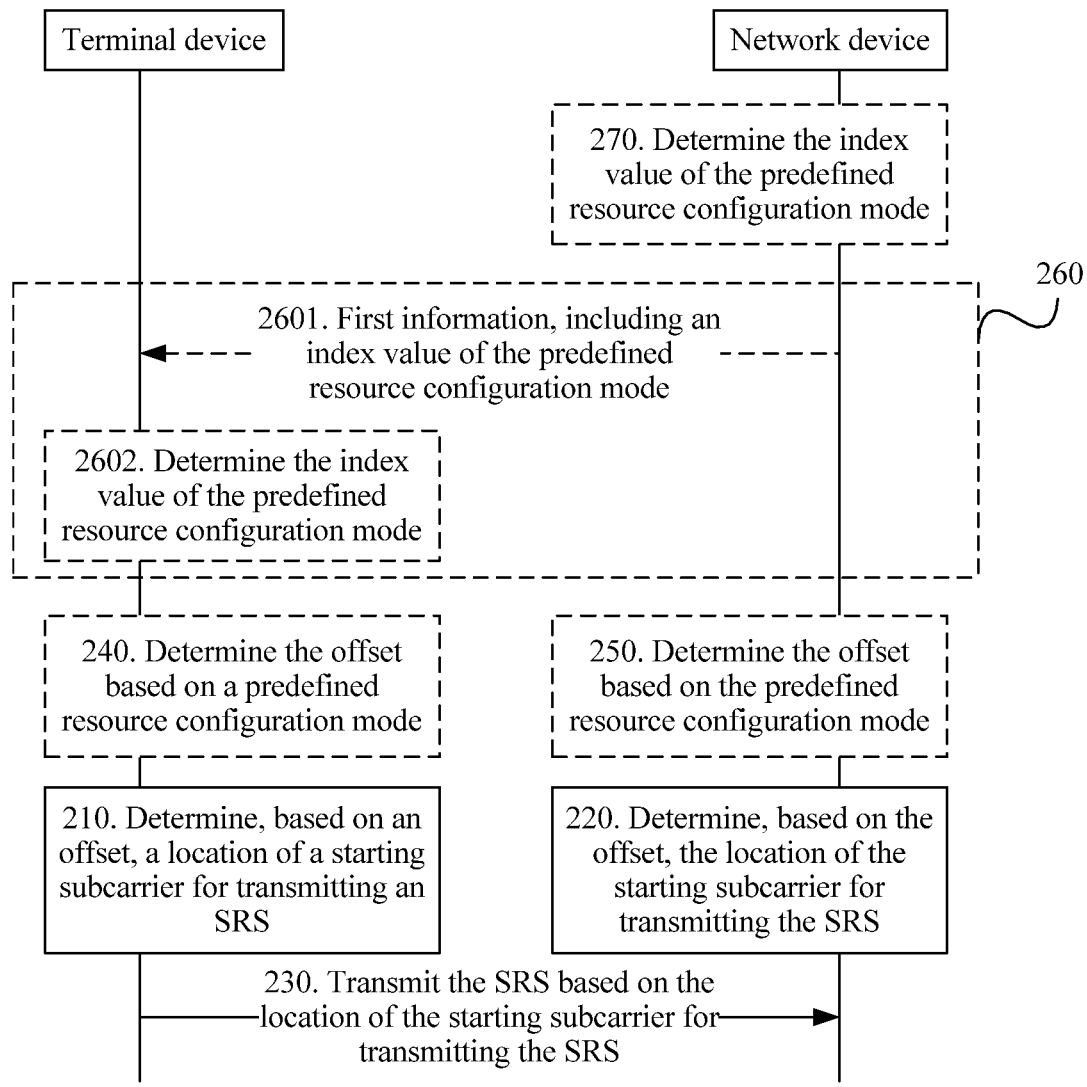
FIG. 2 is a schematic flowchart of a reference signal sending and receiving method according to an embodiment of this application.

FIG. 2 is a schematic flowchart of a reference signal sending and receiving method 200 according to an embodiment of this application from a perspective of device interaction. As shown in FIG. 2, the method 200 may include step 210 to step 270.

In step 210, a terminal device determines, based on an offset, a location of a starting subcarrier for transmitting an SRS. Herein, it should be noted that the offset may be understood as a resource offset between a starting subcarrier of a sounding region and a starting subcarrier of transmission bandwidth of a BWP of the terminal device, in other words, the offset is related to a location of the transmission bandwidth of the BWP of the terminal device. In this embodiment of this application, the offset may be represented by a quantity of resource blocks (RB).

It should be noted that the sounding region is a region in which the terminal device performs channel sounding by using the SRS. The sounding region may be understood as a resource region in which a network device needs to perform channel measurement, or a resource region that can be used by the terminal device to send the SRS. In this embodiment of this application, the sounding region is UE-specific, and bandwidth sizes of sounding regions corresponding to different terminal devices in a same cell may be different.

It may be learned from the foregoing description that the starting subcarrier for transmitting the SRS is $$k_0^{(p)} = \bar{k}_0^{(p)} + \sum_{b=0}^{B_{SRS}} K_{TC} M_{SC,b}^{RS} n_b.$$

For a specific process of determining, based on the offset $\bar{k}_0^{(p)}$, the starting subcarrier $k_0^{(p)}$ for transmitting the SRS, refer to the prior art. This is not limited in this application. The offset $\bar{k}_0^{(p)}$ may be determined based on a predefined resource configuration mode. A specific process of determining the offset based on the predefined resource configuration mode is described in detail below with reference to a specific embodiment.

Similarly, in step 220, the network device determines, based on the offset, the location of the starting subcarrier for transmitting the SRS.

It should be understood that a specific method for determining, by the network device based on the predefined resource configuration mode, the location of the starting subcarrier for transmitting the SRS in step 220 is the same as a specific method for determining, by the terminal device based on the predefined resource configuration mode, the location of the starting subcarrier for transmitting the SRS in step 210. For brevity, details are not described herein again.

In step 230, the terminal device sends the SRS based on the location that is of the starting subcarrier for transmitting the SRS and that is determined in step 210.

Correspondingly, in step 230, the network device receives the SRS from the terminal device based on the location that is of the starting subcarrier for transmitting the SRS and that is determined in step 220.

It should be understood that a specific process of step 230 may be the same as that in the prior art. For brevity, detailed descriptions of the specific process are omitted herein.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is UE-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

In a possible design, a size of the transmission bandwidth of the BWP allocated to the terminal device may be 106 RBs. In the following embodiments, that the size of the transmission bandwidth of the BWP is 106 RBs is used as an example for detailed descriptions. However, it should be understood that this shall not constitute any limitation on this application. A system may allocate BWPs of different bandwidth to different terminal devices based on factors such as transmit capabilities and receive capabilities of the terminal devices and service requirements of the terminal devices.

Bandwidth of a sounding region of an SRS is specified as a multiple of 4 RBs in a current standard. Therefore, if the BWP is 106 RBs, the sounding region of the SRS needs to be redefined.

Considering that a PUCCH is not necessarily configured on two sides of bandwidth of the BWP in NR, the network device may schedule any resource in the BWP. Therefore, the network device expects to perform channel measurement on any resource in uplink system bandwidth. In other words, the network device expects that the region in which the terminal device performs channel sounding by using the SRS can be close to a resource scheduling region of the system, or, the network device expects to allocate as wide bandwidth as possible to the terminal device for SRS transmission.

In a possible design, a largest sounding region of an SRS is defined as a maximum multiple of 4 RBs within a range of BWP bandwidth, to be specific, 104 RBs. Considering that path losses of sending an SRS by terminal devices in different regions of a cell to the network device may be different, for example, a path loss of a terminal device in a central region of the cell is lower than a path loss of a terminal device in an edge region of the cell, different power may be allocated to the terminal devices in the different regions. For example, for the terminal device in the central region of the cell, power allocated for each RB is lower, and therefore bandwidth for sending an SRS each time may be higher; for the terminal device in the edge region of the cell, power allocated for each RB is higher, and therefore bandwidth for sending an SRS each time may be lower. In this way, energy density can be higher, energy consumption caused by a path loss can be compensated for, and quality of channel measurement can be improved, thereby improving measurement accuracy.

Table 2 shows different SRS bandwidth configuration parameters corresponding to same $C_{SRS}$ in a same cell in NR.

In other words, SRS bandwidth configurations in the same cell may be classified into a plurality of levels of configurations, and the plurality of levels of configurations separately correspond to terminal devices in different regions of the cell. For example, bandwidth for transmitting an SRS each time by a terminal device in a central region of the cell may be configured as 104 RBs, a sounding region of the SRS is 104 RBs, and SRS transmission in the entire sounding region may be completed through one time of transmission (that is, transmission is completed by using an SRS transmission opportunity in one slot). Bandwidth for transmitting an SRS each time by a terminal device that is relatively far away from the central region of the cell may be configured as 48 RBs or 52 RBs, considering that bandwidths for transmitting an SRS each time by next two levels of terminal devices need to be a multiple of 4 RBs, 48 RBs are selected. Therefore, a sounding region of the SRS may be 96 RBs, and SRS transmission in the entire sounding region may be completed through two times of transmission (that is, transmission is completed by using SRS transmission opportunities in two slots). Bandwidth for transmitting an SRS each time by a terminal device in a remote region of the cell may be configured as 24 RBs, a sounding region of the SRS may be still 96 RBs, and SRS transmission in the entire sounding region may be completed through four times of transmission (that is, transmission is completed by using SRS transmission opportunities in four slots). Bandwidth for transmitting an SRS each time by a terminal device in an edge region of the cell may be configured as 4 RBs, a sounding region of the SRS may be still 96 RBs, and SRS transmission in the entire sounding region may be completed through 24 times of transmission (that is, transmission is completed by using SRS transmission opportunities in 24 slots).

Therefore, in Table 2, $C_{SRS}$ is a UE-specific SRS configuration parameter, and may be configured for terminal devices with a same transmit or receive capability, or BWP bandwidth corresponding to same $C_{SRS}$ is the same. In addition, to enable a channel sounding region of the terminal device to be as close as possible to a resource scheduling region of the system, sounding regions corresponding to different $B_{SRS}$ in the case of same $C_{SRS}$ may be configured to be the same or different.

In addition, because BWP bandwidth is not an integer multiple of 4 RBs, but a sounding region of an SRS needs to be an integer multiple of 4 RBs, regardless of a configuration mode, a terminal device cannot transmit an SRS in the entire uplink system bandwidth through one time of SRS transmission.

In another possible scenario, in some systems with "channel reciprocity", such as a WiMAX system or an LTE-TDD system, and a possible future system with "channel reciprocity", the network device may estimate CSI of a downlink channel by using CSI of an uplink channel obtained through uplink channel measurement. Therefore, the network device expects to perform channel measurement on any resource in BWP bandwidth.

Herein, it should be noted that in a system with "channel reciprocity", an uplink channel and a downlink channel occupy a same frequency band. Therefore, it may be considered that the uplink channel and the downlink channel are similar, in other words, reciprocal. Based on this feature, the terminal device may measure the uplink channel by sending a reference signal such as an SRS, and the network device may measure the uplink channel by using the reference signal to obtain the CSI of the uplink channel. In addition,

TABLE 2

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS, 0}$ | $N_0$ | $m_{SRS, 1}$ | $N_1$ | $m_{SRS, 2}$ | $N_2$ | $m_{SRS, 3}$ | $N_3$ |
| 0 | 104 | 1 | 48 | 2 | 24 | 2 | 4 | 6 | because of the "channel reciprocity", the network device may estimate the CSI of the downlink channel by using the CSI of the uplink channel.

Therefore, the network device expects to allocate as wide bandwidth as possible to an SRS for SRS transmission, or the network device expects to perform channel measurement on as many resources as possible.

Based on the foregoing problem, a plurality of resource configuration modes are predefined in this application, and the plurality of resource configuration modes may correspond to a plurality of different offsets.

Optionally, the method 200 further includes step 240: The terminal device determines the offset based on the predefined resource configuration mode. The resource configuration mode may be determined from the plurality of predefined resource configuration modes, and the plurality of predefined resource configuration modes correspond to the plurality of different offsets.

Correspondingly, the method 200 further includes step 250: The network device determines the offset based on the predefined resource configuration mode. The resource configuration mode may be determined from the plurality of predefined resource configuration modes, and the plurality of predefined resource configuration modes correspond to the plurality of different offsets.

Therefore, the network device and the terminal device may separately determine the resource configuration mode for the terminal device, to be specific, to determine, for the terminal device, the location of the starting subcarrier for transmitting the SRS, in other words, to configure a resource for transmitting the SRS.

For a same terminal device, different offsets may be configured for the terminal device in different resource configuration modes at different moments. For different terminal devices, different offsets may be configured for the different terminal devices in different resource configuration modes at a same moment.

It may be understood that a communications system usually includes a plurality of terminal devices that communicate with a same network device wirelessly. If resource configuration is performed on some terminal devices in one resource configuration mode (for example, denoted as a resource configuration mode 1), and resource configuration is performed on some other terminal devices in another resource configuration mode (for example, denoted as a resource configuration mode 2), the plurality of terminal devices in the cell can send an SRS in full bandwidth of a BWP at a same moment.

In a possible design, without considering $k_{TC}^{(p)}$, the plurality of offsets include zero and a bandwidth difference between the sounding region and the BWP.

Figure 3:
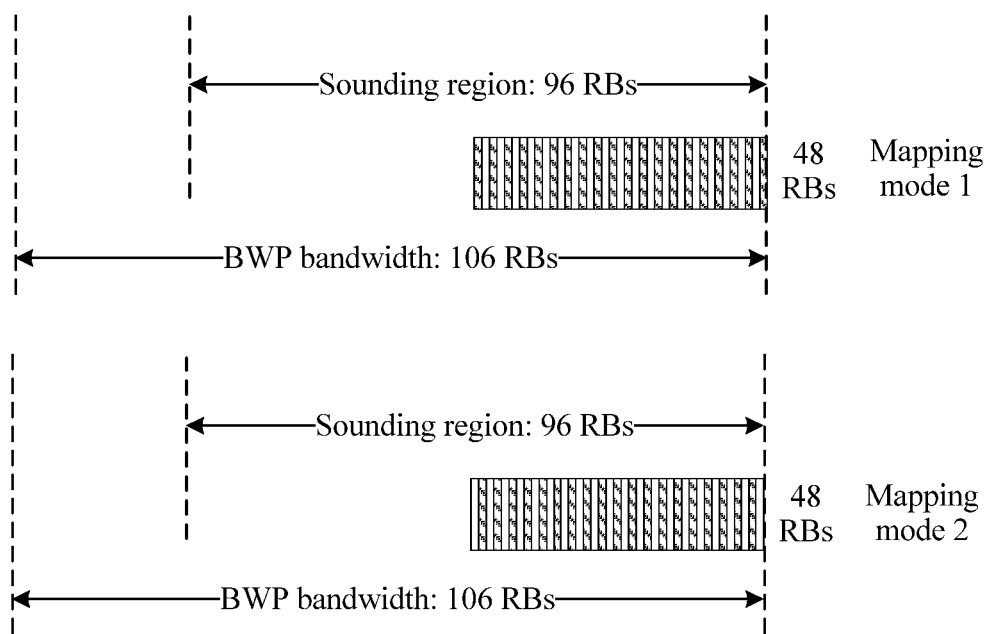
FIG. 3 is a schematic diagram of comb locations configured in different mapping modes.

In particular, it should be noted that resource mapping may be performed on an SRS based on different values of a parameter $k_{TC}^{(p)}$ for determining a comb mapping location. In other words, the comb mapping location may be understood as a location of a subcarrier that is of a frequency domain resource and to which the SRS is mapped. For example, when $K_{TC}$ is 2, namely, Comb2, an SRS of a terminal device may be mapped to an odd-numbered subcarrier, and an SRS of another terminal device is mapped to an even-numbered subcarrier, for example, as shown in FIG. 3. FIG. 3 is a schematic diagram of comb locations configured in different mapping modes. As shown in FIG. 3, SRSs of two terminal devices are mapped to different subcarriers of a same sounding region. For example, if a terminal device configures a resource in a mapping mode 1, an SRS is mapped to an odd-numbered subcarrier; if a terminal device configures a resource in a mapping mode 2, an SRS is mapped to an even-numbered subcarrier.

It should be understood that the foregoing Comb2 is merely an example for description, but shall not constitute any limitation on this application. For example, when $K_{TC}$ is 4, namely, Comb4, an SRS of a terminal device may be mapped to the $(n+4m)^{th}$ subcarrier, where n may be any value in 0, 1, 2, and 3, and m is a positive integer. The parameter $k_{TC}^{(p)}$ for determining the comb mapping location and the quantity $K_{TC}$ of combs are not limited in this application.

Figure 4:
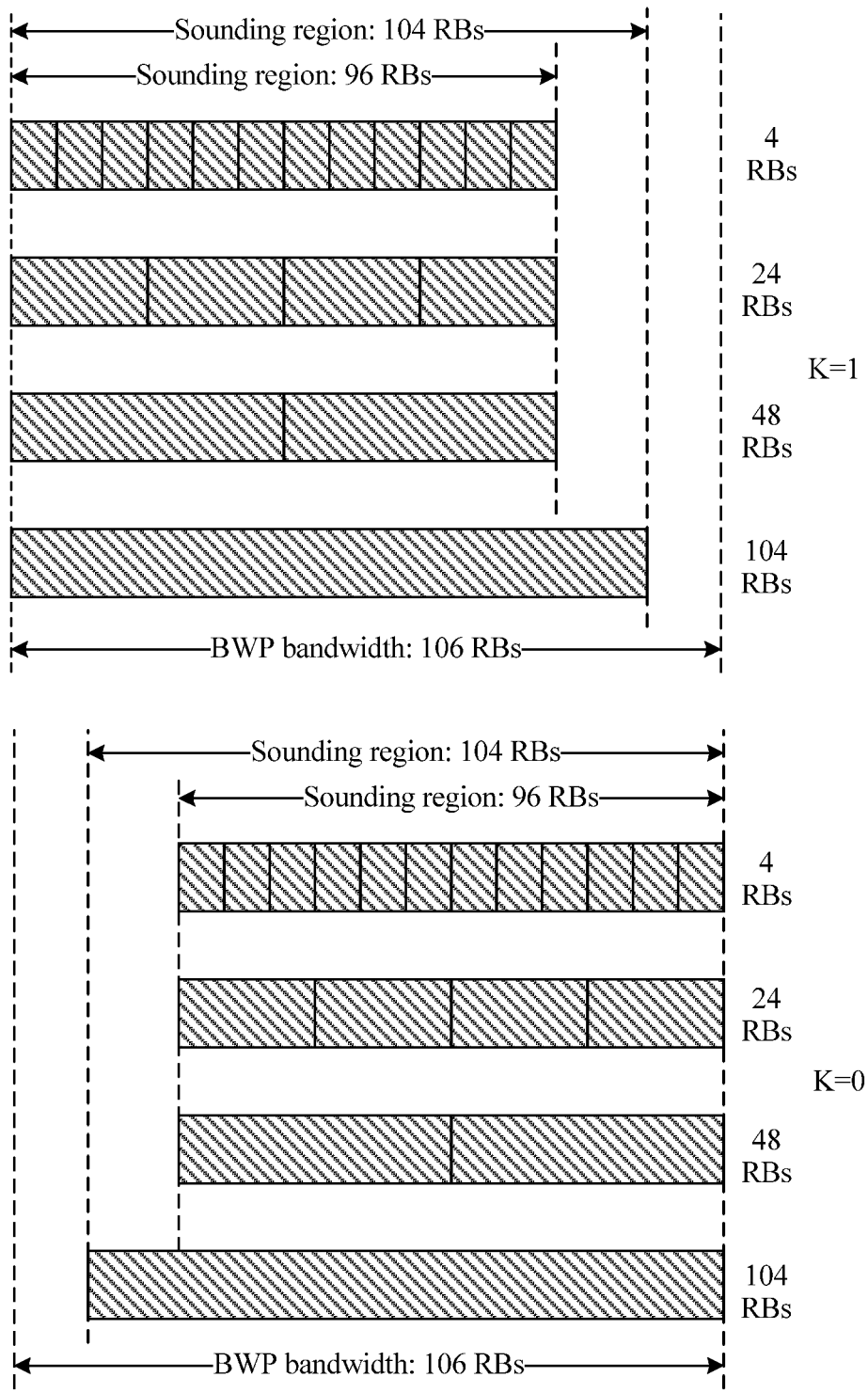
FIG. 4 is a schematic diagram of sounding regions configured in different resource configuration modes.
Figure 5:
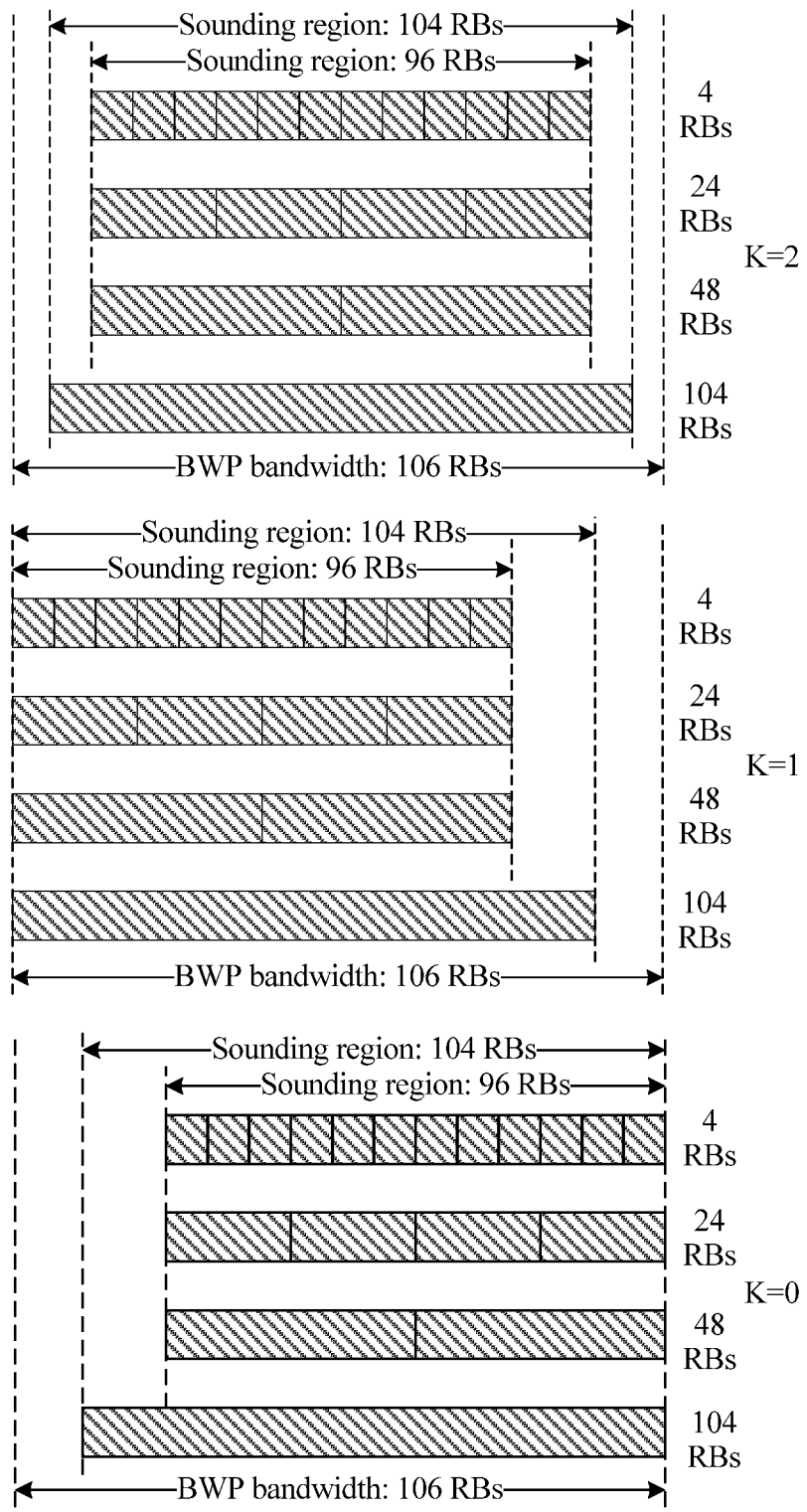
FIG. 5 is a schematic diagram of sounding regions configured in different resource configuration modes.

If frequency domain resources mapped by terminal devices having a same sounding region are placed together, schematic diagrams of sounding regions shown in FIG. 4 and FIG. 5 may be obtained. Therefore, the offset in this application is an offset obtained without considering $k_{TC}^{(p)}$. For brevity, description of a same or similar case is omitted below.

It should be understood that the sounding regions shown in FIG. 4 and FIG. 5 are merely examples for description. However, it does not indicate that each terminal device sends an SRS on consecutive frequency domain resources, but SRSs are discretely distributed on frequency domain resources based on comb mapping locations. In addition, for ease of understanding, an entire sounding region is shown in FIG. 4 and FIG. 5. Actually, not all terminal devices can complete SRS transmission in the entire sounding region through one time of SRS transmission. In some cases, transmission in the sounding region can be transmitted only by using transmission opportunities in a plurality of slots. For example, when a measurement region is 48 RBs, a terminal device may complete SRS transmission in the sounding region through two times of SRS transmission (or SRS transmission opportunities in two slots).

FIG. 4 is a schematic diagram of sounding regions configured in different resource configuration modes. As shown in FIG. 4, when the resource configuration mode 1 is used for configuration, the starting subcarrier of the sounding region may be the starting subcarrier of the BWP, that is, when $k_{TC}^{(P)}$ is not considered, the offset is zero; when the resource configuration mode 2 is used for configuration, the last subcarrier of the sounding region may be the last subcarrier of the BWP, that is, when $k_{TC}^{(P)}$ is not considered, the offset is the bandwidth difference between the sounding region and the BWP.

Optionally, the plurality of predefined resource configuration modes are in a one-to-one correspondence with a plurality of formulas. The formulas may reflect an offset between the starting subcarrier of the sounding region and the starting subcarrier of the transmission bandwidth of the BWP, or the formulas may be used to determine the starting subcarrier for transmitting the SRS.

Specifically, the plurality of formulas may include:

$$\bar{k}_0^{(p)} = (N_{RB}^{UL} - m_{SRS,b} \Pi_{b'=0}^{b} N_{b'}) N_{SC}^{RB} + k_{TC}^{(p)}; \text{ and} \quad \text{Formula 1:}$$

$$\bar{k}_0^{(p)} = k_{TC}^{(p)}. \quad \text{Formula 2:}$$

$\bar{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, $b=B_{SRS}$, b is an integer, $N_b$ indicates a quantity of times required for sending an SRS by the terminal device to measure previous-level measured bandwidth (bandwidth of $m_{SRS,b-1}$), and b' is a value obtained by traversing [0, b]. Therefore, $M_{SRS,b}\Pi_{b'=0}^{B_{SRS}}N_{b'}$ is the sounding region. $N_{SC}^{RB}$ indicates a quantity of subcarriers included in each RB, and $k_{TC}^{(p)}$ is used to determine a comb mapping location.

It should be noted that subcarriers to which SRSs of all terminal devices are mapped in frequency domain may be discretely distributed, and are distributed in a comb-like pattern (comb-like pattern). $k_{TC}^{(p)}$ may be used to determine the comb mapping location or a mapping location of an SRS. For example, an SRS is mapped to an odd-numbered subcarrier, or an SRS is mapped to an even-numbered subcarrier. For a specific method for determining the comb mapping location based on $k_{TC}^{(p)}$, refer to the prior art. This is not limited in this application.

It may be learned that, if $k_{TC}^{(p)}$ is not considered, the offset corresponding to Formula 1 is the bandwidth difference between the sounding region and the BWP, and the offset corresponding to Formula 2 is zero.

Optionally, the method 200 further includes step 260: The terminal device obtains an index value of the predefined resource configuration mode, where the index value is used to indicate the predefined resource configuration mode.

The plurality of predefined resource configuration modes are in a one-to-one correspondence with a plurality of index values, and the terminal device and the network device may prestore the one-to-one correspondence. After the terminal device and the network device separately determine the index value of the resource configuration mode, a resource for transmitting the SRS may be configured based on the corresponding resource configuration mode.

In step 260, the terminal device may obtain the index value of the predefined resource configuration mode in at least the following two manners:

Method 1: Step 2601: The terminal device receives first information, where the first information includes the index value of the predefined resource configuration mode.

Method 2: Step 2602: The terminal device determines the index value of the predefined resource configuration mode based on any one of a system frame number, a slot number, or a comb mapping location.

The following separately describes a specific process in which the terminal device obtains the index value of the resource configuration mode with reference to the foregoing two implementations.

It should be noted that in NR, the terminal device may transmit an SRS on a plurality of consecutive OFDM symbols in one slot. In the following various possible implementations of determining a resource configuration method, in a same resource configuration mode, offsets $\overline{k}_0^{(p)}$ of performing SRS transmission by a same terminal device on a plurality of OFDM symbols in one slot are the same.

In Method 1, the index number of the predefined resource configuration mode may be determined by the network device, and then sent to the terminal device by using the first information. This method may be considered as a method for explicitly indicating a resource configuration mode.

Optionally, the method 200 further includes step 270: The network device determines the index value of the predefined resource configuration mode based on any one of the system frame number, the slot number, or the comb mapping location.

Corresponding to step 2601, the network device sends the first information, where the first information includes the index value of the predefined resource configuration mode.

Optionally, the first information is carried in any one of a radio resource control (RRC) message, a media access control (MAC)-control element (CE), downlink control information (DCI), a system message, or a broadcast message.

Optionally, the first information may be alternatively indicated by using a combination of the foregoing signaling. For example, the network device may indicate a candidate set of resource configuration modes to the terminal device by using an RRC message, where the candidate set of resource configuration modes may include a one-to-one correspondence between a plurality of resource configuration modes and a plurality of index values, and then indicate an index value of a target resource configuration mode in the candidate set of resource configuration modes by using DCI. Alternatively, the network device may indicate a candidate set of resource configuration modes to the terminal device by using an RRC message, where the candidate set of resource configuration modes may include a one-to-one correspondence between a plurality of resource configuration modes and a plurality of index values, and then indicate a subset of the candidate set of resource configuration modes by using a MAC CE, and finally indicate an index value of a target resource configuration in the subset of the candidate set of resource configuration modes by using DCI.

The foregoing Formula 1 and Formula 2 are examples, and respectively correspond to an index value K=0 and an index value K=1.

$$\overline{k}_0^{(p)}=(N_{RB}^{UL}-m_{SRS,b}\Pi_{b'=0}^{b}N_{b'})N_{SC}^{RB}+k_{TC}^{(p)} \text{ corresponds to } K=0; \text{ and} \qquad \text{Formula 1:}$$

$$\overline{k}_0^{(p)}=k_{TC}^{(p)} \text{ corresponds to } K=1. \qquad \text{Formula 2}$$

Two resource configuration modes corresponding to K=0 and K=1 may be shown in the example in FIG. 4.

Therefore, the network device only needs to indicate a value of K in the first information, so that the terminal device can determine which one of the foregoing formulas is used to determine the location of the starting subcarrier for transmitting the SRS.

In Method 2, the index number of the predefined resource configuration mode may be separately determined by the network device and the terminal device based on the foregoing parameters. This method may be considered as a method for implicitly indicating a resource configuration mode.

Optionally, the method 200 further includes step 270: The network device determines the index value of the predefined resource configuration mode based on any one of the system frame number, the slot number, or the comb mapping location.

The following describes in detail how to determine the index value of the predefined resource configuration mode based on the system frame number, the slot number, and the comb mapping location.

1. The index value of the predefined resource configuration mode is determined based on the comb mapping location.

Specifically, the comb mapping location is determined based on $k_{TC}^{(p)}$, where $k_{TC}^{(p)} \in \{0,1\}$ or $k_{TC}^{(p)} \in \{0,1,2,3\}$.

For example, when $k_{TC}^{(p)}$ is an even number, K=0, and $\overline{k}_0^{(p)}$ is determined according to Formula 1, and when $k_{TC}^{(p)}$ is an odd number, K=1, and $\overline{k}_0^{(p)}$ is determined according to Formula 2. Alternatively, when $k_{TC}^{(p)}$ is an even number, K=1, and $\overline{k}_0^{(p)}$ is determined according to Formula 2, and when $k_{TC}^{(p)}$ is an odd number, K=0, and $\overline{k}_0^{(p)}$ is determined according to Formula 1.

It should be understood that the foregoing values of $k_{TC}^{(p)}$ are merely examples for description, but shall not constitute any limitation on this application. A value of $k_{TC}^{(p)}$ is not limited in this application.

2. The index value of the predefined resource configuration mode is determined based on the system frame number n.

For example, when $n_f$ is an even number, K=0, and $\overline{k}_0^{(p)}$ is determined according to Formula 1, and when $n_f$ is an odd number, K=1, and $\overline{k}_0^{(p)}$ is determined according to Formula 2. Alternatively, when $n_f$ is an even number, K=1, and $\overline{k}_0^{(p)}$ is determined according to Formula 2, and when $n_f$ is an odd number, K=0, and $\overline{k}_0^{(p)}$ is determined according to Formula 1.

3. The index value of the predefined resource configuration mode is determined based on the slot number $n_s$.

For example, when $n_s$ is an even number, K=0, and $\overline{k}_0^{(p)}$ is determined according to Formula 1, and when $n_s$ is an odd number, K=1, and $\overline{k}_0^{(p)}$ is determined according to Formula 2. Alternatively, when $n_s$ is an even number, K=1, and $\overline{k}_0^{(p)}$ is determined according to Formula 2, and when $n_s$ is an odd number, K=0, and $\overline{k}_0^{(p)}$ is determined according to Formula 1.

Therefore, based on the foregoing technical solution, the network device may receive, on the entire BWP, the SRS sent by the terminal device, that is, may perform channel measurement on the entire BWP, to perform resource scheduling.

In addition, in a system with "channel reciprocity", the network device can implement full-bandwidth measurement on the BWP. This is more conducive to CSI estimation of a downlink channel, thereby facilitating resource scheduling.

Based on the foregoing two features, compared with an SRS resource configuration mode in LTE, the method provided in this application helps the network device schedule more resources, thereby improving resource utilization.

In another possible design, if $k_{TC}^{(p)}$ is not considered, the plurality of offsets may include zero, a bandwidth difference between the sounding region of the SRS and the BWP, and half of the bandwidth difference between the sounding region of the SRS and the BWP.

Optionally, the plurality of predefined resource configuration modes are in a one-to-one correspondence with a plurality of formulas. The formulas may reflect an offset between the starting subcarrier for transmitting the SRS and a starting subcarrier of the uplink system bandwidth, or the formulas may be used to determine the starting subcarrier for transmitting the SRS.

Specifically, the plurality of formulas may include:

$$\overline{k}_0^{(p)} = (N_{RB}^{UL} - m_{SRS,b} \Pi_{b'=0}^{b} N_{b'}) N_{SC}^{RB} + k_{TC}^{(p)}; \quad \text{Formula 1:}$$

$$\overline{k}_0^{(p)} = k_{TC}^{(p)}; \text{ and} \quad \text{Formula 2:}$$

$$\overline{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}. \quad \text{Formula 3:}$$

$\overline{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, b=$B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location.

FIG. 5 is a schematic diagram of sounding regions configured in the foregoing three different resource configuration modes. As shown in FIG. 5, when a resource configuration mode corresponding to Formula 1 is used for configuration, the starting subcarrier of the sounding region may be the starting subcarrier of the BWP, that is, when $k_{TC}^{(p)}$ is not considered, the offset is 0; when a resource configuration mode corresponding to Formula 2 is used for configuration, the last subcarrier of the sounding region may be the last subcarrier of the BWP, that is, when $k_{TC}^{(p)}$ is not considered, the offset is the bandwidth difference between the sounding region and the BWP; when a resource configuration mode corresponding to Formula 3 is used for configuration, the sounding region is in the middle of the BWP, and an offset between the sounding region and each of two ends of the BWP is half of the bandwidth difference between the sounding region and the BWP.

The terminal device may still obtain the index value of the predefined resource configuration mode by using the foregoing Method 1 and Method 2.

Specifically, in Method 1, the foregoing Formula 1, Formula 2, and Formula 3 are used as an example, and are respectively corresponding to an index value K=0, an index value K=1, and an index value K=2.

$$\overline{k}_0^{(p)} = (N_{RB}^{UL} - m_{SRS,b} \Pi_{b'=0}^{b} N_{b'}) N_{SC}^{RB} + k_{TC}^{(p)} \text{ corresponds to } K=0; \quad \text{Formula 1:}$$

$$\overline{k}_0^{(p)} = k_{TC}^{(p)} \text{ corresponds to } K=1; \text{ and} \quad \text{Formula 2:}$$

$$\overline{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}. \quad \text{Formula 3:}$$

Three resource configuration modes corresponding to K=0, K=1, and K=2 may be shown in the example in FIG. 5.

Therefore, the network device only needs to indicate a value of K in the first information, so that the terminal device can determine which one of the foregoing formulas is used to determine the location of the starting subcarrier for transmitting the SRS.

In Method 2, the index number of the predefined resource configuration mode may be determined by the network device and the terminal device based on either the system frame number or the slot number.

The following describes in detail how to determine the index value of the predefined resource configuration mode based on the system frame number or the slot number.

1. The index value of the predefined resource configuration mode is determined based on the system frame number $n_f$.

For example, the index value K=mod($n_f$, 3) may be defined, where mod( ) indicates a modulo operation. When mod($n_f$, 3)=0, K=0, and $\overline{k}_0^{(p)}$ is determined according to Formula 1; when mod($n_f$, 3)=1, K=1, and $\overline{k}_0^{(p)}$ is determined according to Formula 2; when mod($n_f$, 3)=2, K=2, and $\overline{k}_0^{(p)}$ is determined according to Formula 3.

2. The index value of the predefined resource configuration mode is determined based on the slot number $n_s$.

For example, the index value K=mod($n_s$, 3) may be defined. When mod($n_s$, 3)=0, K=0, and $\overline{k}_0^{(p)}$ is determined according to Formula 1; when mod($n_s$, 3)=1, K=1, and $\overline{k}_0^{(p)}$ is determined according to Formula 2; when mod($n_s$, 3)=2, K=2, and $\overline{k}_0^{(p)}$ is determined according to Formula 3.

Therefore, based on the foregoing technical solution, the network device may receive, on the entire BWP, the SRS sent by the terminal device, that is, may perform channel measurement on the entire BWP, to perform resource scheduling. In addition, a possibility of placing a PUCCH on two sides of the BWP is further considered in this design, and an SRS resource may be configured according to Formula 3, so that the sounding region is in the middle of the BWP, thereby improving resource utilization.

In still another possible design, to reduce modification on an existing LTE protocol, this application does not exclude a possibility that a bandwidth size of a sounding region defined in LTE is still used. That is, reference may be made to bandwidth sizes of sounding regions that are not corresponding to different $C_{SRS}$ in Table 1. For example, the sounding regions may be 96 RBs, 80 RBs, 72 RBs, 64 RBs, 60 RBs, and 48 RBs. Sounding regions corresponding to different $B_{SRS}$ in the case of same $C_{SRS}$ may be the same. Therefore, this application further provides formulas that are in a one-to-one correspondence with the plurality of resource configuration modes.

Optionally, the plurality of formulas may include:

$$\overline{k}_0^{(p)} = k_{TC}^{(p)}; \text{ and} \qquad \text{Formula 2:}$$

$$\overline{k}_0^{(p)} = (N_{RB}^{UL} - m_{SRS,0}^{max})N_{SC}^{RB} + k_{TC}^{(p)}. \qquad \text{Formula 4:}$$

$\overline{k}_0^{(p)}$ indicates the offset, $N_{RB}^{UL}$ indicates a quantity of resource blocks RB included in the transmission bandwidth of the BWP of the terminal device, $\lfloor \bullet \rfloor$ indicates rounding down, $m_{SRS,0}^{max}$ indicates a maximum value of $m_{SRS,0}$, $m_{SRS,0}$ indicates a quantity of RBs included in the sounding region, $N_{SC}^{RB}$ indicates a quantity of subcarriers included in each RB, and $k_{TC}^{(p)}$ is used to determine a comb mapping location.

Therefore, if $k_{TC}^{(p)}$ is not considered, the offset corresponding to Formula 2 is zero, and the offset corresponding to Formula 4 is the bandwidth difference between the sounding region and the BWP.

In this design, the terminal device may still obtain, by using the foregoing Method 1 and Method 2, the index value used to indicate the predefined resource configuration mode, and the network device may still determine the index value of the predefined resource configuration mode by using the foregoing method based on at least one of the system frame number, the slot number, or the comb mapping location.

Specifically, for example, the foregoing formulas may be in a one-to-one correspondence with a plurality of index values.

$$\overline{k}_0^{(p)} = k_{TC}^{(p)} \text{ corresponds to } K=0; \text{ and} \qquad \text{Formula 2}$$

$$\overline{k}_0^{(p)} = (N_{RB}^{UL} - m_{SRS,0}^{max})N_{SC}^{RB} + k_{TC}^{(p)} \text{ corresponds to } K=1. \qquad \text{Formula 4}$$

It should be understood that a specific process of determining the index value of the predefined resource configuration mode based on the system frame number, the slot number, or the comb mapping location is similar to the foregoing specific process described with reference to Formula 1, Formula 2, and Formula 3. For brevity, detailed descriptions of the specific process are omitted herein.

Therefore, the bandwidth size of the sounding region in LTE is still used in the foregoing design, and the LTE protocol is modified relatively slightly. However, different offsets may be configured for different terminal devices by using the foregoing formulas, so that full-bandwidth transmission of an SRS can be implemented in the BWP, and uplink channel measurement and resource scheduling can be performed on full-bandwidth resources of the BWP. In addition, the network device may estimate CSI of a downlink channel by using channel reciprocity, to perform resource scheduling. Therefore, this design helps the network device schedule more resources, thereby improving resource utilization.

Alternatively, optionally, the plurality of formulas include:

$$\overline{k}_0^{(p)} = k_{TC}^{(p)}; \qquad \text{Formula 2:}$$

$$\overline{k}_0^{(p)} = (N_{RB}^{UL} - m_{SRS,0}^{max})N_{SC}^{RB} + k_{TC}^{(p)}; \text{ and} \qquad \text{Formula 4:}$$

$$\overline{k}_0^{(p)} = (\lfloor N_{RB}^{UL}/2 \rfloor - m_{SRS,0}/2)N_{SC}^{RB} + k_{TC}^{(p)}. \qquad \text{Formula 5:}$$

$\overline{k}_0^{(p)}$ indicates the offset, $N_{RB}^{UL}$ indicates a quantity of resource blocks RB included in the transmission bandwidth of the BWP of the terminal device, $\lfloor \bullet \rfloor$ indicates rounding down, $m_{SRS,0}$ indicates a quantity of RBs included in the sounding region, $N_{SC}^{RB}$ indicates a quantity of subcarriers included in each RB, and $k_{TC}^{(p)}$ is used to determine a comb mapping location.

Therefore, if $k_{TC}^{(p)}$ is not considered, the offset corresponding to Formula 2 is zero, the offset corresponding to Formula 4 is the bandwidth difference between the sounding region and the BWP, and the offset corresponding to Formula 5 is half of the bandwidth difference between the sounding region and the BWP.

In this design, the terminal device may still obtain, by using the foregoing Method 1 and Method 2, the index value used to indicate the predefined resource configuration mode, and the network device may still determine the index value of the predefined resource configuration mode by using the foregoing method based on at least one of the system frame number, the slot number, or the comb mapping location.

Specifically, for example, the foregoing formulas may be in a one-to-one correspondence with a plurality of index values.

$$\overline{k}_0^{(p)} = k_{TC}^{(p)} \text{ corresponds to } K=0; \qquad \text{Formula 2:}$$

$$\overline{k}_0^{(p)} = (N_{RB}^{UL} - m_{SRS,0}^{max})N_{SC}^{RB} + k_{TC}^{(p)} \text{ corresponds to } K=1; \text{ and} \qquad \text{Formula 4:}$$

$$\overline{k}_0^{(p)} = (\lfloor N_{RB}^{UL}/2 \rfloor - m_{SRS,0}/2)N_{SC}^{RB} + k_{TC}^{(p)} \text{ corresponds to } K=2. \qquad \text{Formula 5:}$$

It should be understood that a specific process of determining the index value of the predefined resource configuration mode based on the system frame number or the slot number is similar to the foregoing specific process described with reference to Formula 1, Formula 2, and Formula 3. For brevity, detailed descriptions of the specific process are omitted herein.

Therefore, in the foregoing design, the bandwidth size of the sounding region in LTE is still used, and full-bandwidth transmission of an SRS can be implemented in the BWP, to perform channel measurement and scheduling on full-bandwidth resources of the BWP. In addition, a possibility that a PUCCH may be configured on two sides of the BWP in NR is considered, thereby reducing idle resources and improving resource utilization.

The foregoing enumerates various possible implementations of determining the index value of the predefined resource configuration mode based on the comb mapping location, the system frame number, and the slot number. However, it should be understood that this shall not constitute any limitation on this application, and this application does not exclude a possibility of determining the index value based on a parameter other than the foregoing enumeration.

It should be understood that the foregoing correspondence between each of the foregoing formulas and an index value is merely an example for description, but shall not constitute any limitation on this application. For example, Formula 1 may correspond to an index value K=1, Formula 2 may correspond to an index value K=2, Formula 3 may correspond to an index value K=3, Formula 4 may correspond to an index value K=4, and Formula 5 may correspond to an index value K=5. A value of the index value is not limited in this application.

In NR, a possibility of configuring a PUCCH on two sides of the BWP is not excluded. Therefore, in this case, the network device expects to transmit an SRS in the middle of the BWP. In the BWP, if the sounding region is shifted towards either of the two sides of the BWP, for example, a location at which the sounding region in FIG. 4 or FIG. 5 is located when K=0 or 1, no SRS is transmitted on a part of bandwidth resources, and channel measurement or resource scheduling cannot be performed. Consequently, this part of resources may be idle and wasted. Therefore, this application further provides a reference signal sending and receiving method, to control the sounding region to be in the middle of the BWP.

Figure 6:
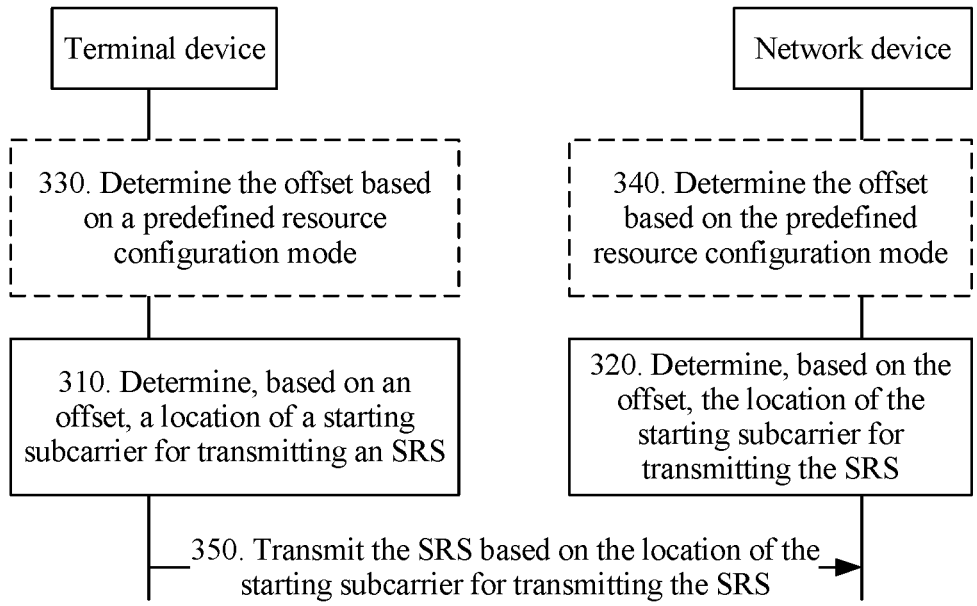
FIG. 6 is a schematic flowchart of a reference signal sending and receiving method according to another embodiment of this application.

FIG. 6 is a schematic flowchart of a reference signal sending and receiving method 300 according to another embodiment of this application from a perspective of device interaction. As shown in FIG. 6, the method 300 may include step 310 to step 350.

In step 310, a terminal device determines, based on an offset, a location of a starting subcarrier for transmitting an SRS.

In step 320, a network device determines, based on the offset, the location of the starting subcarrier for transmitting the SRS.

It should be understood that specific processes of step 310 and step 320 are similar to the specific processes of step 210 and step 220 in the method 200. For brevity, details are not described herein again.

It should be noted that in this embodiment of this application, the offset may be determined based on a predefined resource configuration mode.

In this embodiment of this application, the offset may be determined according to the following formula:

$$\bar{k}_0^{(p)}(\lfloor N_{RB}^{UL}/2 \rfloor - m_{SRS,b}\Pi_{b'=0}^{b}N_{b'}/2)N_{SC}^{RB} + k_{TC}^{(p)}.$$

It may be learned that the offset is half of a bandwidth difference between a sounding region and a BWP. In other words, the sounding region is in the middle of the BWP.

In still another possible design, to reduce modification on an existing LTE protocol, this application does not exclude a possibility that a bandwidth size of a sounding region defined in LTE is still used. That is, reference may be made to bandwidth sizes of sounding regions that are not corresponding to different $C_{SRS}$ in Table 1. For example, the sounding regions may be 96 RBs, 80 RBs, 72 RBs, 64 RBs, 60 RBs, and 48 RBs. Sounding regions corresponding to different $B_{SRS}$ in the case of same $C_{SRS}$ may be the same. Therefore, this application further provides the following formula for determining the offset:

$$\bar{k}_0^{(p)}(\lfloor N_{RB}^{UL}/2 \rfloor - m_{SRS,b}\Pi_{b'=0}^{b}N_{b'}/2)N_{SC}^{RB} + k_{TC}^{(p)}.$$

It may be learned that the offset is still half of the bandwidth difference between the sounding region and the BWP. In other words, the sounding region is in the middle of the BWP.

Optionally, the method 300 further includes step 330: The terminal device determines the offset based on a predefined resource configuration mode.

Correspondingly, the method further includes step 340: The network device determines the offset based on the predefined resource configuration mode.

It should be understood that specific processes of step 330 and step 340 is similar to the specific processes of step 240 and step 250 in the method 200, except that different resource configuration modes may be used. For brevity, detailed descriptions of the specific process are omitted herein.

After the terminal device and the network device determine the location of the starting subcarrier for transmitting the SRS, step 350 may be performed as follows: The terminal device sends the SRS based on the location of the starting subcarrier for transmitting the SRS.

Correspondingly, in step 350, the network device receives the SRS from the terminal device based on the location of the starting subcarrier for transmitting the SRS.

It should be understood that a specific process of step 350 may be the same as that in the prior art. For brevity, detailed descriptions of the specific process are omitted herein.

Therefore, based on the foregoing technical solution, the sounding region may be configured in the middle of the BWP, so that unused resources caused by shifting the sounding region towards either side of the BWP can be reduced, thereby improving resource utilization. In addition, unnecessary SRS sending can be reduced, thereby reducing power consumption.

This application further provides a reference signal sending and receiving method, to improve channel measurement precision and demodulation performance. With reference to FIG. 7 to FIG. 11, the following describes in detail the reference signal sending and receiving method provided in the embodiments of this application.

Figure 7:
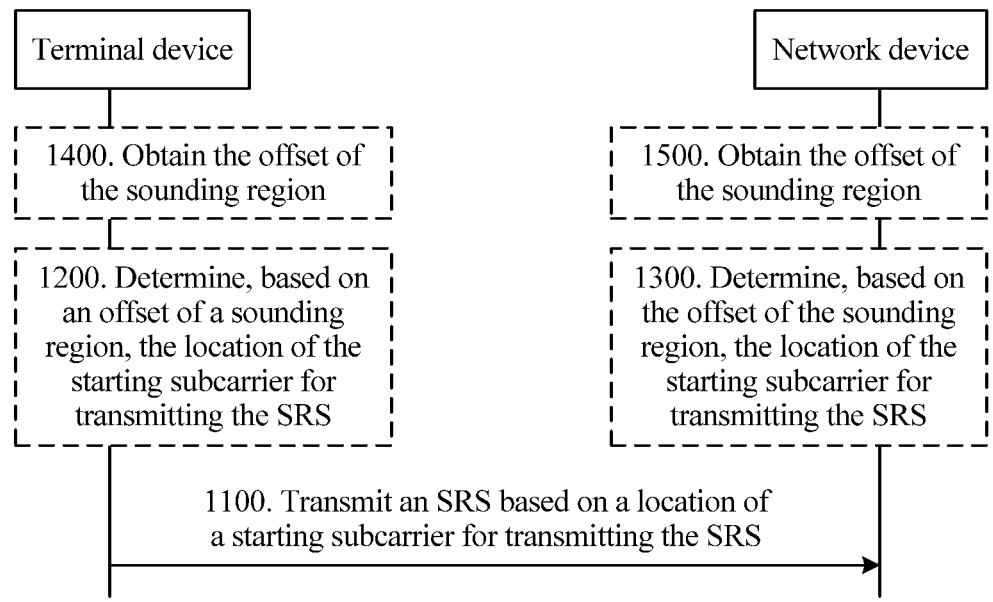
FIG. 7 is a schematic flowchart of a reference signal sending and receiving method according to still another embodiment of this application.

FIG. 7 is a schematic flowchart of a reference signal sending and receiving method 1000 according to still another embodiment of this application from a perspective of device interaction. Specifically, FIG. 7 shows a specific process of sending and receiving an uplink reference signal. In the method 1000 shown in FIG. 7, a terminal device may be, for example, any one of the terminal devices 104 to 114 in the communications system shown in FIG. 1, a network device may be, for example, the network device 102 in the communications system shown in FIG. 1, and the uplink reference signal may be, for example, an SRS. It should be understood that the terminal device may be any terminal device that is in a wireless communications system and that has a wireless connection relationship with the network device. In addition, the network device and a plurality of terminal devices that are in the wireless communications system and that have a wireless connection relationship may transmit a reference signal based on a same technical solution. It should be further understood that in this embodiment of this application, the SRS is used as an example of the uplink reference signal to describe the technical solution provided in this application. However, this shall not constitute any limitation on this application. This application does not exclude a possibility of defining another uplink reference signal in a future protocol to implement a same or similar function.

As shown in FIG. 7, the method 1000 may include step 1100 to step 1500. The following describes the steps of the method 1000 in detail.

In step 1100, the terminal device sends an SRS based on a location of a starting subcarrier for transmitting the SRS.

Correspondingly, in step 1100, the network device receives the SRS based on the location of the starting subcarrier for transmitting the SRS.

Herein, the starting subcarrier for transmitting the SRS may include a starting subcarrier for transmitting an SRS each time. It may be learned from the foregoing Table 2 that SRS transmission in a sounding region may be completed by using one or more SRS transmission opportunities. One time of SRS transmission herein may be understood as transmitting an SRS by using one SRS transmission opportunity.

The sounding region may be a resource that is configured for the terminal device to transmit the SRS, or the sounding region is transmission bandwidth that can be used to transmit the SRS. The sounding region may be understood as a region in which the terminal device performs channel sounding by using the SRS. The terminal device may transmit the SRS on a resource of the sounding region, to perform channel measurement.

Optionally, the method 1000 further includes step 1200: The terminal device determines, based on an offset of the sounding region, the location of the starting subcarrier for transmitting the SRS.

Correspondingly, the method 1000 further includes step 1300: The network device determines, based on the offset of the sounding region, the location of the starting subcarrier for transmitting the SRS.

In this embodiment of this application, the location of the starting subcarrier for transmitting the SRS may be predefined, for example, is defined in a protocol, or may be separately determined by the terminal device and the network device according to a predefined rule.

In a possible design, the network device and the terminal device may prestore a mapping relationship that may be used to determine the location of the starting subcarrier for transmitting the SRS. The mapping relationship may include a correspondence among the offset $\overline{k}_0^{(p)}$ of the sounding region, $$\sum_{b=0}^{B_{SRS}} K_{TC} M_{SC,b}^{RS} n_b, \text{ and } k_0^{(p)}.$$

A physical meaning of each parameter is described in detail above. For brevity, details are not described herein again. If the terminal device determines $\overline{k}_0^{(p)}$ and $$\sum_{b=0}^{B_{SRS}} K_{TC} M_{SC,b}^{RS} n_b,$$

the terminal device may directly determine $k_0^{(p)}$ based on the foregoing correspondence. For example, a two-dimensional mapping table may be prestored in the network device and the terminal device. A horizontal axis of the two-dimensional mapping table may be, for example, $\overline{k}_0^{(p)}$, and a vertical axis may be, for example, $$\sum_{b=0}^{B_{SRS}} K_{TC} M_{SC,b}^{RS} n_b.$$

An intersection point of $\overline{k}_0^{(p)}$ and $$\sum_{b=0}^{B_{SRS}} K_{TC} M_{SC,b}^{RS} n_b$$

in the two-dimensional mapping table is $k_0^{(p)}$, in other words, $\overline{k}_0^{(p)}$ and $$\sum_{b=0}^{B_{SRS}} K_{TC} M_{SC,b}^{RS} n_b$$

may be jointly used to indicate $k_0^{(p)}$. Each of $\overline{k}_0^{(p)}$, $B_{SRS}$, $C_{SRS}$, and a higher layer parameter $n_{RRC}$ for determining $n_b$ may be indicated by the network device, and a value of $$\sum_{b=0}^{B_{SRS}} K_{TC} M_{SC,b}^{RS} n_b$$

may be determined based on the parameters indicated by the network device. Therefore, after determining the foregoing parameters, the network device may determine $k_0^{(p)}$ based on the two-dimensional mapping table, and indicate the foregoing parameters to the terminal device, so that the terminal device determines $k_0^{(p)}$ based on the two-dimensional mapping table. It should be understood that a specific process of determining $$\sum_{b=0}^{B_{SRS}} K_{TC} M_{SC,b}^{RS} n_b$$

is described in detail above with reference to a formula. For brevity, details are not described herein again.

In this design, $\overline{k}_0^{(p)}$ may be understood as an index value. The network device and the terminal device may determine a value of $k_0^{(p)}$ based on the prestored mapping relationship. In other words, $k_0^{(p)}$ may be determined based on $\overline{k}_0^{(p)}$.

It should be understood that the foregoing two-dimensional mapping table is merely a possible implementation, but shall not constitute any limitation on this application. A specific method for predefining $k_0^{(p)}$ is not limited in this application.

In this embodiment of this application, the location of the starting subcarrier for transmitting the SRS may be alternatively calculated by the terminal device according to a predefined formula, for example, may be calculated according to the foregoing described formula $$k_0^{(p)} = \overline{k}_0^{(p)} + \sum_{b=0}^{B_{SRS}} K_{TC} M_{SC,b}^{RS} n_b.$$

The specific parameters (for example, $\overline{k}_0^{(p)}$, $B_{SRS}$, $C_{SRS}$, and the higher layer parameter $n_{RRC}$ for determining $n_b$) that are used to determine $k_0^{(p)}$ may be indicated by the network device.

In conclusion, the location $k_0^{(p)}$ of the starting subcarrier for transmitting the SRS may be determined based on $\overline{k}_0^{(p)}$.

Optionally, the method 1000 further includes step 1400: The terminal device obtains the offset of the sounding region.

Correspondingly, the method 1000 further includes step 1500: The network device obtains the offset of the sounding region.

In this embodiment of this application, the offset may be predefined, for example, is defined in a protocol, or may be separately determined by the network device and the terminal device according to a predefined rule. A manner of obtaining the offset is not limited in this application.

Regardless of whether the offset is defined in the protocol or is separately determined by the network device and the terminal device according to the predefined rule, the offset may meet either of the following formulas:

$$\bar{k}_0^{(p)} = k_s^{(p)} N_{SC}^{RB} + k_{TC}^{(p)}; \text{ and} \qquad \text{Formula 6:}$$

$$\bar{k}_0^{(p)} = (nk_r^{(p)} + K_\Delta) N_{SC}^{RB} + k_{TC}^{(p)}. \qquad \text{Formula 7:}$$

The predefined rule may include either of the foregoing formulas.

The following separately describes Formula 6 and Formula 7 in detail with reference to the accompanying drawings.

It should be noted that, for ease of understanding, in the accompanying drawings (including FIG. 8 to FIG. 11) described below, uplink system bandwidth is shown at a granularity of an RB group (RBG). Each RB group includes n (where n is a positive integer) RBs, and a value of n is 4, 8, 16, or the like. It may be understood that n=0 indicates that no resource is configured. However, it should be understood that a size of the system bandwidth is not necessarily an integer multiple of 4 RBs, and the size of the system bandwidth is not limited in this application. It should be further understood that bandwidth of a BWP of the terminal device is not necessarily an integer multiple of 4 RBs, and a quantity of RBs between an RB on which a starting subcarrier of the BWP of the terminal device is located (referred to as a starting RB of the BWP below for ease of description) and a starting RB of the system bandwidth is not necessarily an integer multiple of 4 either. In addition, in each of the schematic diagrams shown in FIG. 8 to FIG. 11, it is assumed that the system bandwidth is 31 RBs, and RB numbers in the system bandwidth are successively arranged from top to bottom starting from 0 to 30, where n=4. It should be understood that, the RB numbers in the system bandwidth are shown in the figure only for ease of understanding. However, this shall not constitute any limitation on this application. In this application, an RB numbering rule in the system bandwidth and an RB numbering rule in the BWP are not limited. For example, alternatively, the RB numbers in the system bandwidth may be successively arranged from bottom to top starting from 0 to 30.

In Formula 6, $\bar{k}_0^{(p)}$ is the offset of the sounding region and is used to indicate a resource offset between a starting subcarrier of the sounding region and a starting subcarrier of transmission bandwidth of the BWP, and $k_s^{(p)}$ indicates a quantity of RBs between an RB on which the starting subcarrier of the sounding region is located (referred to as a starting RB of the sounding region below for ease of description) and a starting RB of the transmission bandwidth of the BWP. It may be understood that when a number of the starting RB of the transmission bandwidth of the BWP is 0, $k_s^{(p)}$ may indicate a number of the RB on which the starting subcarrier of the sounding region is located.

In this embodiment of this application, $k_s^{(p)}$ is any value in [0, $N_{RB}^{UL} - N_{RB}^{SR}$], and $k_s^{(p)}$ is an integer. $N_{RB}^{UL}$ indicates a quantity of RBs included in the transmission bandwidth of the BWP of the terminal device, and $N_{RB}^{SR}$ indicates a quantity of RBs included in the sounding region. It may be understood that in some cases, $N_{RB}^{SR}$ may be a quantity of RBs included in a first-level sounding region, namely, $m_{SRS,0}$.

Figure 8:
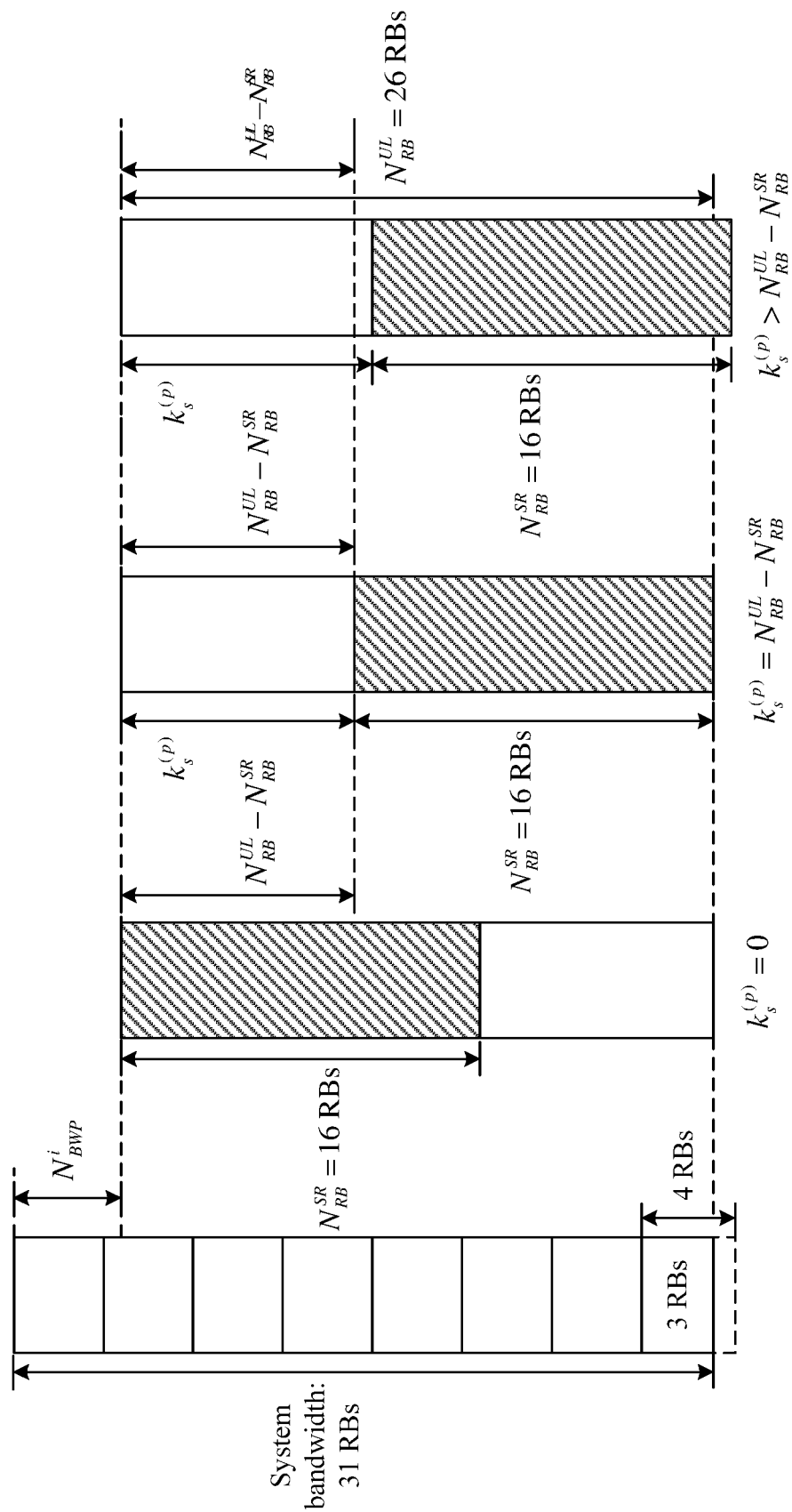
FIG. 8 is a schematic diagram of sounding regions corresponding to different values of $k_s^{(p)}$.

FIG. 8 is a schematic diagram of sounding regions corresponding to different values of $k_s^{(p)}$. As shown in the figure, it is assumed that the sounding region is 16 RBs, and the bandwidth of the BWP is 26 RBs. When $k_s^{(p)}=0$, the starting subcarrier of the sounding region of the terminal device is the starting subcarrier of the BWP, namely, a lower limit of a frequency band corresponding to the BWP; when $k_s^{(p)} = N_{RB}^{UL} - N_{RB}^{SR}$, the last subcarrier of the sounding region of the terminal device is the last subcarrier of the BWP, namely, an upper limit of the frequency band corresponding to the BWP; when $k_s^{(p)} > N_{RB}^{UL} - N_{RB}^{SR}$, the sounding region of the terminal device exceeds a range of the frequency band corresponding to the BWP.

The BWP of the terminal device is UE-specific, and may be only a part of frequency band of the system bandwidth. If the sounding region of the terminal device exceeds a bandwidth range of the BWP of the terminal device, channel measurement accuracy may be reduced.

Therefore, it may be learned that $k_s^{(p)}$ is any integer value in [0, $N_{RB}^{UL} - N_{RB}^{SR}$]. A value of $k_s^{(p)}$ is limited, so that the sounding region of the terminal device can be controlled within the range of the BWP of the terminal device. In this way, a problem that channel measurement accuracy is reduced because the SRS cannot be totally mapped to the BWP can be avoided, thereby improving demodulation performance.

Optionally, $k_s^{(p)}$ meets $\text{mod}[(k_s^{(p)} + N_{BWP}^i), n] = \Delta$, $\Delta$ belongs to [0, n−1], and $\Delta$ is an integer.

$N_{BWP}^i$ indicates a quantity of RBs between the starting RB of the BWP of the terminal device and the starting RB of the system bandwidth. Optionally, if the value of n is 4, $k_s^{(p)}$ meets $\text{mod}[(k_s^{(p)} + N_{BWP}^i), n] = \Delta$, where $\Delta = 0, 1, 2,$ or 3.

In some cases, physical resources for transmitting an SRS by two or more terminal devices in a same cell or two or more antenna ports configured in a same terminal device may overlap. For example, part of bandwidth of BWPs of the two or more terminal devices or the two or more antenna ports overlap, and a same comb parameter is configured for the two or more terminal devices or the two or more antenna ports. In this case, it is expected that an overlapping region of physical resources for transmitting an SRS by any two terminal devices or antenna ports that have a same SRS transmission resource is greater than or equal to n RBs.

Optionally, in terminal devices in a same cell that are configured with a same comb parameter, if resources for transmitting an SRS by at least two terminal devices overlap, a value obtained by performing a modulo operation on n by using a quantity of RBs between an RB on which a starting subcarrier for transmitting an SRS (referred to as a starting RB for transmitting the SRS below for ease of description) by each of any two of the at least two terminal devices is located and the starting RB of the system bandwidth is the same, where n>1, and n is an integer.

It may be learned from the foregoing description that $k_0^{(p)}$ may be determined based on $\bar{k}_0^{(p)}$, and because resources for transmitting an SRS each time is an integer multiple of n RBs, with reference to Formula 6, performing a modulo operation on n by using a quantity of RBs between the starting RB for transmitting the SRS and the starting RB of the system bandwidth may be represented by performing a modulo operation on n by using a quantity of RBs between the starting RB of the sounding region and the starting RB of the system bandwidth, that is, a calculation formula $\text{mod}[(k_s^{(p)} + N_{BWP}^i), n]$ is obtained. A value of $\text{mod}[(k_s^{(p)} + N_{BWP}^i), n]$ may be denoted as $\Delta$, $\Delta$ belongs to [1, n−1], and $\Delta$ is an integer.

In other words, if two or more terminal devices in a same cell meet a condition (1) in which a same comb parameter is configured and a condition (2) in which resources for transmitting an SRS overlap, a quantity of RBs between a corresponding RB that is in the system bandwidth and to which a starting subcarrier for transmitting an SRS by each of the two or more terminal devices is mapped and the starting RB of the system bandwidth may correspond to a same value of $\mod[(k_s^{(p)}+N_{BWP}^i),n]$.

Optionally, a quantity of RBs between a corresponding RB that is in the system bandwidth and to which a starting subcarrier for transmitting an SRS by each of any two antenna ports in a same terminal device that are configured with a same comb parameter is mapped and the starting RB of the system bandwidth corresponds to a same value of $\mod[(k_s^{(p)}+N_{BWP}^i),n]$, where n>1, and n is an integer.

In other words, if two or more antenna ports in a same terminal device meet the condition (1) in which a same comb parameter is configured and the condition (2) in which resources for transmitting an SRS overlap, a quantity of RBs between a starting RB for transmitting an SRS by each of the two or more antenna ports and the starting RB of the system bandwidth may correspond to a same value of $\mod[(k_s^{(p)}+N_{BWP}^i), n]$.

A comb parameter may be used to determine a comb mapping location, and may be represented by $k_{TC}^{(p)}$. A specific meaning of the comb parameter is described in detail above with reference to FIG. 3. For brevity, details are not described herein again. $k_s^{(p)}$ indicates a quantity of RBs between a corresponding RB that is in the system bandwidth and to which the starting subcarrier of the sounding region is mapped (referred to as the starting RB of the sounding region below for ease of description) and the starting RB of the system bandwidth, and may be used to determine the starting subcarrier of the sounding region. $N_{BWP}^i$ indicates a quantity of RBs between the starting RB of the BWP and the starting RB of the system bandwidth, n>1, and n is an integer.

In other words, if two terminal devices or antenna ports meet only the condition (1) or the condition (2), the value of $\mod[(k_s^{(p)})+N_{BWP}^i),n]$ is configurable. For example, for any two terminal devices or antenna ports that meet the condition (2), values of Δ that are in a one-to-one correspondence with different comb parameters may be configured, and the different comb parameters may correspond to different values of Δ.

It should be noted that, a starting subcarrier used by the terminal device to transmit an SRS each time can meet the foregoing limitation on $k_s^{(p)}$, in other words, a starting subcarrier used by the terminal device to transmit an SRS by using each SRS transmission opportunity can meet the foregoing limitation on $k_s^{(p)}$.

Optionally, the value of n is 4. In this case, the values of Δ may include 0, 1, 2, and 3.

That is, for terminal devices or antenna ports that are configured with a same comb parameter, Δ may be definite. In a possible design, a correspondence between Δ and a comb parameter may be predefined, for example, is defined in a protocol. Using n=4 as an example, the values of Δ may include 0, 1, 2, and 3. When four comb parameters are configured in a same cell, that is, comb4, one value of Δ may be correspondingly configured for each comb parameter. For example, Δ may be configured as 0 for a first comb parameter; Δ may be configured as 1 for a second comb parameter; Δ may be configured as 2 for a third comb parameter; Δ may be configured as 3 for a fourth comb parameter. When two comb parameters are configured in a same cell, that is, comb2, different values of Δ may be configured, based on different system frame numbers, subframe numbers, or slots, for terminal devices or antenna ports that are configured with a same comb parameter. For example, in the first slot, Δ may be configured as 0 for a first comb parameter, and Δ may be configured as 1 for a second comb parameter; in the second slot, Δ may be configured as 2 for a first comb parameter, and Δ may be configured as 3 for a second comb parameter. It should be understood that, the correspondence between a comb parameter and Δ is enumerated herein only for ease of understanding, but shall not constitute any limitation on this application.

Because of the foregoing described limitation on $k_s^{(p)}$, starting RBs for transmitting an SRS by a plurality of terminal devices or antenna ports that are configured with a same comb parameter and that have overlapping resources for transmitting the SRS (in other words, meeting the condition (1) and the condition (2)) overlap, or an offset is an integer multiple of 4 RBs. This can ensure that when terminal devices or antenna ports that are configured with a same comb parameter send an SRS by using a same physical resource, a resource overlapping region of the terminal devices or antenna ports can be greater than or equal to 4 RBs.

When any two terminal devices in a same cell meet both the condition (1) and the condition (2), or when any two antenna ports in a same terminal device meet both the condition (1) and the condition (2), it is usually advantageous to ensure that a resource overlapping region for transmitting an SRS is greater than or equal to 4 RBs. For example, in some cases, resource scheduling flexibility can be improved.

For example, in some communications systems, for example, in 5G NR, if the terminal device sends a reference signal such as an SRS in the bandwidth of the BWP by using a plurality of antenna ports that are configured with a same comb parameter, time domain resources used by the plurality of antenna ports to send the reference signal may overlap, and interference can be reduced in a code division multiplexing (CDM) manner. In addition, in the system bandwidth, bandwidth of BWPs of a plurality of terminal devices may also overlap, in other words, time-frequency resources used by different terminal devices to send a reference signal may also overlap, and interference can be reduced in a CDM manner, thereby improving resource utilization.

When receiving a reference signal from the terminal device, a receive end device (for example, the network device) may separately perform channel measurement on the received reference signal based on a resource overlapping part and a resource non-overlapping part. It may be learned from a simulation experiment that when the resource overlapping part is greater than or equal to 4 RBs, channel measurement accuracy is greatly improved, and better demodulation performance can be achieved. Therefore, it is expected that the resource overlapping part can be controlled greater than 4 RBs.

It should be noted that although the example in which the value of n is 4 is provided in this application, this shall not constitute any limitation on this application. The value of n is not limited in this application. As long as channel measurement accuracy can be improved to improve demodulation performance, this application does not exclude a possibility of defining the value of n as another value.

Considering that bandwidth of a sounding region of an SRS is specified as an integer multiple of 4 RBs in a current standard, in this embodiment of this application, starting RBs for transmitting an SRS by any two terminal devices in a same cell that meet the condition (1) and the condition (2) or any two antenna ports in a same terminal device that meet the condition (1) and the condition (2) may be controlled to be at a same RB location or a location whose offset is an integer multiple of 4 RBs, so that a possibility that frequency domain resources used by different terminal devices in a same cell to transmit an SRS have an overlapping region of 4 RBs or more than 4 RBs can be greatly improved, or a possibility that frequency domain resources of an SRS that are corresponding to different antenna ports in a same terminal device have an overlapping region of 4 RBs or more than 4 RBs can be greatly improved, thereby improving SRS resource scheduling flexibility and improving resource utilization.

Figure 9:
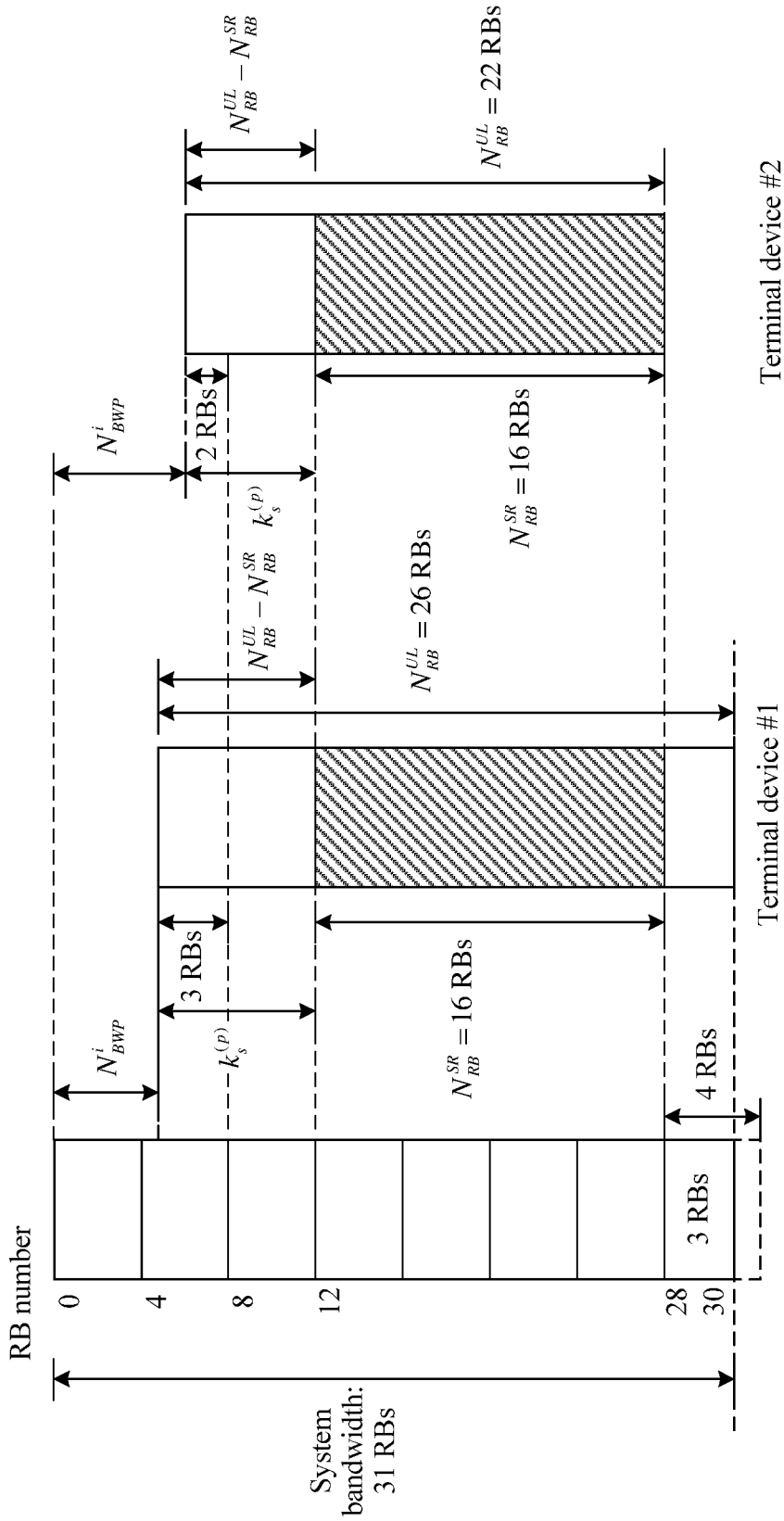
FIG. 9 is a schematic diagram of system bandwidth, and BWP bandwidth and sounding regions of different terminal devices according to an embodiment of this application.

FIG. 9 is a schematic diagram of system bandwidth, and BWP bandwidth and sounding regions of different terminal devices according to an embodiment of this application. As shown in the figure, bandwidth of a BWP of a terminal device (for example, denoted as a terminal device #1) is 26 RBs, and bandwidth of a BWP of another terminal device (for example, denoted as a terminal device #2) is 22 RBs. Both a sounding region of the terminal device #1 and a sounding region of the terminal device #2 are 16 RBs, and resources for transmitting an SRS by the terminal device #1 and the terminal device #2 overlap.

It may be learned that neither the system bandwidth nor the bandwidth of the BWPs of the two terminal devices is an integer multiple of 4. If it is required to ensure that resources of the sounding region of the terminal device are an integer multiple of 4 RBs, and it is also expected to ensure that an overlapping region of resources used by the two terminal devices to transmit an SRS is greater than or equal to 4 RBs, starting locations for transmitting an SRS by the two terminal devices may be the same. For example, an offset between a starting RB for transmitting an SRS and a starting RB of the system bandwidth is an integer multiple of 4 RBs, and the starting RB for transmitting the SRS may correspond to a location of an RB 12 in the system bandwidth in the figure, or a location of an RB 8 in the system bandwidth.

In addition, it may also be learned that if a bottom of the system bandwidth shown in FIG. 9 is aligned with a bottom of the bandwidth of the BWP of the terminal device #1, the last three RBs at the bottom of the system bandwidth in the figure are always undetected. This is because a same value of Δ needs to be ensured for the terminal device #1 and the terminal device #2. However, when a starting RB of the sounding region is the RB 12 in the system bandwidth, the sounding region of the terminal device #2 reaches the bottom of the BWP, and cannot be shifted downwards, that is, the sounding region of the terminal device #2 cannot be shifted downwards by changing the value of Δ. To ensure the same value of Δ as the terminal device #2, the sounding region of the terminal device #1 may be shifted downwards by 4 RBs. However, if the sounding region of the terminal device #1 is shifted downwards by 4 RBs, the sounding region of the terminal device #1 may also exceed a range of the BWP. Therefore, the sounding region of the terminal device #1 cannot be shifted downwards either, and consequently some resources in the system bandwidth are always undetected. It may be understood that, because it is required to ensure that a size of the sounding region is an integer multiple of 4 RBs, a case in which some terminal resources in the system bandwidth are always undetected usually occurs when the system bandwidth is not an integer multiple of 4 RBs. Because channel measurement cannot be performed on some resources in the system bandwidth, accurate channel state information cannot be obtained, and it is likely that the network device does not schedule a resource on which channel measurement is not performed. In this case, system resource utilization probably cannot be maximized.

However, if a terminal device (for example, denoted as a terminal device #3) that is configured with another comb parameter (that is, different from a comb parameter configured for the terminal device #1) and that overlaps with the BWP of the terminal device #1 exists in a same cell, Δ of the terminal device #3 may be set to enable resources for transmitting an SRS by the terminal device #3 to cover the three RBs at the bottom of the system bandwidth. In other words, the network device may implement full-bandwidth measurement of the system bandwidth by configuring different values of Δ for terminal devices that are configured with different comb parameters.

Figure 10:
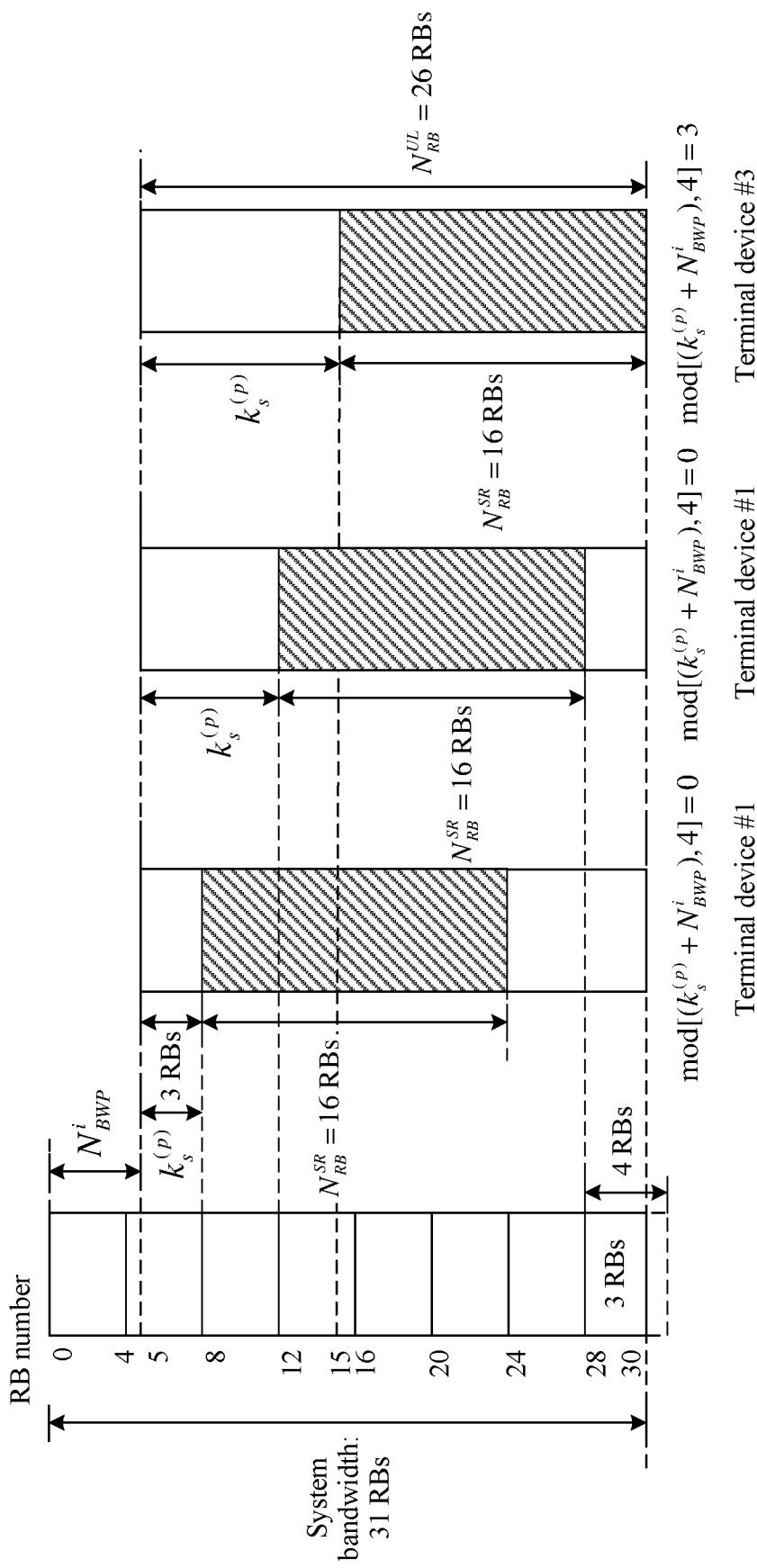
FIG. 10 is a schematic diagram of system bandwidth, BWP bandwidth, and sounding regions corresponding to different values of $\Delta$ according to an embodiment of this application.

FIG. 10 is a schematic diagram of system bandwidth, BWP bandwidth, and sounding regions corresponding to different values of Δ according to an embodiment of this application. As shown in the figure, it is assumed that bandwidth of a BWP of each terminal device is 26 RBs, and a size of each sounding region is 16 RBs. A resource offset between a starting RB of the BWP of the terminal device and a starting RB of the system bandwidth may be represented by $N_{BWP}^i$, and a sum of $N_{BWP}^i$ and $k_s^{(p)}$ may exactly be combined to form a continuous region. An RB occupied by the continuous region corresponding to any two terminal devices or any two antenna ports that are configured with a same comb parameter meets $mod[(k_s^{(p)}++N_{BWP}^i), n]=\Delta$. A value of n in FIG. 10 is 4.

In the figure, $k_s^{(p)}$ of a terminal device #1 meets $mod[(k_s^{(p)}+N_{BWP}^i), n]=0$. It may be learned that a starting RB of a sounding region of the terminal device #1 may be an RB 8 or an RB 12 in the system bandwidth. The figure shows a case in which the starting RB of the sounding region corresponds to the RB 8 or the RB 12 in the system bandwidth. If $k_s^{(p)}$ of a terminal device #3 meets $mod[(k_s^{(p)}+N_{BWP}^i), n]=3$ a starting RB of a sounding region of the terminal device #3 may be an RB 7 in the system bandwidth, an RB 11 in the system bandwidth, or an RB 15 in the system bandwidth. It may be learned that when the starting RB of the sounding region of the terminal device #3 is the RB 15 in the system bandwidth, three RBs at the bottom of the system bandwidth can be exactly detected. In this case, the network device may perform full-bandwidth channel measurement on the system bandwidth.

Therefore, when terminal devices or antenna ports that are configured with different comb parameters correspond to different values of Δ in 0, 1, 2, and 3, it is highly likely that sounding regions of different terminal devices or different antenna ports can be flexibly configured in an interval between the RB 8 and an RB 30. To implement full-bandwidth measurement, the network device may determine a value of Δ based on relative locations of sounding regions of a plurality of terminal devices or antenna ports in the system bandwidth.

For any two terminal devices or antenna ports that are configured with a same comb parameter, if starting locations for transmitting an SRS can be controlled to be at a same RB or a location whose offset is an integer multiple of 4 RBs, it can be largely ensured that frequency domain resources used by the two terminal devices or antenna ports to transmit the SRS have an overlapping region of 4 RBs or more than 4 RBs. For example, when a value of K in the figure is 0, for two terminal devices that have a same comb parameter, a starting RB of a sounding region of a terminal device may be the RB 8 shown in the figure, and a starting RB of a sounding region of the other terminal device may be the RB 12 or the RB 8. In this case, an overlapping region of the sounding regions of the two terminal devices includes at least 12 RBs, and a condition that the overlapping region is greater than or equal to 4 RBs is met.

It should be understood that, for ease of understanding, the foregoing describes in detail the limitation on the value of $\Delta$ with reference to FIG. 10. However, this shall not constitute any limitation on this application. In the figure, BWP bandwidth of the terminal device #1 and BWP bandwidth of the terminal device #3 may be different, and sizes of the sounding regions of the terminal device #1 and the terminal device #3 may also be different. BWP bandwidth and a sounding region size of a terminal device are not limited in this application.

Therefore, the value of $k_s^{(p)}$ is further limited by configuring $\Delta$, so that terminal devices or antenna ports that are configured with different comb parameters can send an SRS on different frequency bands of the system bandwidth, and it is possible for the network device to implement full-bandwidth measurement, thereby improving data transmission performance of the entire bandwidth, and improving resource utilization and resource scheduling flexibility.

Optionally, the method further includes: sending, by the network device, indication information of a value of $k_s^{(p)}$, where the indication information indicates a value of $k_s^{(p)}$.

Correspondingly, the method further includes: receiving, by the terminal device, the indication information of a value of $k_s^{(p)}$, where the indication information indicates the value of $k_s^{(p)}$.

Based on the foregoing limitation on the value of $k_s^{(p)}$, the network device may determine the value of $k_s^{(p)}$, and send the indication information to the terminal device to indicate the value of $k_s^{(p)}$. Therefore, both the network device and the terminal device may determine $\overline{k}_0^{(p)}$ according to Formula 6 based on a same value of $k_s^{(p)}$, to determine $k_0^{(p)}$.

Optionally, the indication information of $k_s^{(p)}$ is carried in higher layer signaling. The higher layer signaling may include, for example, an RRC message or a MAC-CE.

It should be understood that the signaling for carrying the indication information of $k_s^{(p)}$ herein is merely an example for description, but shall not constitute any limitation on this application. For example, the indication information of $k_s^{(p)}$ may be alternatively carried in the MAC-CE.

It should be noted that the foregoing value of $k_s^{(p)}$ may be configured at a UE level or a port level, and the terminal device may be notified by using signaling corresponding to a configuration level. This is not limited in this application.

Optionally, the method further includes: sending, by the network device, indication information of a value of $N_{BWP}^i$, where the indication information indicates a value of $N_{BWP}^i$.

Correspondingly, the method further includes: receiving, by the terminal device, the indication information of a value of $N_{BWP}^i$, where the indication information indicates the value of $N_{BWP}^i$.

The network device indicates the value of $N_{BWP}^i$ to the terminal device, so that the terminal device determines a location of the BWP in the system bandwidth based on the value of $N_{BWP}^i$.

In Formula 7, $nk_r^{(p)}+K_\Delta$ indicates a quantity of RBs between a corresponding RB that is in the system bandwidth and to which the starting subcarrier of the sounding region is mapped and the starting RB of the system bandwidth. $N_{BWP}^i+K_\Delta$ indicates a quantity of RBs between the starting RB of the sounding region and the starting RB of the system bandwidth. Specifically, $K_\Delta$ belongs to [0, n−1], and $K_\Delta$ is an integer. $4k_r^{(p)}$ may indicate a range of a starting RB of a mappable location of the sounding region, in other words, a range of resources available to the starting subcarrier of the sounding region.

It may be understood that when a number of the starting RB of the system bandwidth is 0, $nk_r^{(p)}+K_\Delta$ may indicate a number of the corresponding RB that is in the system bandwidth and to which the starting subcarrier of the sounding region is mapped.

Optionally, the value of n is 4.

It may be learned that $nk_r^{(p)}$ in Formula 7 and $k_s^{(p)}$ in Formula 6 meet the following relationship: $nk_r^{(p)}+K_\Delta=k_s^{(p)}$. Different from Formula 6, a value of $K_\Delta$ is directly configured in Formula 7.

In Formula 7, a value of $nk_r^{(p)}+K_\Delta$ may be controlled within a range of [0, $N_{RB}^{UL}-N_{RB}^{SR}$], and therefore a value of $k_r^{(p)}$ may be any value in [0, $\lfloor(N_{RB}^{UL}-N_{RB}^{SR}-K_\Delta)/]\rfloor$], to ensure that the sounding region of the terminal device does not exceed the bandwidth range of the BWP of the terminal device, thereby avoiding a problem that channel measurement accuracy is reduced because the sounding region exceeds the bandwidth of the BWP.

If the value of n is 4, an upper limit of the value of $k_r^{(p)}$ is $\lfloor(N_{RB}^{UL}-N_{RB}^{SR}-K_\Delta)/4\rfloor$. The value of $k_r^{(p)}$ is limited, so that the mappable location of the sounding region within the bandwidth range of the BWP is limited, to ensure that channel measurement can be performed within the bandwidth range of the BWP, thereby obtaining relatively high channel measurement accuracy and improving demodulation performance.

In other words, a region corresponding to $4k_r^{(p)}$ in the figure shows the range of resources available to the starting subcarrier of the sounding region of the terminal device. That is, when the RB that is in the system bandwidth and to which the starting subcarrier of the sounding region of the terminal device is mapped is in the region shown by $4k_r^{(p)}$ in the figure, relatively high channel measurement accuracy can be achieved.

In a possible case, the offset between the starting RB of the BWP of the terminal device and the starting RB of the system bandwidth is exactly an integer multiple of n, and the value of $K_\Delta$ is 0. In this case, $4k_r^{(p)}=N_{RB}^{UL}-N_{RB}^{SR}$.

Optionally, in terminal devices in a same cell that are configured with a same comb parameter, if resources for transmitting an SRS by at least two terminal devices overlap, a quantity of RBs between a corresponding RB that is in the system bandwidth and to which a starting subcarrier for transmitting an SRS (a starting RB for transmitting the SRS) by each of any two of the at least two terminal devices and the starting RB of the BWP corresponds to a same value of $\text{mod}[(nk_r^{(s)}+K_\Delta+N_{BWP}^i), n]$ where n>1, and n is an integer.

Because $\text{mod}(nk_r^{(p)}, n)=0$, the foregoing formula may be further transformed to $\text{mod}[(K_\Delta+N_{BWP}^i), n]$ A value of $\text{mod}[(K_\Delta+N_{BWP}^i), n]$ may be denoted as $\Delta$, $\Delta$ belongs to [1, n−1], and $\Delta$ is an integer.

In other words, if two or more terminal devices in a same cell meet both a condition (1) in which a same comb parameter is configured and a condition (2) in which resources for transmitting an SRS overlap, a quantity of RBs between the starting RB of the sounding region and the starting RB of the BWP corresponds to a same value of $\text{mod}[(K_\Delta+N_{BWP}^i), n]$.

Optionally, a quantity of RBs between a corresponding RB that is in the system bandwidth and to which a starting subcarrier for transmitting an SRS by each of any two antenna ports in a same terminal device that are configured with a same comb parameter is mapped and the starting RB of the system bandwidth corresponds to a same value of $\text{mod}[(K_\Delta+N_{BWP}^i), n]$ where n>1, and n is an integer.

In other words, if two or more antenna ports in a same terminal device meet the condition (1) in which a same comb parameter is configured and the condition (2) in which resources for transmitting an SRS overlap, a quantity of RBs between a starting RB for transmitting an SRS by each of the two or more antenna ports and the starting RB of the system bandwidth may correspond to a same value of $\mathrm{mod}[(K_A + N_{BWP}^i), n]$.

In addition, as described above with reference to FIG. 9, in some cases, a part of the system bandwidth may be always undetected, that is, the network device cannot perform full-bandwidth channel measurement on the system bandwidth, thereby affecting resource utilization of the system bandwidth. Therefore, the network device may configure different values of $\Delta$ for $\mathrm{mod}[(K_A + N_{BWP}^i), n]$ corresponding to terminal devices or antenna ports that are configured with different comb parameters.

It may be understood that, $N_{BWP}^i$ in the foregoing formula is configured by the system. If the value of $K_A$ is configurable, the different values of $\Delta$ may be configured for $\mathrm{mod}[(K_A + N_{BWP}^i), n]$ corresponding to the terminal devices or antenna ports that are configured with different comb parameters, where $K_A$ belongs to $[0, n-1]$, and $K_A$ is an integer.

Different from Formula 6, the value of $K_A$ is directly configured in Formula 7. However, it may be understood that, regardless of the value of $N_{BWP}^i$, as long as $K_A$ can be any value in $[0, n-1]$, it can be ensured that the value $\Delta$ of $\mathrm{mod}[(K_A + N_{BWP}^i), n]$ is any value in $[0, n-1]$.

It may be understood that when $K_A$ and $N_{BWP}^i$ are definite, the value of $\Delta$ may be the same or different from that of $K_A$. A relationship between $K_A$ and $\Delta$ is not limited in this application.

The network device may configure different $K_A$ for the terminal devices or antenna ports that are configured with different comb parameters, so that different terminal devices or antenna ports can send an SRS on different frequency bands of the system bandwidth, and it is possible for the network device to implement full-bandwidth measurement, thereby improving data transmission performance of the entire bandwidth, and improving resource utilization and resource scheduling flexibility.

Figure 11:
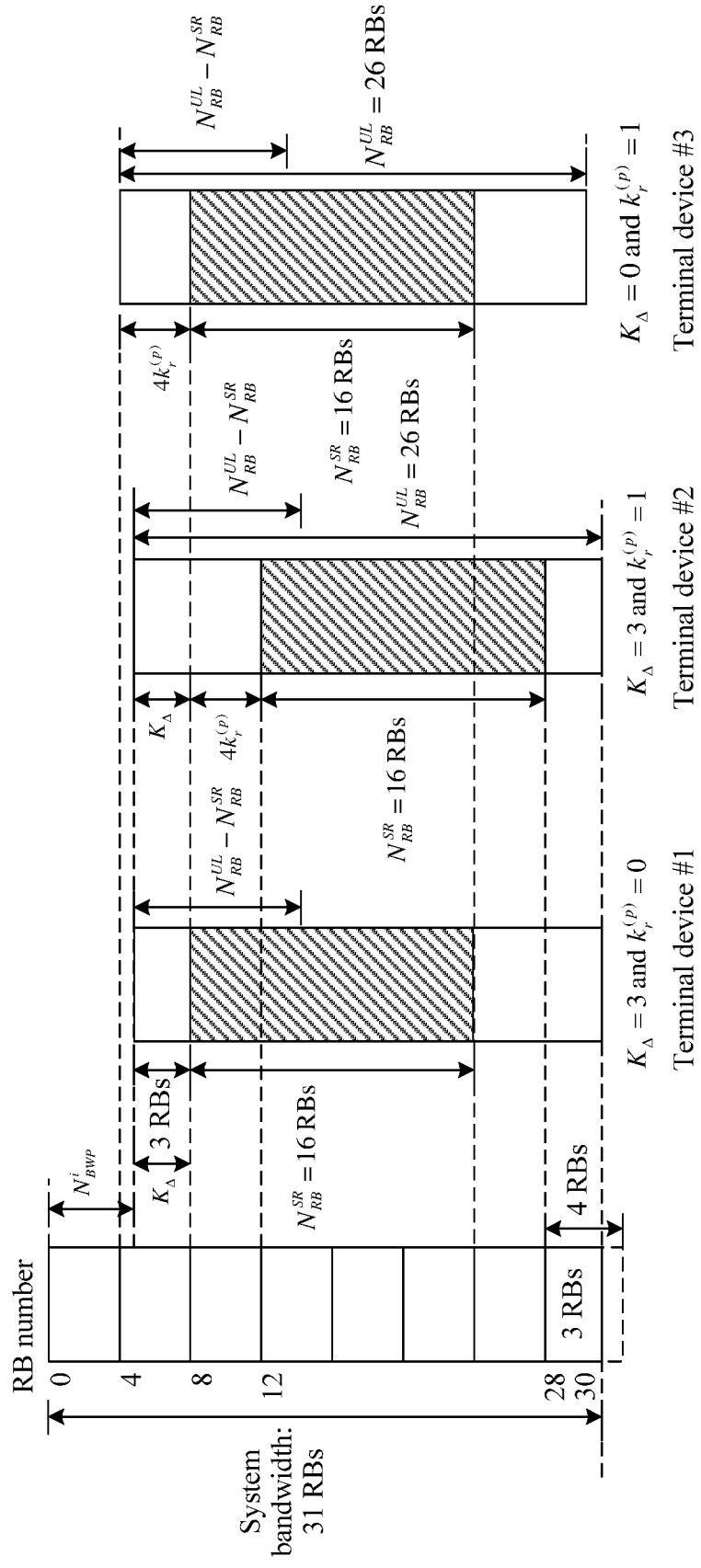
FIG. 11 is a schematic diagram of system bandwidth, BWP bandwidth, and sounding regions corresponding to different values of $K_A$ and different values of $k_r^{(p)}$ according to an embodiment of this application.

FIG. 11 is a schematic diagram of system bandwidth, BWP bandwidth, and sounding regions corresponding to different values of $K_A$ and different values of $k_r^{(p)}$ according to an embodiment of this application. It is assumed that bandwidth of each BWP is 26 RBs, and a size of each sounding region is 16 RBs. A location of a BWP of a terminal device #1 and a location of a BWP of a terminal device #2 are the same in the system bandwidth, and $N_{BWP}^i=5$ corresponds to the terminal device #1 and the terminal device #2. A location of a BWP of a terminal device #3 in the system bandwidth is different from the location of the BWP of the terminal device #1 or the terminal device #2 in the system bandwidth, and $N_{BWP}^i=4$ corresponds to the terminal device #3. Because the size of the sounding region is 16 RBs and the bandwidth of the BWP is 26 RBs, $N_{RB}^{UL}-N_{RB}^{SR}$, is equal to 10. In other words, $4k_r^{(p)}$ may be a value in $[0, 10]$ and $k_r^{(p)}$ may be a value in $[0, 2]$. Locations of sounding regions of the terminal devices in the system bandwidth when $K_A=3$ and $k_r^{(p)}=0$ corresponding to the terminal device #1, $K_A=0$ and $k_r^{(p)}=1$ corresponding to the terminal device #3, and $K_A=3$ and $k_r^{(p)}=1$ corresponding to the terminal device #2 are separately shown in the figure.

In addition, to ensure that an overlapping region of frequency domain resources for transmitting an SRS by terminal devices or antenna ports that are configured with a same comb parameter is greater than or equal to an integer multiple of n RBs, it is expected that starting locations of the frequency domain resources for transmitting the SRS by the terminal devices or the antenna ports that are configured with the same comb parameter can be controlled to be at a same RB or a location whose offset is an integer multiple of n RBs. Optionally, a value of n is 4.

For example, values of $K_A$ are the same and a difference between values of $k_r^{(p)}$ is 1 for the terminal device #1 and the terminal device #2 in the figure, that is, an offset between starting RBs of sounding regions of the two terminal devices is 4 RBs. Because the value of n in the figure is 4, the offset is $k_r^{(p)}$ RBs.

Still further, the network device expects to configure different values of $K_A$ for terminal devices or antenna ports that are configured with different comb parameters, to implement full-bandwidth measurement. The value of $K_A$ may be controlled within a range of $[0, n-1]$, and the different values of $K_A$ may be configured for the terminal devices or antenna ports that are configured with different comb parameters. When the value of n is 4, the value of $K_A$ may be 0, 1, 2, or 3.

Still referring to FIG. 11, if $k_r^{(p)}$ is 2 based on $K_A$ in the figure, the sounding region exceeds the BWP bandwidth, thereby reducing channel measurement accuracy. However, to ensure that the sounding region does not exceed the BWP bandwidth, three RBs at the bottom of the system bandwidth are always undetected. In this case, the value of $K_A$ may be adjusted for terminal devices that are configured with different comb parameters and have a same BWP. For example, the value of $K_A$ may be set to 2, to ensure that the sounding region does not exceed the BWP bandwidth, and full-bandwidth measurement of the system bandwidth can be implemented. It should be understood that the value of $K_A$ for implementing full-bandwidth measurement herein is merely an example, but shall not constitute any limitation on this application. In the communications system, bandwidth and locations of BWPs between terminal devices may be different. The network device may determine, based on a location of a BWP of each terminal device, a sounding region of each terminal device, and system bandwidth, a value of $K_A$ corresponding to each terminal device.

Therefore, a mappable location of the sounding region is further limited by configuring the value of $K_A$, so that terminal devices or antenna ports that are configured with different comb parameters can send an SRS on different frequency bands of the system bandwidth, and it is possible for the network device to implement full-bandwidth measurement, thereby improving data transmission performance of the entire bandwidth, and improving resource utilization and resource scheduling flexibility. Optionally, the method further includes: sending, by the network device, indication information of a value of $k_r^{(p)}$, where the indication information indicates a value of $k_r^{(p)}$.

Correspondingly, the method further includes: receiving, by the terminal device, the indication information of a value of $k_r^{(p)}$, where the indication information indicates the value of $k_r^{(p)}$.

Optionally, the method further includes: sending, by the network device, indication information of a value of $K_A$, where the indication information indicates a value of $K_A$.

Correspondingly, the method further includes: receiving, by the terminal device, the indication information of $K_A$, where the indication information indicates the value of $k_r^{(p)}$.

Based on the foregoing limitations on the values of $k_r^{(p)}$ and $K_A$, the network device may determine the values of $k_r^{(p)}$ and $K_A$, and send the indication information to the terminal device to indicate the values of $k_r^{(p)}$ and $K_A$. Therefore, both the network device and the terminal device may determine $\bar{k}_0^{(p)}$ according to Formula 7 based on a same value of $k_r^{(p)}$ and a same value of $K_A$, to determine $k_0^{(p)}$.

Optionally, the indication information of $k_r^{(p)}$ is carried in higher layer signaling. The higher layer signaling may include, for example, an RRC message or a MAC-CE.

Optionally, the indication information of $K_A$ is carried in higher layer signaling. The higher layer signaling may include, for example, an RRC message or a MAC-CE.

It should be understood that the signaling for carrying the indication information of $k_r^{(p)}$, the signaling for carrying the indication information of $K_A$, and a quantity of pieces of signaling are merely examples for description, but shall not constitute any limitation on this application. For example, the indication information of $k_r^{(p)}$ and the indication information of $K_A$ may be carried in one piece of signaling or one signaling group. For another example, the indication information of $k_r^{(p)}$ may be alternatively carried in the MAC-CE, and the indication information of $K_A$ may be alternatively carried in the MAC-CE.

It should be noted that the foregoing values of $k_r^{(p)}$ and $K_A$ may be configured at a UE level or a port level, and the terminal device may be notified by using signaling corresponding to a configuration level. This is not limited in this application.

Optionally, the method further includes: sending, by the network device, indication information of a value of $N_{BWP}^i$, where the indication information indicates a value of $N_{BWP}^i$.

Correspondingly, the method further includes: receiving, by the terminal device, the indication information of $N_{BWP}^i$, where the indication information indicates the value of $N_{BWP}^i$.

The network device indicates the value of $N_{BWP}^i$ to the terminal device, so that the terminal device determines a location of the BWP in the system bandwidth based on the value of $N_{BWP}^i$.

Based on the foregoing technical solution, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is UE-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

In addition, the starting location of the starting subcarrier for transmitting the SRS is limited, so that a possibility that an overlapping part of frequency domain resources used for transmitting an SRS by terminal devices or antenna ports that are configured with a same comb parameter is greater than or equal to an integer multiple of n RBs or an overlapping part of frequency domain resources of an SRS that are corresponding to different ports is greater than or equal to an integer multiple of n RBs is greatly increased. This can improve channel measurement accuracy, to achieve better demodulation performance. In addition, terminal devices or antenna ports that are configured with different comb parameters can transmit an SRS on different frequency domain resources, so that the network device can implement full-bandwidth measurement of the system bandwidth, and the communications system can achieve better demodulation performance in the entire system bandwidth, thereby improving resource utilization.

Based on the foregoing technical solution, this embodiment of this application provides a plurality of possible implementations of the method for sending and receiving an uplink reference signal, and all the implementations can be applied to a BWP configured based on a UE level, for example, a BWP in NR. However, in downlink channel measurement, there is also a BWP configured at a UE level. If the network device needs to measure only CSI of a sub-band in a specified period, the network device may send a CSI-RS on BWPs that are of one or more terminal devices and that are corresponding to the sub-band, to measure the CSI of the sub-band, and no longer need to send the CSI-RS in full bandwidth. Therefore, this application further provides a reference signal sending and receiving method, to indicate a location at which the terminal device receives a CSI-RS, so as to be applicable to resource configuration for a downlink reference signal in NR.

Figure 12:
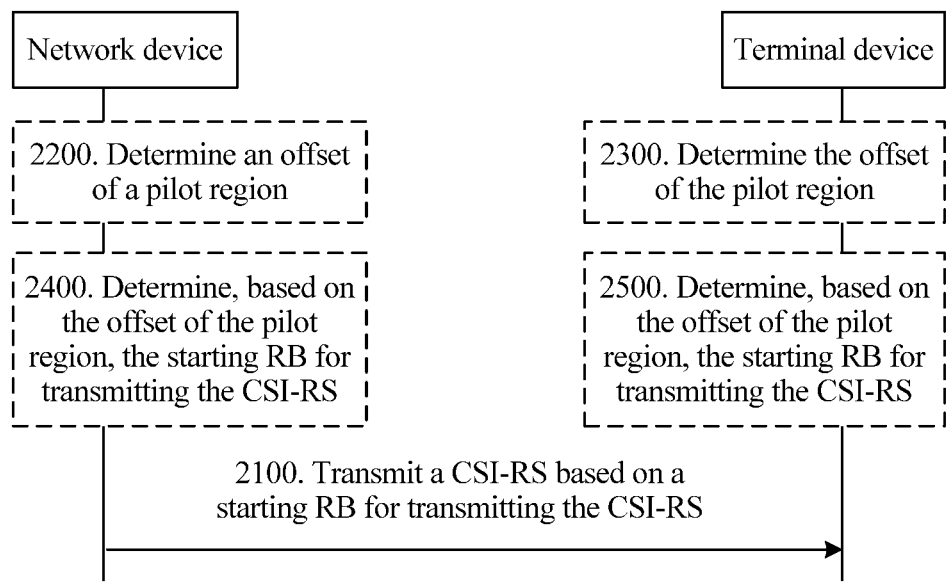
FIG. 12 is a schematic flowchart of a reference signal sending and receiving method according to yet another embodiment of this application.

FIG. 12 is a schematic flowchart of a reference signal sending and receiving method according to yet another embodiment of this application from a perspective of device interaction. Specifically, FIG. 12 shows a specific process of sending and receiving a downlink reference signal. In the method 2000 shown in FIG. 12, a network device may be, for example, the network device 102 in the communications system shown in FIG. 1, and a terminal device may be, for example, any one of the terminal devices 104 to 114 in the communications system shown in FIG. 1. It should be understood that the terminal device may be any terminal device that is in a wireless communications system and that has a wireless connection relationship with the network device. In addition, the network device and a plurality of terminal devices that are in the wireless communications system and that have a wireless connection relationship may transmit a reference signal based on a same technical solution.

It should be further understood that in this embodiment of this application, a CSI-RS is used as an example of the downlink reference signal to describe the technical solution provided in this application. However, this shall not constitute any limitation on this application. This application does not exclude a possibility of defining another downlink reference signal in a future protocol to implement a same or similar function, for example, a demodulation reference signal (Demodulation reference signal, DMRS), a tracking reference signal (Tracking reference signal, TRS), or a phase tracking reference signal (phase tracking reference signal, PTRS).

It should be further noted that in the method 2000 described below, a BWP of the terminal device and system bandwidth may be a downlink BWP and downlink system bandwidth. For a same terminal device, a downlink BWP may be independent of an uplink BWP. For a communications system, downlink system bandwidth may also be independent of uplink system bandwidth. For example, in a frequency division duplex (Frequency Division Deplex, FDD) system, a downlink BWP and an uplink BWP may occupy different frequency band resources, and downlink system bandwidth and uplink system bandwidth may also occupy different frequency band resources.

As shown in FIG. 12, the method 2000 may include step 2100 to step 2500. The following describes the steps of the method 2000 in detail.

In step 2100, the network device sends a CSI-RS based on a frequency-domain starting location of a resource for transmitting the CSI-RS.

Correspondingly, in step 2100, the terminal device receives the CSI-RS based on the frequency-domain starting location of the resource for transmitting the CSI-RS.

The CSI-RS may be used to perform downlink channel measurement. Specifically, the network device may send the CSI-RS on a downlink channel. The terminal device may measure the downlink channel based on the received CSI-RS to determine channel state information (CSI), and feed back the CSI to the network device, so that the network device performs resource scheduling.

Specifically, the network device may pre-configure the resource for transmitting the CSI-RS, and send the CSI-RS based on the configured resource. Because a BWP of each terminal device is configured at a UE level, locations and transmission bandwidth of BWPs of different terminal devices may be different. Each terminal device may receive a CSI-RS from the network device in transmission bandwidth of a BWP of each terminal device based on a resource for transmitting the CSI-RS.

In a possible case, resources corresponding to BWPs of two or more terminal devices in a same cell overlap, and pilot regions of the two or more terminal devices also fall within the overlapping resource. In this case, the two or more terminal devices may receive a same CSI-RS from the network device on a same resource. In other words, a plurality of terminal devices in the same cell may share the same CSI-RS from the network device.

The frequency-domain starting location of the resource for transmitting the CSI-RS may be indicated by an RB, namely, a starting RB for transmitting the CSI-RS. The starting RB for transmitting the CSI-RS may be determined based on a starting RB of a pilot region. Herein, the pilot region may be understood as a range of transmission bandwidth that can be used to transmit the CSI-RS. For a terminal device, a resource in a pilot region of the terminal device may be a region that is configured by the network device for the terminal device to receive a CSI-RS. A pilot region is usually within a range of transmission bandwidth of a BWP, in other words, a bandwidth size of the pilot region is less than or equal to a size of the transmission bandwidth of the BWP, and a location in the pilot region is also usually in a resource corresponding to the BWP. The terminal device may receive the CSI-RS on a resource corresponding to the pilot region, to perform downlink channel measurement.

However, it should be understood that the pilot region may be used to transmit the CSI-RS, but it does not mean that the network device certainly transmits the CSI-RS in full bandwidth of the pilot region. In this embodiment of this application, resources for transmitting a CSI-RS may be consecutive or may be nonconsecutive. Specifically, the resources for transmitting the CSI-RS may be divided at a granularity of an RB group. The resources for transmitting the CSI-RS may be consecutive in an RB group, and may be consecutive or nonconsecutive between RB groups. Therefore, the consecutive or nonconsecutive resources are described herein at a granularity of an RB group. Each RB group may include m RBs, where m>1, and m is a positive integer. Optionally, a value of m may be an integer multiple of 4, for example, 4, 8, or 12.

If the resources for transmitting the CSI-RS are consecutive, the network device may send the CSI-RS in the full bandwidth of the entire pilot region; if the resources for transmitting the CSI-RS are nonconsecutive, the network device may send the CSI-RS on some resources in the pilot region. Regardless of whether the resources for transmitting the CSI-RS are consecutive or nonconsecutive, the starting RB for transmitting the CSI-RS is related to a location in the pilot region. For example, if the resources for transmitting the CSI-RS are consecutive, the starting RB for transmitting the CSI-RS may be the starting RB of the pilot region. If the resources for transmitting the CSI-RS are nonconsecutive, the starting RB for transmitting the CSI-RS may be the starting RB of the pilot region or may be an RB in the middle of the pilot region. The following describes a case in which the resources for transmitting the CSI-RS are consecutive or nonconsecutive in detail with reference to the accompanying drawings. The location in the pilot region may be indicated by an offset of the pilot region. The offset of the pilot region may be a resource offset between the starting RB and a starting RB of the BWP, or may be a resource offset between the starting RB of the pilot region and a starting RB of the system bandwidth. In this case, the starting RB for transmitting the CSI-RS may be determined based on the offset of the pilot region. In addition, the network device may complete CSI-RS transmission in the pilot region by using one or more transmission opportunities. This is not limited in this application.

It should be further noted that the CSI-RS may be a zero power CSI-RS or a non-zero power CSI-RS. If the CSI-RS is a zero power CSI-RS, the network device may not carry a signal on the resource for transmitting the CSI-RS. Therefore, regardless of a zero power CSI-RS or a non-zero power CSI-RS, the determined resource for transmitting the CSI-RS is not used to transmit another signal.

Optionally, the method 2000 further includes step 2200: The network device determines the offset of the pilot region.

Correspondingly, the method 2000 further includes step 2300: The terminal device determines the offset of the pilot region.

In this embodiment of this application, a pilot region of each terminal device may be configured by the network device. The network device may determine a location and a size of the pilot region of each terminal device based on a size of the entire downlink system bandwidth and a location and a size of a BWP of a terminal device accessing the network device in the system bandwidth. It should be understood that a specific method for determining the location and the size of the pilot region of each terminal device by the network device may be the same as that in the prior art. For brevity, detailed descriptions of the specific process are omitted herein.

Optionally, the method 2000 further includes: sending, by the network device, indication information of the offset of the pilot region.

After determining the location in the pilot region, the network device may notify the terminal device of information about the pilot region (for example, information including the offset of the pilot region and a bandwidth size of the pilot region) by using signaling.

Specifically, the network device may notify the terminal device of the offset of the pilot region in any one of the following manners:

Manner 1: The network device sends indication information of a first offset $k_c$ (an example of the indication information of the offset of the pilot region) to the terminal device, where the indication information indicates a value of the first offset $k_c$, and the first offset $k_c$ indicates a quantity of RBs between the starting RB of the pilot region and the starting RB of the BWP.

Manner 2: The network device sends indication information of a second offset $T_A$ to the terminal device, where the indication information indicates a value of the second offset $T_A$ of the pilot region, and the second offset $T_A$ indicates a quantity of RBs between a starting RB of a mappable region of the pilot region and the starting RB of the BWP.

The network device sends indication information of a third offset $k_i$ to the terminal device, where the indication information indicates a value of $k_i$, and the third offset $k_i$ indicates a quantity of RB groups that is included in a quantity of RBs between the starting RB of the pilot region and the starting RB of the mappable region of the pilot region.

The indication information of the second offset $T_A$ and the information about the third offset $k_i$ may be understood as another example of the offset of the sounding information.

Manner 3: The network device sends indication information of the starting RB of the pilot region (another example of the indication information of the offset of the pilot region) to the terminal device, where the indication information indicates an RB number corresponding to the starting RB of the pilot region in the system bandwidth.

The following describes in detail specific implementation processes of the foregoing three manners with reference to the accompanying drawings.

It should be noted that, for ease of understanding, in each of the accompanying drawings (including FIG. 13 to FIG. 16) described below, the downlink system bandwidth is shown at a granularity of an RB group. Each RB group includes m (where m is a positive integer) RBs, and a value of m may be, for example, 4, 8, or 16. It may be understood that m=0 indicates that no resource is configured. However, it should be understood that a size of the system bandwidth is not necessarily an integer multiple of m RBs, and the size of the system bandwidth is not limited in this application. It should be further understood that bandwidth of the BWP of the terminal device is not necessarily an integer multiple of 4 RBs, and a quantity of RBs between the starting RB of the BWP of the terminal device and the starting RB of the system bandwidth is not necessarily an integer multiple of m either. In addition, in each of the schematic diagrams shown in FIG. 13 to FIG. 16, it is assumed that the system bandwidth is 31 RBs, and RB numbers in the system bandwidth are successively arranged from top to bottom starting from 0 to 30, where m=4. It should be understood that, the RB numbers in the system bandwidth are shown in the figure only for ease of understanding. However, this shall not constitute any limitation on this application. In this application, an RB numbering rule in the system bandwidth and an RB numbering rule in the BWP are not limited. For example, alternatively, the RB numbers in the system bandwidth may be successively arranged from bottom to top starting from 0 to 30.

In Manner 1, the first offset $k_c$ is the offset of the pilot region, and the terminal device may directly determine the stating RB of the pilot region based on the first offset $k_c$. To ensure that the pilot region does not exceed a range of the BWP, a value of $k_c$ may be further limited. That is, $k_c$ belongs to $[0, N_{RB}^{DL} - N_{RB}^{SR}]$, and $k_c$ is an integer. $N_{RB}^{DL}$ may indicate a quantity of RBs included in the transmission bandwidth of the BWP, and is distinguished from $N_{RB}^{UL}$ above. $N_{RB}^{SR}$ may indicate a quantity of RBs included in the pilot region.

Figure 13:
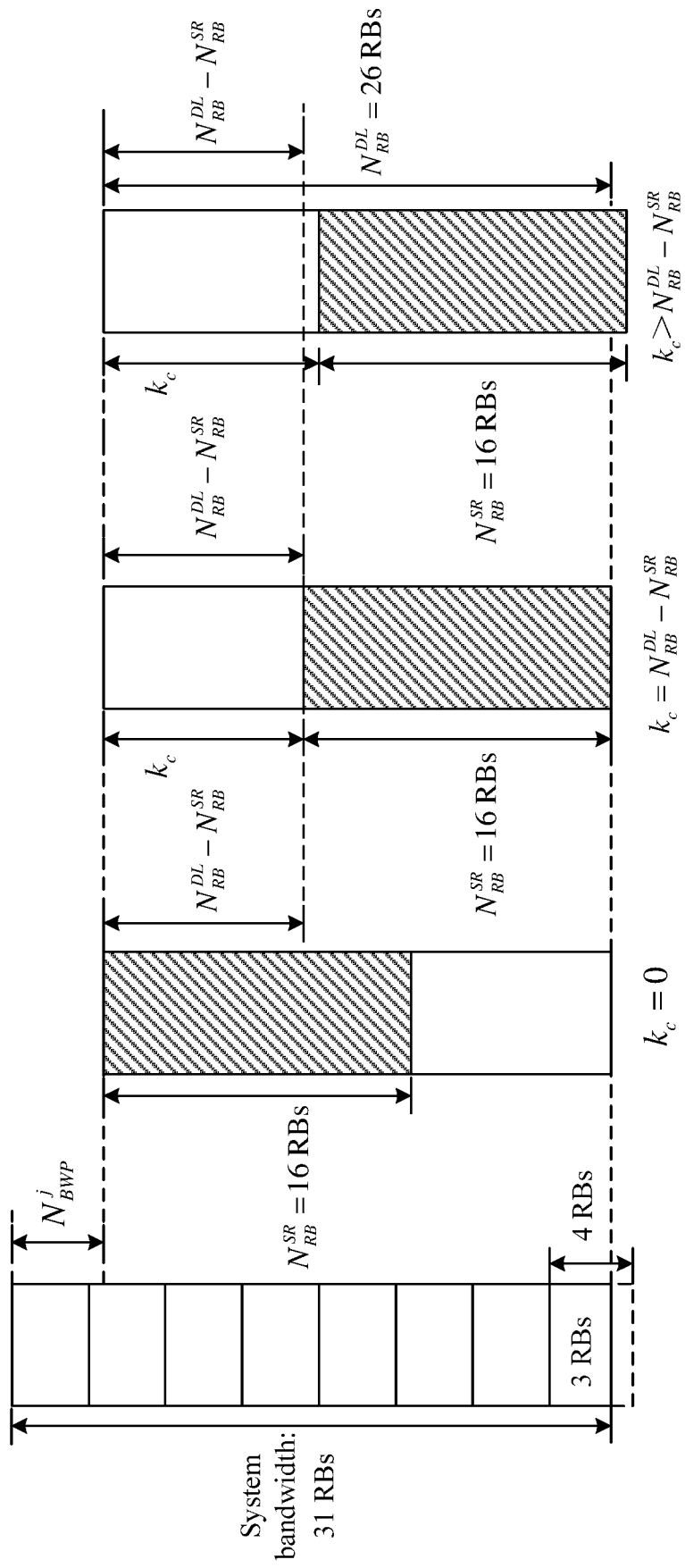
FIG. 13 is a schematic diagram of system bandwidth, and a pilot region and a BWP of a terminal device according to an embodiment of this application.

FIG. 13 is a schematic diagram of system bandwidth, and a pilot region and a BWP of a terminal device according to an embodiment of this application. As shown in the figure, transmission bandwidth $N_{RB}^{DL}$ of the BWP of the terminal device is 26 RBs. When $k_c=0$, a starting RB of the pilot region of the terminal device is a starting RB of the BWP, namely, a lower limit of a frequency band corresponding to the BWP; when $k_c = N_{RB}^{DL} - N_{RB}^{SR}$, the last RB of the pilot region of the terminal device is the last RB of the BWP, namely, an upper limit of the frequency band corresponding to the BWP; when $k_c > N_{RB}^{DL} - N_{RB}^{SR}$, the pilot region of the terminal device exceeds a range of the frequency band corresponding to the BWP.

The BWP of the terminal device is UE-specific, and may be only a part of the system bandwidth. If the pilot region of the terminal device exceeds a bandwidth range of the BWP of the terminal device, channel measurement accuracy may be reduced.

Therefore, it may be learned that $k_c$ is any integer value in $[0, N_{RB}^{DL} - N_{RB}^{SR}]$. A value of $k_c$ is limited, so that the pilot region of the terminal device can be controlled within the range of the BWP of the terminal device. In this way, a problem that channel measurement accuracy is reduced because the CSI-RS cannot be totally mapped to the BWP can be avoided, thereby improving demodulation performance.

Optionally, the indication information of the first offset $k_c$ is carried in higher layer signaling. The higher layer signaling may include, for example, an RRC message or a MAC-CE.

It should be understood that carrying the indication information of the first offset $k_c$ in the RRC message is only one possible implementation, but shall not constitute any limitation on this application. For example, the indication information of the first offset $k_c$ may be alternatively carried in the MAC-CE.

In Manner 2, the second offset $T_A$, the third offset $k_i$, and the first offset $k_c$ in Formula 1 meet the following relationship: $mk_i + T_A = k_c$. Specifically, $mk_i$ may indicate a quantity of RBs between the starting RB of the pilot region and the starting RB of the mappable region of the pilot region. It may be understood that $mk_i$ is an integer multiple of m.

$T_A$ belongs to $[0, m-1]$. The value of the first offset $k_c$ is limited in Manner 1, and a value range of $k_i$ may be obtained, that is, $k_i$ belongs to $[0, \lfloor (N_{RB}^{DL} - N_{RB}^{SR} - T_A)/m \rfloor]$, and both $T_A$ and $k_i$ are integers.

It may be specified in a future protocol that starting RBs for sending a CSI-RS to a plurality of terminal devices that have an overlapping BWP are aligned at a same location or an offset of m RBs is ensured, to reduce interference, thereby ensuring channel measurement accuracy and improving demodulation performance. Therefore, the first offset $k_c$ is divided into $T_A$ and $k_i$, where $T_A$ may be configured by the network device. For example, different values of $T_A$ are configured for terminal devices that are configured with different BWP bandwidth sizes.

Figure 14:
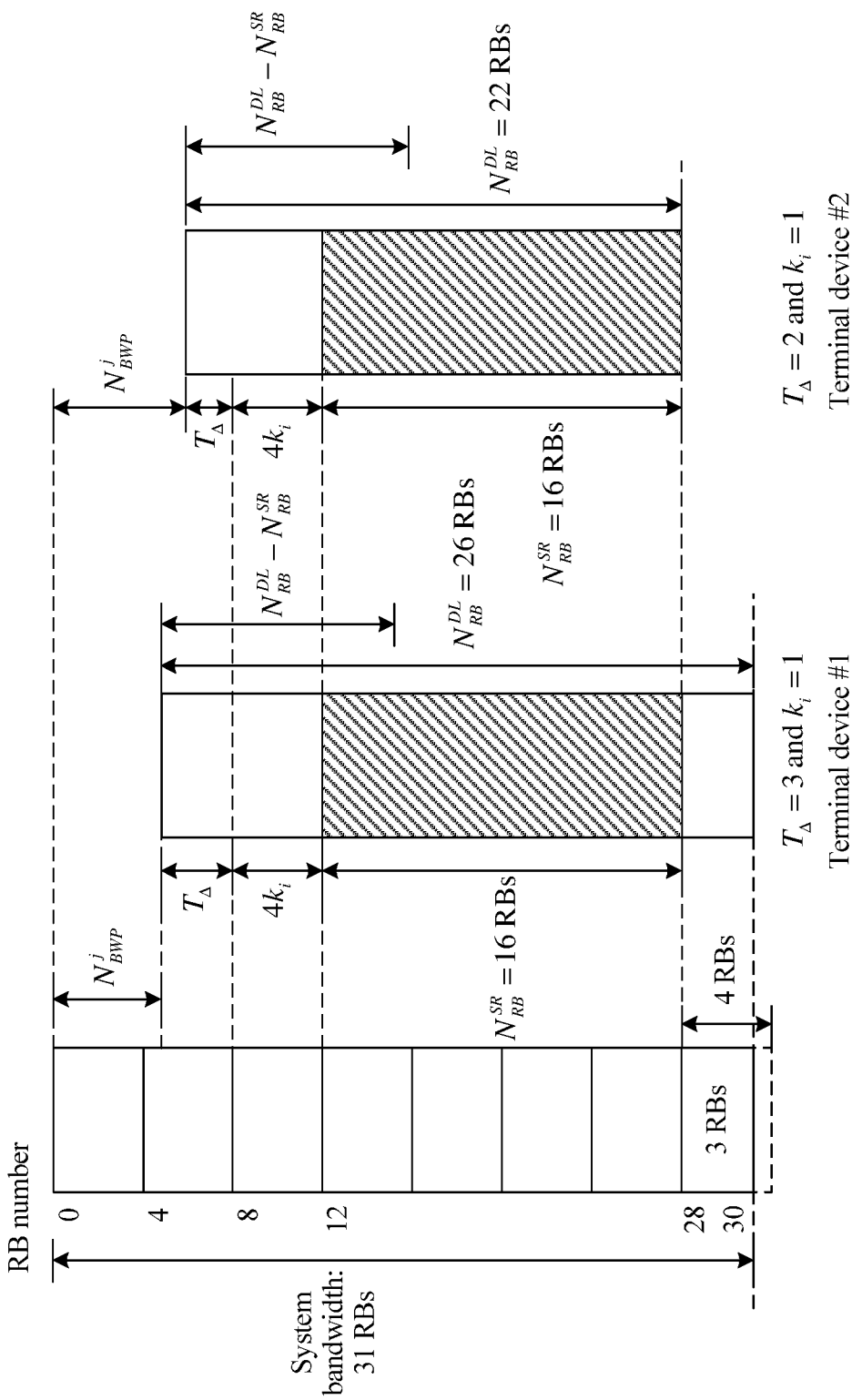
FIG. 14 is another schematic diagram of system bandwidth, and a pilot region and a BWP of a terminal device according to an embodiment of this application.

FIG. 14 is another schematic diagram of system bandwidth, and a pilot region and a BWP of a terminal device according to an embodiment of this application. As shown in the figure, transmission bandwidth $N_{RB}^{DL}$ of a BWP of a terminal device (for example, denoted as a terminal device #1) is 26 RBs, and a quantity $N_{BWP}^j$ of RBs between a starting RB of the BWP and a starting RB of the system bandwidth is 5; transmission bandwidth $N_{RB}^{DL}$ of a BWP of another terminal device (for example, denoted as a terminal device #2) is 22 RBs, and a quantity $N_{BWP}^j$ of RBs between a starting RB of the BWP and the starting RB of the system bandwidth is 6. $N_{BWP}^j$ indicates the quantity of RBs between the starting RB of the BWP of the terminal device and the starting RB of the system bandwidth.

Because there is an overlapping region in regions to which the BWPs of the two terminal devices are mapped in the system bandwidth, the two terminal devices may share a same CSI-RS sent by the network device in the overlapping region, as shown in the figure. Considering that transmission bandwidth of a CSI-RS defined in a current standard may be an integer multiple of 4 RBs, a starting location of the CSI-RS may be an RB 8 in the system bandwidth shown in the figure, or may be an RB 12 in the system bandwidth. This is not limited in this application. In other words, a starting RB of a mappable location in the pilot region may range from the RB 8 in the system bandwidth to the RB 12 in the system bandwidth.

For different terminal devices, values of $T_A$ may be different because BWPs are mapped to different locations in the system bandwidth. For example, $T_A=3$ corresponds to the terminal device #1 shown in the figure, and $T_A=2$ corresponds to the terminal device #2.

In addition, the system bandwidth or the transmission bandwidth of the BWP is not necessarily an integer multiple of m RBs. Therefore, some RBs may be undetected. To implement full-bandwidth measurement of the system bandwidth, the network device may configure different $T_A$ for different terminal devices, and transmission resources of different CSI-RSs are located at different locations in the system bandwidth, so that the network device can implement full-bandwidth measurement of the system bandwidth.

It should be further noted that, that $T_A$ shown in the figure exactly meets $\mod[(N_{BWP}^j+T_A), m]=0$ is merely an example. Actually, in this application, it is not specified that the value of $T_A$ meets $\mod[(N_{BWP}^j+T_A), m]=0$, and the value of $T_A$ may be determined by the network device based on each CSI-RS location.

Optionally, the indication information of the second offset $T_A$ is carried in higher layer signaling. The higher layer signaling may include, for example, an RRC message or a MAC-CE.

Optionally, the indication information of the third offset $k_i$ is carried in higher layer signaling. The higher layer signaling may include, for example, a message or a MAC-CE.

It should be understood that the higher layer signaling for carrying the indication information of the second offset $T_A$ and the higher layer signaling for carrying the indication information of the third offset $k_i$ may be two different pieces of higher layer signaling, or may be a same piece of higher layer signaling. This is not limited in this application.

It should be further understood that carrying the indication information of the second offset $T_A$ or the indication information of the third offset $k_i$ in the higher layer signaling is only one possible implementation, but shall not constitute any limitation on this application.

In Manner 1 and Manner 2, the offset of the pilot region may be indicated by the quantity of RBs between the starting RB of the pilot region and the starting RB of the BWP.

In Manner 3, the network device may directly indicate, to the terminal device, the RB number corresponding to the starting RB of the pilot region in the system bandwidth. The terminal device may determine a location of the starting RB of the pilot region in the BWP based on the number of the starting RB of the pilot region and the pre-obtained value of $N_{BWP}^j$.

In other words, in Manner 3, the offset of the pilot region may be indicated by the quantity of RBs between the starting RB of the pilot region and the starting RB of the system bandwidth.

For example, still referring to FIG. 14, if an RB number corresponding to the starting RB of the pilot region of the terminal device #1 in the system bandwidth is 12, the network device may indicate, to the terminal device #1, that the number of the starting RB of the pilot region in the system bandwidth is 12. The terminal device #1 may determine a location of the starting RB of the pilot region in the BWP based on the pre-obtained value of $N_{BWP}^j$ (for example, $N_{BWP}^j=5$ in the figure), that is, a quantity of RBs between the starting RB of the pilot region and the starting RB of the BWP. Assuming that a number of the starting RB of the BWP is 0, an RB number corresponding to the starting RB of the pilot region in the BWP is 8.

Optionally, the indication information of the starting RB of the pilot region is carried in higher layer signaling. The higher layer signaling may include, for example, an RRC message or a MAC-CE.

It should be understood that carrying the indication information of the starting RB of the pilot region in the RRC message is only one possible implementation, but shall not constitute any limitation on this application. For example, the indication information of the starting RB of the pilot region may be alternatively carried in the MAC-CE.

In the foregoing three manners, the terminal device may determine the offset of the pilot region.

Optionally, the method 2000 further includes: sending, by the network device, indication information of a pilot region size, where the indication information indicates transmission bandwidth occupied by the pilot region.

Optionally, the pilot region size may be indicated by a quantity of RBs.

Optionally, the indication information of the pilot region size is carried in higher layer signaling. The higher layer signaling may include, for example, an RRC message or a MAC-CE.

It should be noted that the starting RB of the pilot region and the pilot region size may be indicated by using one piece of indication information.

It should be understood that the higher layer signaling for carrying the various types of indication information in the foregoing Manner 1 to Manner 3 and the higher layer signaling for carrying the indication information of the pilot region size may be a plurality of different pieces of higher layer signaling, or may be a same piece of higher layer signaling. This is not limited in this application.

It should be further understood that carrying the indication information of the pilot region size in the higher layer signaling is only one possible implementation, but shall not constitute any limitation on this application.

Optionally, the method 2000 further includes: sending, by the network device, indication information of a value of $N_{BWP}^j$, where the indication information indicates a value of $N_{BWP}^j$.

Optionally, the indication information of $N_{BWP}^j$ is carried in higher layer signaling. The higher layer signaling may include, for example, an RRC message or a MAC-CE.

It should be understood that the foregoing higher layer signaling for carrying the various types of indication information and the higher layer signaling for carrying the indication information of $N_{BWP}^j$ may be a plurality of different pieces of higher layer signaling, or may be a same piece of higher layer signaling. This is not limited in this application.

It should be further understood that carrying the indication information of $N_{BWP}^j$ in the higher layer signaling is only one possible implementation, but shall not constitute any limitation on this application.

In step 2200 and step 2300, the network device and the terminal device may determine the offset of the pilot region, and then may determine, based on the offset of the pilot region, the starting RB for transmitting the CSI-RS.

It should be understood that the foregoing describes a specific method for determining the offset of the pilot region with reference to the accompanying drawings. However, this shall not constitute any limitation on this application. In some cases, the pilot region may be full bandwidth of the BWP. In this case, the offset of the pilot region may be 0. A bandwidth size of the pilot region is not limited in this application.

It should be further understood that the foregoing three manners are merely several possible implementations of determining the offset of the pilot region, but shall not constitute any limitation on this application.

Optionally, the method 2000 further includes step 2400: The network device determines, based on the offset of the pilot region, the starting RB for transmitting the CSI-RS.

Correspondingly, the method 2000 further includes step 2500: The terminal device determines, based on the offset of the pilot region, the starting RB for transmitting the CSI-RS.

In this embodiment of this application, the resource for transmitting the CSI-RS may be configured by the network device. The network device may determine, based on the size of the entire downlink system bandwidth, the location and the size of the BWP of the terminal device accessing the network device in the system bandwidth, and the location and the size of the pilot region of each terminal device, a location for transmitting the CSI-RS. It should be understood that a specific method for determining, by the network device, transmitting the CSI-RS may be the same as that in the prior art. For brevity, detailed descriptions of the specific process are omitted herein.

After determining a transmission resource for transmitting the CSI-RS, the network device may notify, by using signaling, the terminal device of the starting location (for example, the starting RB) for transmitting the CSI-RS, so that the terminal device receives the CSI-RS based on the starting location.

It should be understood that the network device and the terminal device may determine, based on a predefined pilot pattern (pattern), a resource element (Resource Element, RE) that is in an RB and that is used to transmit the CSI-RS. After the network device and the terminal device separately determine an RB for transmitting the CSI-RS, the network device and the terminal device may determine, based on the predefined pilot pattern, an RE that carries the CSI-RS.

As described in step 2100, transmission resources of the CSI-RS may be consecutive or may be nonconsecutive in the pilot region (or in the BWP), and this may be specifically configured by the network device.

If the transmission resources of the CSI-RS are consecutive in the pilot region, the terminal device may directly determine, based on the offset that is of the pilot region and that is determined in step 2300, the starting RB for transmitting the CSI-RS, and then receive the CSI-RS based on the determined starting RB for transmitting the CSI-RS.

If the transmission resources of the CSI-RS are nonconsecutive in the pilot region, the network device may further indicate, to the terminal device, the location for transmitting the CSI-RS.

Optionally, the method 2000 further includes: sending, by the network device, indication information of a CSI-RS location, where the indication information indicates an RB for transmitting the CSI-RS in the pilot region.

Correspondingly, the method 2000 further includes: receiving, by the terminal device, the indication information of the CSI-RS location form the network device, where the indication information indicates the RB for transmitting the CSI-RS in the pilot region.

In a possible design, the indication information of the CSI-RS location may be a bitmap (bitmap). For example, transmission bandwidth of a CSI-RS defined in a current standard may be an integer multiple of m RBs, for example, 4. Each RB group (including m RBs) in the pilot region corresponds to one bit. For example, when an RB group is used to transmit a CSI-RS, a corresponding bit may be set to "1"; when an RB group is not used to transmit a CSI-RS, a corresponding bit may be set to "0". It should be understood that information indicated by a bit value may be predefined by the network device and the terminal device. The information indicated by setting the bit to "1" and the information indicated by setting the bit to "0" are shown only for ease of understanding. However, this shall not constitute any limitation on this application.

It should be further understood that a method for indicating, by using the bitmap, the RB for transmitting the CSI-RS is only one possible implementation, but shall not constitute any limitation on this application. In this application, the terminal device may determine, in another manner, the RB for transmitting the CSI-RS. For example, preliminary definition the network device agrees with the terminal device in advance that transmission is performed on an odd-numbered RB group but transmission is not performed on an even-numbered RB group in the system bandwidth. This is not limited in this application.

Figure 15:
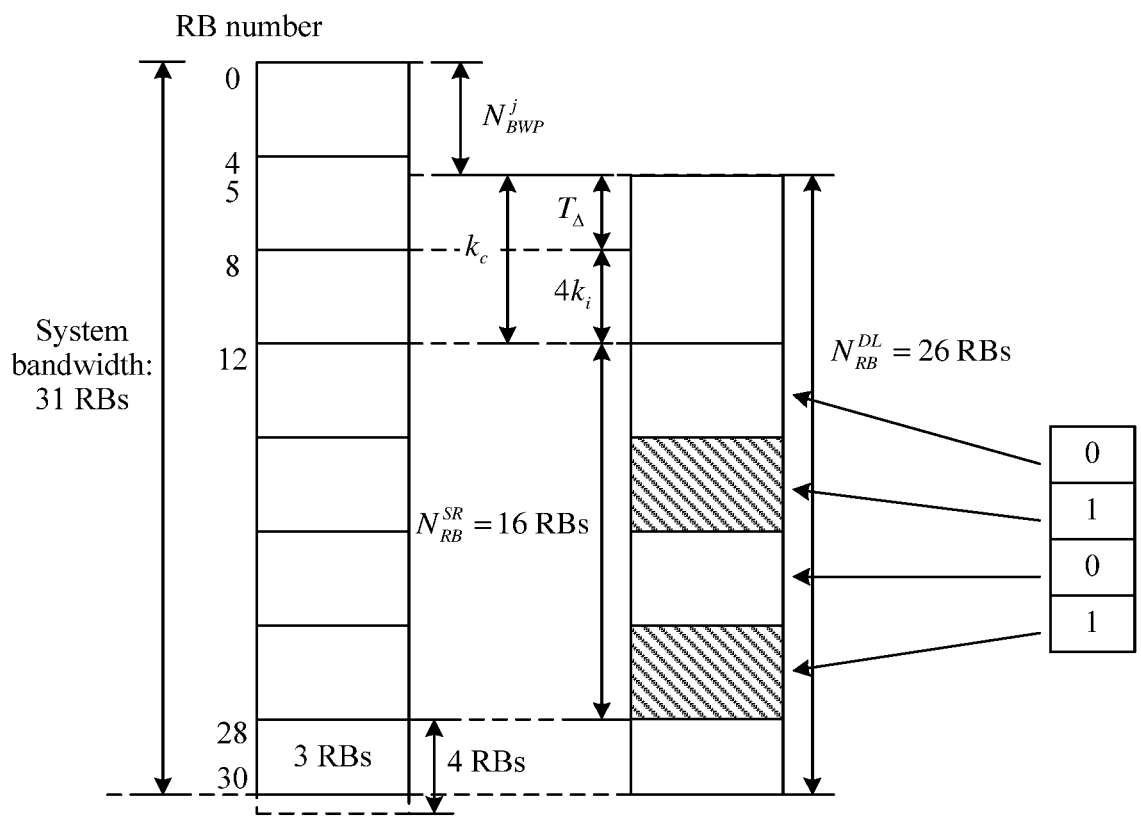
FIG. 15 is a schematic diagram of system bandwidth, a pilot region and a BWP of a terminal device, and a bitmap according to an embodiment of this application.

FIG. 15 is a schematic diagram of system bandwidth, a pilot region and a BWP of a terminal device, and a bitmap according to an embodiment of this application. As shown in the figure, transmission bandwidth $N_{RB}^{DL}$ of the BWP of the terminal device is 26 RBs, and a quantity $N_{BWP}^{j}$ of RBs between a starting RB of the BWP and a starting RB of the system bandwidth is 5. The pilot region of the terminal device may be determined in the manner described above. For example, if $k_c=8$, and a resource size of the pilot region is 16 RBs, a location in the pilot region in the BWP may be determined. If a value of m is 4, the pilot region may include four RB groups, and each RB group corresponds to one bit. A correspondence between each bit and an RB group is shown in the figure. An RB for transmitting a CSI-RS in the pilot region may be determined according to an indication of each bit in the bitmap. As shown in the figure, the network device transmits a CSI-RS only on an RB group corresponding to a bit set to "1".

The system bandwidth or the transmission bandwidth of the BWP is not necessarily an integer multiple of m RBs. Therefore, some RBs may be undetected. To implement full-bandwidth measurement of the system bandwidth, the network device may configure the pilot region as the entire BWP, so that a CSI-RS can be transmitted at any location in the BWP as required. In this case, a bandwidth size of the pilot region is not necessarily an integer multiple of m RBs.

Figure 16:
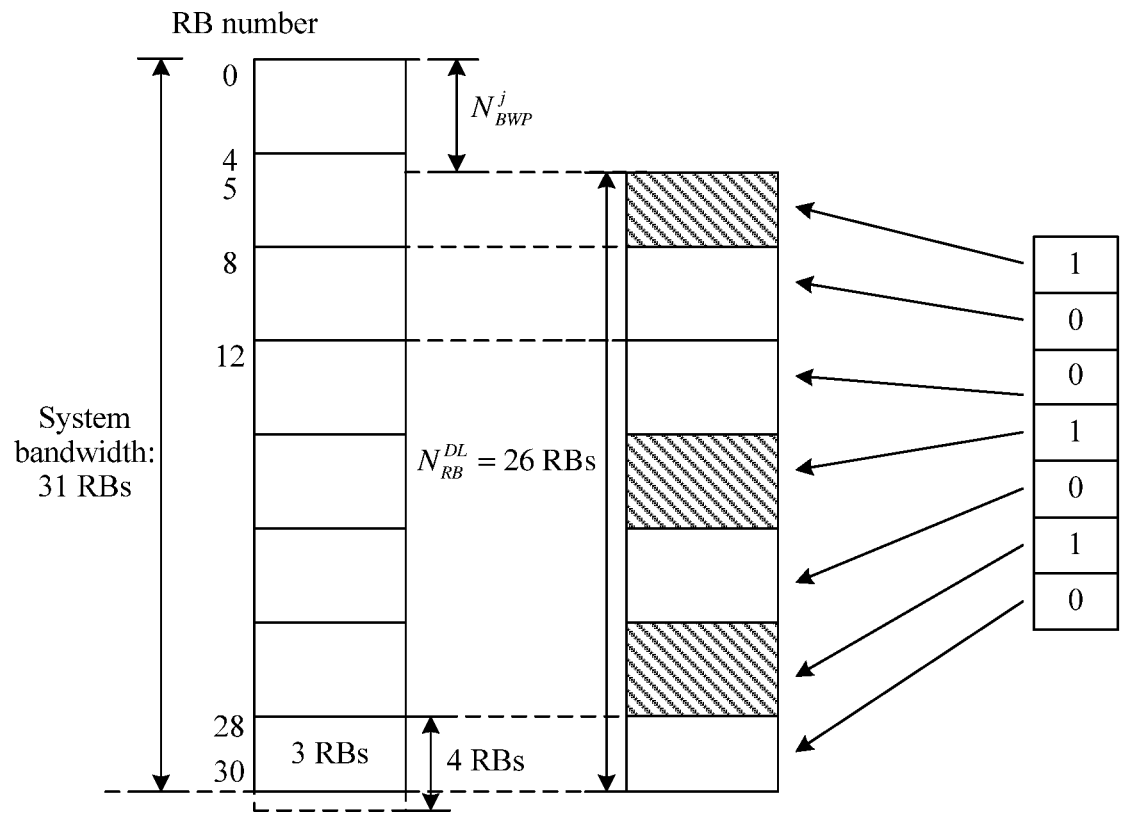
FIG. 16 is another schematic diagram of system bandwidth, a pilot region and a BWP of a terminal device, and a bitmap according to an embodiment of this application.

FIG. 16 is another schematic diagram of system bandwidth, a pilot region and a BWP of a terminal device, and a bitmap according to an embodiment of this application. As shown in the figure, transmission bandwidth $N_{RB}^{DL}$ of the BWP of the terminal device is 26 RBs, bandwidth of the pilot region is also 26 RBs, and a quantity $N_{BWP}^{j}$ of RBs between a starting RB of the BWP and a starting RB of the system bandwidth is 5. If a value of a quantity m of RBs in an RB group is 4, the pilot region may include five complete RB groups, which may be indicated by five bits. However, neither the first three RBs nor the last three RBs in the pilot region can form a complete RB group, but the first three RBs and the last three RBs may still be considered as two RB groups, which may be indicated by two bits. In this case, it may be understood that two resource granularities are configured for the pilot region, one resource granularity is m RBs, and the other resource granularity is at least one RB less than m RBs. A correspondence between each bit and an RB group is shown in the figure. An RB for transmitting a CSI-RS in the pilot region may be determined according to an indication of each bit in the bitmap. As shown in the figure, the network device transmits a CSI-RS only on an RB group corresponding to a bit set to "1". In addition, resource scheduling flexibility can be further improved by configuring different resource granularities.

Optionally, indication information of a reference signal location is carried in higher layer signaling. The higher layer signaling may include, for example, an RRC message or a MAC-CE.

It should be understood that the signaling for carrying the indication information of the reference signal location herein is merely an example for description, but shall not constitute any limitation on this application. For example, the indication information of the reference signal location may be alternatively carried in the MAC-CE.

Based on the foregoing technical solution, in this embodiment of this application, a starting RB for receiving the CSI-RS by the terminal device is determined based on the BWP of the terminal device in NR, and the CSI-RS is transmitted based on the starting RB, so that the terminal device can receive the CSI-RS from the network device based on a location and a size of the BWP of the terminal device. In this way, this application is more suitable for an NR scenario.

In addition, the offset of the pilot region is indicated to indicate, within a resource range of the pilot region, whether each RB group carries a CSI-RS. Therefore, a location of a resource for transmitting a CSI-RS does not need to be indicated in the full bandwidth of the system bandwidth, thereby reducing signaling overheads. In addition, the offset of the pilot region is limited, so that a problem that channel measurement accuracy of the terminal device is reduced because transmission resources of the CSI-RS exceed the range of the BWP can be avoided, thereby improving demodulation performance. It should be understood that, in the foregoing embodiments, an RB is used as an example of a resource unit to describe each embodiment. For a definition of the RB, refer to a definition of the RB in a current LTE protocol, or refer to a definition of the RB in a future 5G protocol. In addition, this application does not exclude a possibility that another resource unit is used to replace the RB in a future protocol.

It should be further understood that the foregoing "predefinition" may be implemented in a manner in which corresponding code, a table, or other related indication information may be prestored in a device (for example, including the terminal device and the network device). A specific implementation of the foregoing "predefinition" is not limited in this application.

It should be further understood that, only for ease of understanding, the foregoing describes in detail the technical solutions provided in this application with reference to the accompanying drawings and different bandwidth sizes. However, this shall not constitute any limitation on this application. Sizes of the system bandwidth, the BWP bandwidth, the sounding region, and the pilot region are not limited in this application.

In another implementation, the network device and the terminal device may communicate with each other based on a multi-antenna technology.

In LTE, antenna switching of a 1T2R user is supported. Antenna switching of a user with a Tx (transmit) antennas and b Rx (receive) antennas is further supported below by using an antenna grouping method, where a>1 or b>2, and a<b.

Step 1: A base station sends SRS configuration information to a user. A quantity of antenna ports indicated by antenna port information needs to be not greater than a quantity of antennas that can be simultaneously used for uplink transmission by the user. Therefore, the user needs to report, in a message 3 (Msg3) or higher layer signaling such as RRC signaling, a maximum quantity of antennas that can be simultaneously used for sending. In this embodiment, a quantity of ports is a=2.

Step 2: The base station sends signaling to the user, where the signaling is used to instruct the user to send an SRS in an SRS antenna switching manner. Optionally, the base station notifies a total quantity of antennas used by the user. For example, in this embodiment, the total quantity of antennas is b=4, and it indicates that the user performs sending once by using two antennas, and sends an SRS on a total of four antennas.

Step 3: The user sends an SRS on four antennas through time division based on the configuration information of the base station. Specifically, used antennas are grouped into b/a=2 groups, where antennas included in each group are predefined or configured by the base station. For example, a group 0 includes antennas {0, 1}, and a group 1 includes antennas {2, 3}. Predefined antennas in a group are antennas that can be simultaneously used for uplink transmission. An identifier of an antenna group may be denoted as $\hat{a}(n_{SRS})$, and $n_{SRS}$ is determined based on a quantity of times of sending the uplink reference signal. For example, $n_{SRS}$ is the quantity of times of sending the uplink reference signal or is obtained by subtracting 1 from the quantity of times of sending the uplink reference signal. When frequency hopping is not performed, $\hat{a}(n_{SRS}) = n_{SRS} \mod 2$. When frequency hopping is performed, the following formula is met:

$$\hat{a}(n_{SRS}) = \begin{cases} (n_{SRS} + \lfloor n_{SRS}/2 \rfloor + \beta \cdot \lfloor n_{SRS}/K \rfloor) \mod 2 & \text{if } K \text{ is an even number} \\ n_{SRS} \mod 2 & \text{if } K \text{ is an odd number} \end{cases},$$

where $$\beta = \begin{cases} 1 & \text{if } K \mod 4 = 0 \\ 0 & \text{otherwise} \end{cases}.$$

K is a total quantity of hops in frequency hopping. Herein, a frequency hopping scenario with K=2 is used as an example. The following table provides a relationship among an antenna port, a quantity of transmission times, and transmission bandwidth.

| $n_{SRS}$ | First bandwidth for frequency hopping | Second bandwidth for frequency hopping |
|---|---|---|
| 0 | Antenna group 0: antennas {0, 1} | |
| 1 | | Antenna group 1: antennas {2, 3} |
| 2 | Antenna group 1: antennas {2, 3} | |
| 3 | | Antenna group 0: antennas {0, 1} |

It may be learned that, during the first time of transmission, the user sends an SRS by using the antennas 0 and 1 at a first frequency hopping location; during the second time of transmission, the user sends an SRS by using the antennas 2 and 3 at a second frequency hopping location; during the third time of transmission, the user sends an SRS by using the antennas 2 and 3 at the first frequency hopping location; during the fourth time of transmission, the user sends an SRS by using the antennas 0 and 1 at the second frequency hopping location.

The foregoing describes in detail the method provided in the embodiments of this application with reference to FIG. 2 to FIG. 16. The following describes in detail a network device and a terminal device provided in the embodiments of this application with reference to FIG. 17 to FIG. 20.

Figure 17:
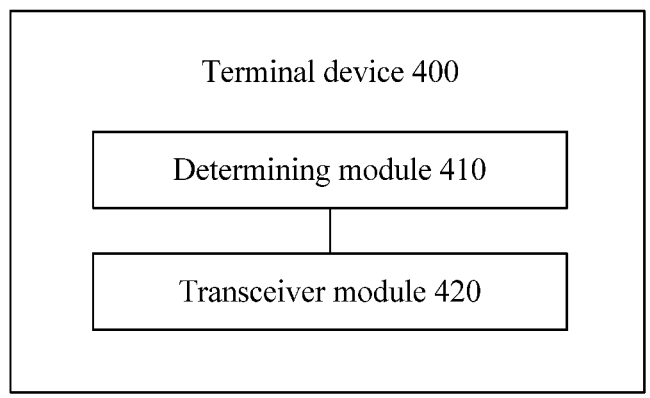
FIG. 17 is a schematic block diagram of a terminal device according to an embodiment of this application.

FIG. 17 is a schematic block diagram of a terminal device 400 according to an embodiment of this application. As shown in FIG. 17, the terminal device 400 includes a determining module 410 and a transceiver module 420.

The determining module 410 is configured to determine, based on an offset, a location of a starting subcarrier for transmitting an SRS, where the offset is a resource offset between a starting subcarrier of a sounding region and a starting subcarrier of transmission bandwidth of a bandwidth part BWP of the terminal device, and the offset is determined based on a predefined resource configuration mode.

The transceiver module 420 is configured to send the SRS based on the location, determined by the determining module 410, of the starting subcarrier for transmitting the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is user equipment (UE)-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

Optionally, the predefined resource configuration mode is determined from a plurality of predefined resource configuration modes, and the plurality of predefined resource configuration modes correspond to a plurality of offsets.

Optionally, the terminal device 400 further includes an obtaining module, configured to obtain an index value of the predefined resource configuration mode, where the index value is used to indicate the predefined resource configuration mode, and the plurality of predefined resource configuration modes are in a one-to-one correspondence with a plurality of index values.

Optionally, the transceiver module 420 is further configured to receive first information, where the first information includes the index value of the predefined resource configuration mode.

Optionally, the determining module 410 is further configured to determine the index value of the predefined resource configuration mode based on any one of a system frame number, a slot number, or a comb mapping location.

Optionally, the plurality of resource configuration modes are in a one-to-one correspondence with a plurality of formulas, each formula is used to determine an offset, and the plurality of formulas include:

$$\bar{k}_0^{(p)} = (N_{RB}^{UL} - m_{SRS,b} \Pi_{b'=0}^{b} N_{b'}) N_{SC}^{RB} + k_{TC}^{(p)}; \text{ and} \quad \text{Formula 1:}$$

$$\bar{k}_0^{(p)} = k_{TC}^{(p)}. \quad \text{Formula 2:}$$

$\bar{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, $b = B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location.

Optionally, the plurality of resource configuration modes are in a one-to-one correspondence with a plurality of formulas, each formula is used to determine an offset, and the plurality of formulas include:

$$\bar{k}_0^{(p)} = (N_{RB}^{UL} - m_{SRS,b} \Pi_{b'=0}^{b} N_{b'}) N_{SC}^{RB} + k_{TC}^{(p)}; \quad \text{Formula 1:}$$

$$\bar{k}_0^{(p)} = k_{TC}^{(p)}; \text{ and} \quad \text{Formula 2:}$$

$$\bar{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}. \quad \text{Formula 3:}$$

$\bar{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, $b = B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location.

Optionally, the offset is determined according to the following formula:

$$\bar{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}.$$

It should be understood that the terminal device 400 may correspond to the terminal device in the reference signal sending and receiving method 200 in the embodiments of this application. The terminal device 400 may include modules for performing the method performed by the terminal device in the reference signal sending and receiving method 200 in FIG. 2. The modules in the terminal device 400 and the foregoing other operations and/or functions are separately used to implement the corresponding procedures of the reference signal sending and receiving method 200 in FIG. 2. Specifically, the determining module 410 is configured to perform step 210, step 240, and step 2602 in the method 200, and the transceiver module 420 is configured to perform step 230 and step 2601 in the method 200. A specific process of performing the foregoing corresponding step by each module is described in detail in the method 200. For brevity, details are not described herein again.

Alternatively, the terminal device 400 may correspond to the terminal device in the reference signal sending and receiving method 300 in the embodiments of this application. The terminal device 400 may include modules for performing the method performed by the terminal device in the reference signal sending and receiving method 300 in FIG. 6. The modules in the terminal device 400 and the foregoing other operations and/or functions are separately used to implement the corresponding procedures of the reference signal sending and receiving method 300 in FIG. 6. Specifically, the determining module 410 is configured to perform step 310 and step 330 in the method 300, and the transceiver module 420 is configured to perform step 350 in the method 300. A specific process of performing the foregoing corresponding step by each module is described in detail in the method 300. For brevity, details are not described herein again.

Alternatively, the terminal device 400 may correspond to the terminal device in the reference signal sending and receiving method 1000 in the embodiments of this application. The terminal device 400 may include modules for performing the method performed by the terminal device in the reference signal sending and receiving method 1000 in FIG. 7. The modules in the terminal device 400 and the foregoing other operations and/or functions are separately used to implement the corresponding procedures of the reference signal sending and receiving method 1000 in FIG. 7. Specifically, the determining module 410 is configured to perform step 1200 and step 1400 in the method 1000, and the transceiver module 420 is configured to perform step 1100 in the method 1000. A specific process of performing the foregoing corresponding step by each module is described in detail in the method 1000. For brevity, details are not described herein again.

Alternatively, the terminal device 400 may correspond to the terminal device in the reference signal sending and receiving method 2000 in the embodiments of this application. The terminal device 400 may include modules for performing the method performed by the terminal device in the reference signal sending and receiving method 2000 in FIG. 12. The modules in the terminal device 400 and the foregoing other operations and/or functions are separately used to implement the corresponding procedures of the reference signal sending and receiving method 2000 in FIG. 12. Specifically, the determining module 410 is configured to perform step 2200 and step 2400 in the method 2000, and the transceiver module 420 is configured to perform step 2100 in the method 2000. A specific process of performing the foregoing corresponding step by each module is described in detail in the method 2000. For brevity, details are not described herein again.

Figure 18:
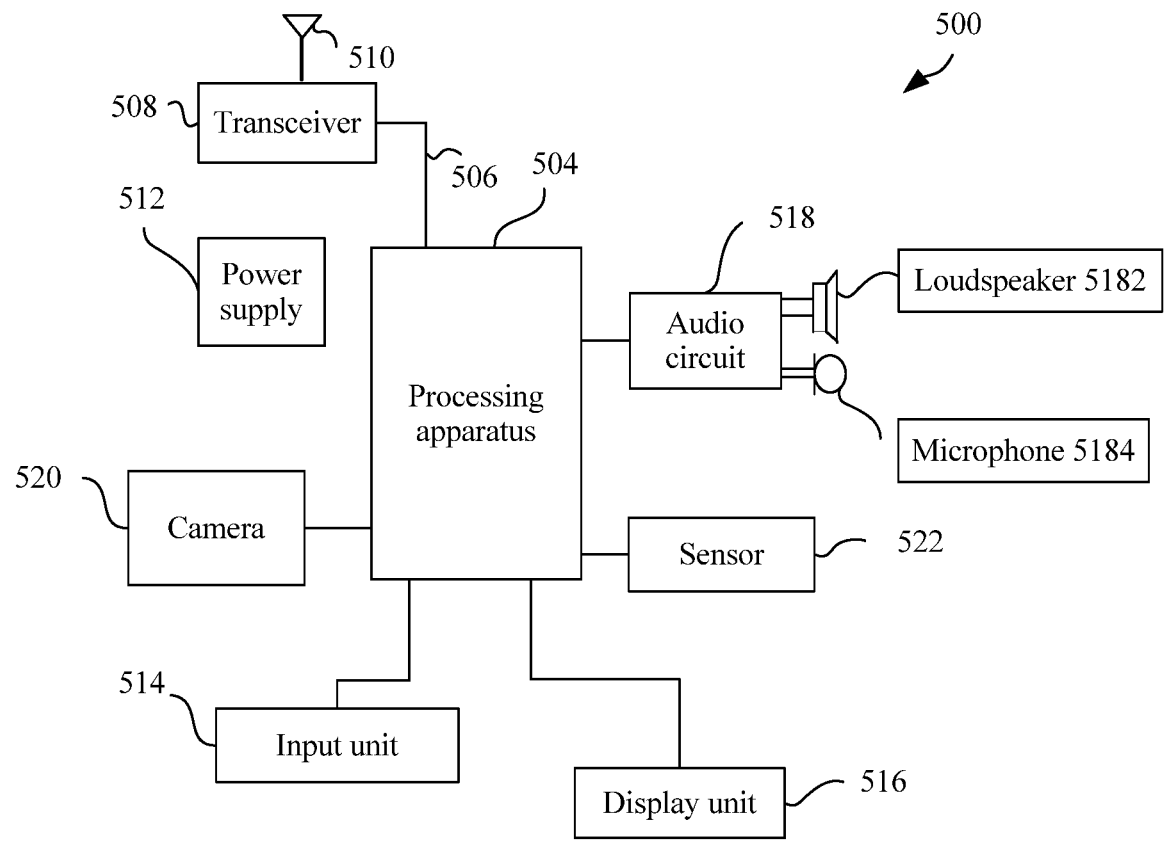
FIG. 18 is a schematic structural diagram of a terminal device according to an embodiment of this application.

FIG. 18 is a schematic structural diagram of a terminal device 500 according to an embodiment of this application. As shown in FIG. 18, the terminal device 500 includes a processor 501 and a transceiver 502. Optionally, the terminal device 500 further includes a memory 503. The processor 501, the transceiver 502, and the memory 503 communicate with each other through an internal connection channel to transmit a control signal and/or a data signal. The memory 503 is configured to store a computer program. The processor 501 is configured to invoke the computer program from the memory 503 and run the computer program to control the transceiver 502 to receive and send a signal.

The processor 501 and the memory 503 may be integrated into one processing apparatus, and the processor 501 is configured to execute program code stored in the memory 503, to implement the foregoing function. In specific implementation, the memory 503 may be integrated with the processor 501, or may be independent of the processor 501. The terminal device 500 may further include an antenna 504, configured to send, by using a radio signal, uplink data or uplink control signaling output by the transceiver 502.

Specifically, the terminal device 500 may correspond to the terminal device in the reference signal sending and receiving method 200 in the embodiments of this application. The terminal device 500 may include modules for performing the method performed by the terminal device in the reference signal sending and receiving method 200 in FIG. 2. The modules in the terminal device 500 and the foregoing other operations and/or functions are separately used to implement the corresponding procedures of the reference signal sending and receiving method 200 in FIG. 3. Specifically, the memory 503 is configured to store program code, so that when executing the program code, the processor 501 performs step 210, step 240, and step 2602 in the method 200, and controls the transceiver 502 to perform step 230 and step 2601 in the method 200. A specific process of performing the foregoing corresponding step by each module is described in detail in the method 200. For brevity, details are not described herein again.

Alternatively, the terminal device 500 may correspond to the terminal device in the reference signal sending and receiving method 300 in the embodiments of this application. The terminal device 500 may include modules for performing the method performed by the terminal device in the reference signal sending and receiving method 300 in FIG. 6. The modules in the terminal device 500 and the foregoing other operations and/or functions are separately used to implement the corresponding procedures of the reference signal sending and receiving method 300 in FIG. 6. Specifically, the memory 503 is configured to store program code, so that when executing the program code, the processor 501 performs step 310 and step 330 in the method 300, and controls the transceiver 502 to perform step 350 in the method 300. A specific process of performing the foregoing corresponding step by each module is described in detail in the method 300. For brevity, details are not described herein again.

Alternatively, the terminal device 500 may correspond to the terminal device in the reference signal sending and receiving method 1000 in the embodiments of this application. The terminal device 500 may include modules for performing the method performed by the terminal device in the reference signal sending and receiving method 1000 in FIG. 7. The modules in the terminal device 500 and the foregoing other operations and/or functions are separately used to implement the corresponding procedures of the reference signal sending and receiving method 1000 in FIG. 7. Specifically, the memory 503 is configured to store program code, so that when executing the program code, the processor 501 performs step 1200 and step 1400 in the method 1000, and controls the transceiver 502 to perform step 1100 in the method 1000. A specific process of performing the foregoing corresponding step by each module is described in detail in the method 1000. For brevity, details are not described herein again.

Alternatively, the terminal device 500 may correspond to the terminal device in the reference signal sending and receiving method 2000 in the embodiments of this application. The terminal device 500 may include modules for performing the method performed by the terminal device in the reference signal sending and receiving method 2000 in FIG. 12. The modules in the terminal device 500 and the foregoing other operations and/or functions are separately used to implement the corresponding procedures of the reference signal sending and receiving method 2000 in FIG. 12. Specifically, the memory 503 is configured to store program code, so that when executing the program code, the processor 501 performs step 2200 and step 2400 in the method 2000, and controls the transceiver 501 to perform step 2100 in the method 2000. A specific process of performing the foregoing corresponding step by each module is described in detail in the method 2000. For brevity, details are not described herein again.

The processor 501 may be configured to execute an action implemented internally by the terminal in the foregoing method embodiment, and the transceiver 502 may be configured to execute an action of transmitting or sending signals by the terminal in the foregoing method embodiment to a network device. For details, refer to the description of the foregoing method embodiment. Details are not described herein again.

The processor 501 and the memory 503 may be integrated into one processing apparatus, and the processor 501 is configured to execute the program code stored in the memory 503, to implement the foregoing function. In specific implementation, the memory 503 may be integrated with the processor 501.

The terminal device 500 may further include a power supply 505, configured to supply power to various components or circuits in the terminal.

In addition, the terminal device 500 may include one or more of an input unit 506, a display unit 507, an audio circuit 508, a camera 509, a sensor 510, and the like, to further improve a function of the terminal device. The audio circuit may further include a loudspeaker 5082, a microphone 5084, and the like.

Figure 19:
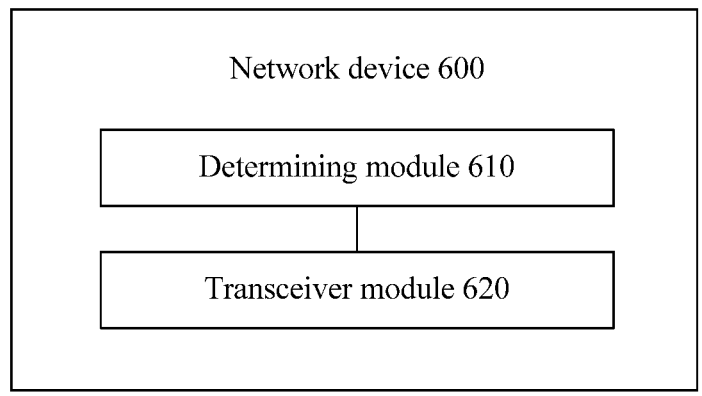
FIG. 19 is a schematic block diagram of a network device according to an embodiment of this application.

FIG. 19 is a schematic block diagram of a network device 600 according to an embodiment of this application. As shown in FIG. 19, the network device 600 includes a determining module 610 and a transceiver module 620.

The determining module 610 is configured to determine, based on an offset, a location of a starting subcarrier for transmitting an SRS, where the offset is a resource offset between a starting subcarrier of a sounding region and a starting subcarrier of transmission bandwidth of a BWP of a terminal device, and the offset is determined based on a predefined resource configuration mode.

The transceiver module 620 is configured to receive the SRS from the terminal device based on the location, determined by the determining module 610, of the starting subcarrier for transmitting the SRS.

Therefore, in this embodiment of this application, the location of the starting subcarrier for transmitting the SRS by the terminal device is determined based on the BWP of the terminal device in NR, and the SRS is transmitted based on the location of the starting subcarrier, so that a resource that is configured for each terminal device to transmit an SRS is user equipment (UE)-specific, and the resource for transmitting the SRS can be configured based on a transmit or receive capability of each terminal device and a requirement for measured bandwidth. In this way, this application is more suitable for an NR scenario. In addition, a slot type is not limited in the method for determining the location of the starting subcarrier for transmitting the SRS provided in this embodiment of this application.

Optionally, the predefined resource configuration mode is determined from a plurality of predefined resource configuration modes, and the plurality of predefined resource configuration modes correspond to a plurality of different offsets.

Optionally, the determining module 610 is further configured to determine an index value of the predefined resource configuration mode based on any one of a system frame number, a slot number, or a comb mapping location, where the index value is used to indicate the predefined resource configuration mode, and the plurality of predefined resource configuration modes are in a one-to-one correspondence with a plurality of index values.

Optionally, the transceiver module 620 is further configured to send first information, where the first information includes an index value of the predefined resource configuration mode.

Optionally, the plurality of resource configuration modes are in a one-to-one correspondence with a plurality of formulas, each formula is used to determine an offset, and the plurality of formulas include:

$$\overline{k}_0^{(p)} = (N_{RB}^{UL} - m_{SRS,b} \Pi_{b'=0}^{b} N_{b'}) N_{SC}^{RB} + k_{TC}^{(p)}; \text{ and} \qquad \text{Formula 1:}$$

$$\overline{k}_0^{(p)} = k_{TC}^{(p)}. \qquad \text{Formula 2:}$$

$\overline{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, $b = B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location.

Optionally, the plurality of resource configuration modes are in a one-to-one correspondence with a plurality of formulas, each formula is used to determine an offset, and the plurality of formulas include:

$$\overline{k}_0^{(p)} = (N_{RM}^{UL} - m_{SRS,b} \Pi_{b'=0}^{b} N_{b'}) N_{SC}^{RB} + k_{TC}^{(p)}; \qquad \text{Formula 1:}$$

$$\overline{k}_0^{(p)} = k_{TC}^{(p)}; \text{ and} \qquad \text{Formula 2:}$$

$$\overline{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}. \qquad \text{Formula 3:}$$

$\overline{k}_0^{(p)}$ indicates the offset, $N_{RB}^{UL}$ indicates a quantity of resource blocks RBs included in the transmission bandwidth of the BWP of the terminal device, $\lfloor \cdot \rfloor$ indicates rounding down, $m_{SRS,b}$ indicates a quantity of RBs used by the terminal device to transmit an SRS once, $B_{SRS}$ is a user equipment UE-specific SRS bandwidth configuration parameter, each $B_{SRS}$ indicates a set of parameters $m_{SRS,b}$ and $N_b$, $b = B_{SRS}$, b is an integer, $N_b$ indicates a quantity of times required for sending an SRS by the terminal device to measure bandwidth of $m_{SRS,b-1}$, b' is a value obtained by traversing [0, b], $N_{SC}^{RB}$ indicates a quantity of subcarriers included in each RB, and $k_{TC}^{(p)}$ is used to determine a comb mapping location.

Optionally, the offset is determined according to the following formula:

$$\overline{k}_0^{(p)} (\lfloor N_{RB}^{UL}/2 \rfloor - m_{SRS,b} \Pi_{b'=0}^{b} N_{b'}/2) N_{SC}^{RB} + k_{TC}^{(p)}.$$

It should be understood that the network device 600 may correspond to the network device in the reference signal sending and receiving method 200 in the embodiments of this application. The network device 600 may include modules for performing the method performed by the network device in the reference signal sending and receiving method 200 in FIG. 2. The modules in the network device 600 and the foregoing other operations and/or functions are separately used to implement the corresponding procedures of the reference signal sending and receiving method 200 in FIG. 3. Specifically, the determining module 610 is configured to perform step 220, step 250, and step 270 in the method 200, and the transceiver module 620 is configured to perform step 230 in the method 200. A specific process of performing the foregoing corresponding step by each module is described in detail in the method 200. For brevity, details are not described herein again.

Alternatively, the network device 600 may correspond to the network device in the reference signal sending and receiving method 300 in the embodiments of this application. The network device 600 may include modules for performing the method performed by the network device in the reference signal sending and receiving method 300 in FIG. 6. The modules in the network device 600 and the foregoing other operations and/or functions are separately used to implement the corresponding procedures of the reference signal sending and receiving method 300 in FIG. 6. Specifically, the determining module 610 is configured to perform step 320 and step 340 in the method 300, and the transceiver module 620 is configured to perform step 350 in the method 300. A specific process of performing the foregoing corresponding step by each module is described in detail in the method 300. For brevity, details are not described herein again.

Alternatively, the network device 600 may correspond to the network device in the reference signal sending and receiving method 1000 in the embodiments of this application. The network device 600 may include modules for performing the method performed by the network device in the reference signal sending and receiving method 1000 in FIG. 7. The modules in the network device 600 and the foregoing other operations and/or functions are separately used to implement the corresponding procedures of the reference signal sending and receiving method 1000 in FIG. 7. Specifically, the determining module 610 is configured to perform step 1300 and step 1500 in the method 1000, and the transceiver module 620 is configured to perform step 1100 in the method 1000. A specific process of performing the foregoing corresponding step by each module is described in detail in the method 1000. For brevity, details are not described herein again.

Alternatively, the network device 600 may correspond to the network device in the reference signal sending and receiving method 2000 in the embodiments of this application. The network device 600 may include modules for performing the method performed by the network device in the reference signal sending and receiving method 2000 in FIG. 12. The modules in the network device 600 and the foregoing other operations and/or functions are separately used to implement the corresponding procedures of the reference signal sending and receiving method 2000 in FIG. 12. Specifically, the determining module 610 is configured to perform step 2300 and step 2500 in the method 2000, and the transceiver module 620 is configured to perform step 2100 in the method 2000. A specific process of performing the foregoing corresponding step by each module is described in detail in the method 2000. For brevity, details are not described herein again.

Figure 20:
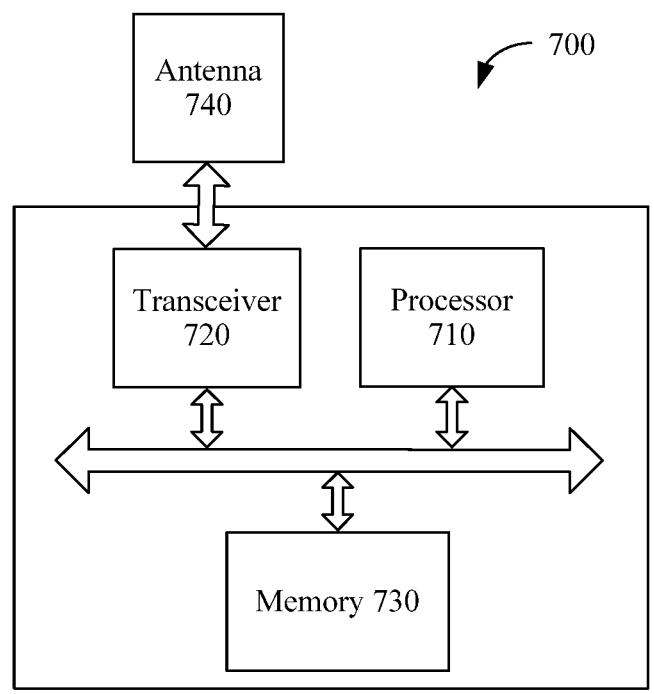
FIG. 20 is a schematic structural diagram of a network device according to an embodiment of this application.

FIG. 20 is a schematic structural diagram of a network device 700 according to an embodiment of this application. As shown in FIG. 20, the network device 700 includes a processor 710 and a transceiver 720. Optionally, the network device 700 further includes a memory 730. The processor 710, the transceiver 720, and the memory 730 communicate with each other through an internal connection channel to transmit a control signal and/or a data signal. The memory 730 is configured to store a computer program. The processor 710 is configured to invoke the computer program from the memory 730 and run the computer program to control the transceiver 720 to receive and send a signal.

The processor 710 and the memory 730 may be integrated into one processing apparatus, and the processor 710 is configured to execute program code stored in the memory 730, to implement the foregoing function. In specific implementation, the memory 730 may be integrated with the processor 710, or may be independent of the processor 710.

The network device may further include an antenna 740, configured to send, by using a radio signal, uplink data or uplink control signaling output by the transceiver 720.

Specifically, the network device 700 may correspond to the network device in the reference signal sending and receiving method 200 in the embodiments of this application. The network device 700 may include modules for performing the method performed by the network device in the reference signal sending and receiving method 200 in FIG. 2. The modules in the network device 700 and the foregoing other operations and/or functions are separately used to implement the corresponding procedures of the reference signal sending and receiving method 200 in FIG. 2. Specifically, the memory 730 is configured to store program code, so that when executing the program code, the processor 710 performs step 220, step 250, and step 270 in the method 200, and controls the transceiver 720 to perform step 230 in the method 200 by using the antenna 740. A specific process of performing the foregoing corresponding step by each module is described in detail in the method 200. For brevity, details are not described herein again.

Alternatively, the network device 700 may correspond to the network device in the reference signal sending and receiving method 300 in the embodiments of this application. The network device 700 may include modules for performing the method performed by the network device in the reference signal sending and receiving method 300 in FIG. 6. The modules in the network device 700 and the foregoing other operations and/or functions are separately used to implement the corresponding procedures of the reference signal sending and receiving method 300 in FIG. 6. Specifically, the memory 730 is configured to store program code, so that when executing the program code, the processor 710 performs step 320 and step 340 in the method 300, and controls the transceiver 720 to perform step 350 in the method 300 by using the antenna 740. A specific process of performing the foregoing corresponding step by each module is described in detail in the method. For brevity, details are not described herein again.

Alternatively, the network device 700 may correspond to the network device in the reference signal sending and receiving method 1000 in the embodiments of this application. The network device 700 may include modules for performing the method performed by the network device in the reference signal sending and receiving method 1000 in FIG. 7. The modules in the network device 700 and the foregoing other operations and/or functions are separately used to implement the corresponding procedures of the reference signal sending and receiving method 1000 in FIG. 7. Specifically, the memory 703 is configured to store program code, so that when executing the program code, the processor 701 performs step 1300 and step 1500 in the method 1000, and controls the transceiver 702 to perform step 1100 in the method 1000. A specific process of performing the foregoing corresponding step by each module is described in detail in the method 1000. For brevity, details are not described herein again.

Alternatively, the network device 700 may correspond to the network device in the reference signal sending and receiving method 2000 in the embodiments of this application. The network device 700 may include modules for performing the method performed by the network device in the reference signal sending and receiving method 2000 in FIG. 12. The modules in the network device 700 and the foregoing other operations and/or functions are separately used to implement the corresponding procedures of the reference signal sending and receiving method 2000 in FIG. 12. Specifically, the memory 703 is configured to store program code, so that when executing the program code, the processor 701 performs step 2300 and step 2500 in the method 2000, and controls the transceiver 702 to perform step 2100 in the method 2000. A specific process of performing the foregoing corresponding step by each module is described in detail in the method 2000. For brevity, details are not described herein again.

According to the method provided in the embodiments of this application, an embodiment of this application further provides a system, and the system includes the foregoing network device and one or more terminal devices.

It should be understood that, the processor in the embodiments of this application may be a central processing unit (central processing unit, CPU), or the processor may be another general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read only memory (erasable PROM, EPROM), an electrically erasable programmable read-only memory (electrically EPROM, EEPROM), or a flash memory. The volatile memory may be a random access memory (RAM) and is used as an external cache. Through examples but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, the foregoing embodiments may be implemented all or partially in a form of a computer program product. The computer program product includes one or more computer instructions. When the computer program instructions are loaded and executed on a computer, the procedures or functions in the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A reference signal sending method, comprising:
sending, by a network device, a channel state information-reference signal (CSI-RS) based on a frequency-domain starting location of a resource for transmitting the CSI-RS, wherein:
the frequency-domain starting location of the resource for transmitting the CSI-RS is determined by a first resource offset between a starting resource block (RB) of a pilot region and a starting RB of system bandwidth, the system bandwidth is larger than a bandwidth part (BWP), and the pilot region is a resource that is used to transmit the CSI-RS; and
the first resource offset is greater than or equal to a second resource offset between a starting RB of the BWP and the starting RB of system bandwidth, the first resource offset is greater than 0, and the CSI-RS is transmitted on consecutive RBs within the BWP.

2. The method according to claim 1,
wherein the frequency-domain starting location of the resource for transmitting the CSI-RS is within a BWP of a terminal device.

3. The method according to claim 1, further comprising:
sending, by the network device, indication information of a starting location of the pilot region, wherein the indication information of the starting location indicates a RB number corresponding to a starting RB for transmitting the CSI-RS in the system bandwidth.

4. A reference signal receiving method, comprising:
receiving, by a terminal device, a channel state information-reference signal (CSI-RS) based on a frequency-domain starting location of a resource for transmitting the CSI-RS, wherein:
the frequency-domain starting location of the resource for transmitting the CSI-RS is determined by a first resource offset between a starting resource block (RB) of a pilot region and a starting RB of system bandwidth, the system bandwidth is larger than a bandwidth part (BWP), and the pilot region is a resource that is used to transmit the CSI-RS; and
the first resource offset is greater than or equal to a second resource offset between a starting RB of the BWP and the starting RB of system bandwidth, the first resource offset is greater than 0, and the CSI-RS is transmitted on consecutive RBs within the BWP.

5. The method according to claim 4,
wherein the frequency-domain starting location of the resource for transmitting the CSI-RS is within a BWP of the terminal device.

6. The method according to claim 4, further comprising:
receiving, by the terminal device, indication information of a starting location of the pilot region, wherein the indication information of the starting location indicates a RB number corresponding to a starting RB for transmitting the CSI-RS in the system bandwidth.

7. A network device, comprising:
at least one processor;
a transceiver; and
one or more memories coupled to the at least one processor and the at least one processor invokes programming instructions stored in the one or more memories, and is configured to execute the programming instructions to cause the transceiver to:
send a channel state information-reference signal (CSI-RS) based on a frequency-domain starting location of a resource for transmitting the CSI-RS, wherein:
the frequency-domain starting location of the resource for transmitting the CSI-RS is determined by a first resource offset between a starting resource block (RB) of a pilot region and a starting RB of system bandwidth, the system bandwidth is larger than a bandwidth part (BWP), and the pilot region is a resource that is used to transmit the CSI-RS; and
the first resource offset is greater than or equal to a second resource offset between a starting RB of the BWP and the starting RB of system bandwidth, the first resource offset is greater than 0, and the CSI-RS is transmitted on consecutive RBs within the BWP.

8. The network device according to claim 7, wherein the transceiver is further configured to send indication information of a reference signal location, wherein the indication information of the reference signal location indicates a RB for transmitting the CSI-RS in the pilot region.

9. The network device according to claim 7,
wherein the frequency-domain starting location of the resource for transmitting the CSI-RS is within a BWP of a terminal device.

10. The network device according to claim 8, wherein the indication information of the reference signal location is a bitmap, the bitmap comprises at least one indication bit, each indication bit is used to indicate whether a RB group is used to transmit the CSI-RS, and the RB group comprises at least one RB.

11. The network device according to claim 7, wherein the transceiver is further configured to send indication information of a starting location of the pilot region, wherein the indication information of the starting location indicates a RB number corresponding to a starting RB for transmitting the CSI-RS in the system bandwidth.

12. A terminal device, comprising:
at least one processor;
a transceiver; and
one or more memories coupled to the at least one processor and the at least one processor invokes programming instructions stored in the one or more memories, and is configured to execute the programming instructions to cause the transceiver to:
receive a channel state information-reference signal (CSI-RS) based on a frequency-domain starting location of a resource for transmitting the CSI-RS, wherein:
the frequency-domain starting location of the resource for transmitting the CSI-RS is determined by a first resource offset between a starting resource block (RB) of a pilot region and a starting RB of system bandwidth, the system bandwidth is larger than a bandwidth part (BWP), and the pilot region is a resource that is used to transmit the CSI-RS; and
the first resource offset is greater than or equal to a second resource offset between a starting RB of the BWP and the starting RB of system bandwidth, the first resource offset is greater than 0, and the CSI-RS is transmitted on consecutive RBs within the BWP.

13. The terminal device according to claim 12, wherein the frequency-domain starting location of the resource for transmitting the CSI-RS is within a BWP of the terminal device.

14. The terminal device according to claim 12, wherein the transceiver is further configured to receive indication information of a reference signal location, wherein the indication information of the reference signal location indicates a RB for transmitting the CSI-RS in the pilot region.

15. The terminal device according to claim 14, wherein the indication information of the reference signal location is a bitmap, the bitmap comprises at least one indication bit, each indication bit is used to indicate whether a RB group is used to transmit the CSI-RS, and each RB group comprises at least one RB.

16. The terminal device according to claim 12, wherein the transceiver is further configured to receive indication information of a starting location of the pilot region, wherein the indication information of the starting location indicates a RB number corresponding to a starting RB for transmitting the CSI-RS in the system bandwidth.

\* \* \* \* \*